United States Patent
Chiou

(10) Patent No.: US 9,644,147 B2
(45) Date of Patent: May 9, 2017

(54) LIQUID CRYSTAL ALIGNMENT AGENT, LIQUID CRYSTAL ALIGNMENT FILM, AND LIQUID CRYSTAL DISPLAY ELEMENT

(71) Applicant: Chi Mei Corporation, Tainan (TW)

(72) Inventor: Shin-Rong Chiou, Kaohsiung (TW)

(73) Assignee: Chi Mei Corporation, Tainan (TW)

( * ) Notice: Subject to any disclaimer, the term of this patent is extended or adjusted under 35 U.S.C. 154(b) by 0 days.

(21) Appl. No.: 14/807,902

(22) Filed: Jul. 24, 2015

(65) Prior Publication Data

US 2016/0024386 A1    Jan. 28, 2016

(30) Foreign Application Priority Data

Jul. 24, 2014   (TW) .............................. 103125328 A

(51) Int. Cl.
| | |
|---|---|
| G02F 1/1337 | (2006.01) |
| C08L 77/06 | (2006.01) |
| C09K 19/56 | (2006.01) |
| C09D 179/08 | (2006.01) |
| C08G 73/10 | (2006.01) |
| C08G 73/16 | (2006.01) |

(52) U.S. Cl.
CPC .......... *C09K 19/56* (2013.01); *C08G 73/1042* (2013.01); *C08G 73/1067* (2013.01); *C08G 73/1078* (2013.01); *C08G 73/16* (2013.01); *C09D 179/08* (2013.01); *G02F 1/133711* (2013.01)

(58) Field of Classification Search
CPC .... G02F 1/333723; C08G 73/12; C08L 79/08
USPC .......................................... 428/126; 528/280
See application file for complete search history.

(56) References Cited

U.S. PATENT DOCUMENTS 6,001,276 A * 12/1999 Asaoka .............. C09K 19/0225
                                                                428/1.26
8,842,243 B2 * 9/2014 Kaihoko ........... G02F 1/133634
                                                                349/117

(Continued)

FOREIGN PATENT DOCUMENTS

| CN | 101526700 | 9/2009 |
| CN | 101925634 | 12/2010 |

(Continued)

OTHER PUBLICATIONS

"Office Action of China Counterpart Application," issued on Jan. 25, 2017, pp. 1-5, in which the listed references were cited.

*Primary Examiner* — Tae H Yoon
(74) *Attorney, Agent, or Firm* — Jianq Chyun IP Office

(57) ABSTRACT

A liquid crystal alignment agent capable of forming a liquid crystal alignment film having good ultraviolet reliability, the liquid crystal alignment film, and a liquid crystal display element having the same are provided. The liquid crystal alignment agent includes a polymer (A) and a solvent (B). The polymer (A) is obtained by reacting a mixture. The mixture includes a tetracarboxylic dianhydride component (a) and a component (b). The component (b) includes a diamine compound (b-1) represented by formula (1), a diamine compound (b-2) represented by formula (2), and a compound (b-3), wherein the compound (b-3) is at least one selected from the group consisting of a structure represented by formula (3-1) and a structure represented by formula (3-2).

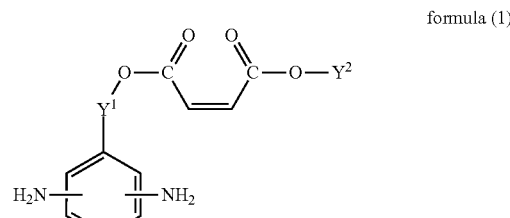

formula (1)

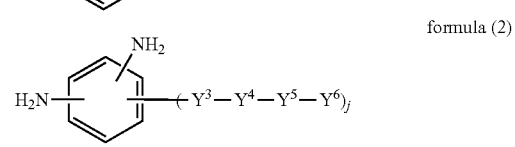

formula (2)

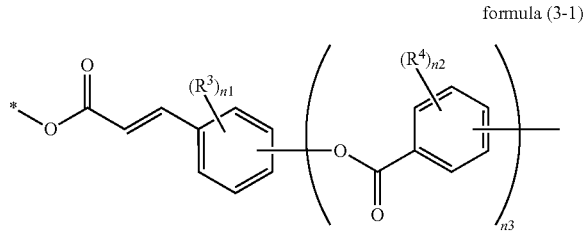

formula (3-1)

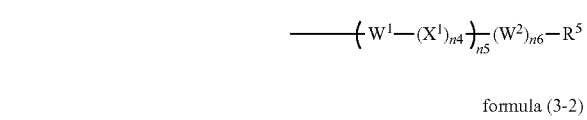

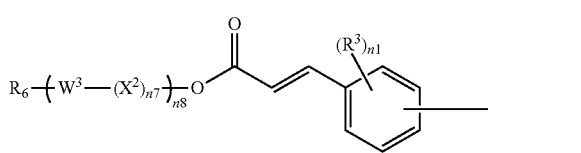

formula (3-2)

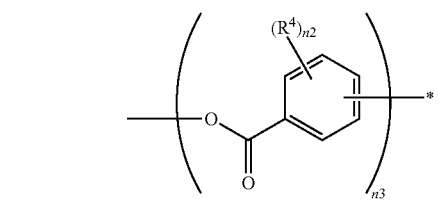

11 Claims, 1 Drawing Sheet

(56) References Cited

U.S. PATENT DOCUMENTS

2009/0280236 A1* 11/2009 Hsueh ................ C08F 222/385
   427/58
2011/0255042 A1   10/2011 Hsueh
2015/0031829 A1*  1/2015 Tsai  ................ G02F 1/133723
   524/600

FOREIGN PATENT DOCUMENTS

| CN | 101925849 | 12/2010 |
| CN | 103374354 | 10/2013 |
| JP | 2005037654 | 2/2005 |
| TW | 200951583 | 12/2009 |

* cited by examiner

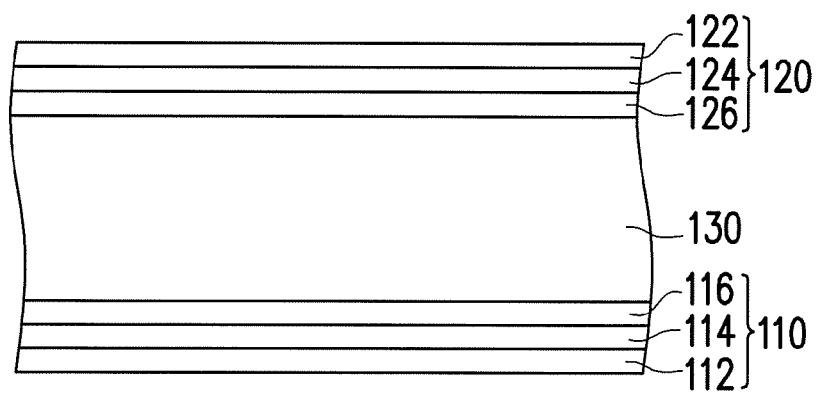

LIQUID CRYSTAL ALIGNMENT AGENT, LIQUID CRYSTAL ALIGNMENT FILM, AND LIQUID CRYSTAL DISPLAY ELEMENT

CROSS-REFERENCE TO RELATED APPLICATION

This application claims the priority benefit of Taiwan application serial no. 103125328, filed on Jul. 24, 2014. The entirety of the above-mentioned patent application is hereby incorporated by reference herein and made a part of this specification.

BACKGROUND OF THE INVENTION

Field of the Invention

The invention relates to an optical alignment liquid crystal alignment agent, a liquid crystal alignment film, and a liquid crystal display element. More particularly, the invention relates to a liquid crystal alignment agent capable of forming a liquid crystal alignment film having good ultraviolet reliability, a liquid crystal alignment film formed by the liquid crystal alignment agent, and a liquid crystal display element having the liquid crystal alignment film.

Description of Related Art

The liquid crystal display is widely applied in, for instance, television and various monitors. Among LCD display elements, the following are known liquid crystal cell LCD display elements: twisted nematic (TN)-type, super-twisted nematic (STN)-type, in-plane switching (IPS)-type, and modified IPS-type electrode structures . . . etc., and a fringe field switching (FFS)-type electrode structure . . . etc. increasing brightness by increasing the aperture ratio of the display element component.

The following is a known method for aligning the liquid crystal of liquid crystal cells: an organic film such as a liquid crystal alignment film is formed on the surface of a substrate, and a cloth material such as rayon is used to rub the surface of the organic film in a certain direction; silicon oxide is deposited on the surface of the substrate diagonally via vapor deposition; and a Langmuir-Blodgett (LB) method is used to form a monomolecular film having a long-chain alkyl group. In particular, from the viewpoint of substrate size, uniformity of liquid crystal alignment, treatment time, and treatment cost, a rubbing treatment is most commonly used.

However, if a rubbing treatment is used to perform liquid crystal alignment, then dust may be adhered to the surface of the alignment film due to dust or static electricity generated during the process, thus causing poor display. In particular, for a substrate having a thin film transistor (TFT) element, the generated static electricity causes damage to the circuit of the TFT element, thus causing reduced yield. Moreover, for the liquid crystal display element becoming more and more highly delicate in the future, with the high densification of the pixels, the surface of the substrate becomes uneven, and therefore it is difficult to perform a uniform rubbing treatment.

As a result, to avoid such undesired situation, a photoalignment method (such as Japanese Patent Laid-Open 2005-037654) provides liquid crystal alignment capability by irradiating polarized or non-polarized radiation on a photosensitive thin film. The patent literature provides a repeating unit having conjugated enone and a liquid crystal alignment agent having an imide structure. Accordingly, static electricity and dust are not generated, and therefore uniform liquid crystal alignment can be achieved. Moreover, in comparison to the rubbing treatment, the method can precisely control the direction of liquid crystal alignment in any direction. Furthermore, by using, for instance, a photomask when radiation is irradiated, a plurality of regions having different directions of liquid crystal alignment can be formed on one substrate in any manner.

However, the liquid crystal alignment film has the issue of poor ultraviolet reliability. Specifically, after the liquid crystal alignment film is irradiated by ultraviolet for a period of time, the situation of significantly reduced voltage holding ratio of the liquid crystal display occurs, thereby causing issues such as reduced contrast of the liquid crystal display.

Therefore, how to provide a liquid crystal alignment agent capable of forming a liquid crystal alignment film having good ultraviolet reliability such that high voltage holding ratio is still maintained after prolonged ultraviolet irradiation when the liquid crystal alignment film formed thereby is used in a liquid crystal display element is a current issue those skilled in the art urgently need to solve.

SUMMARY OF THE INVENTION

Accordingly, the invention provides a liquid crystal alignment agent capable of forming a liquid crystal alignment film having good ultraviolet reliability, a liquid crystal alignment film formed by the liquid crystal alignment agent, and a liquid crystal display element having the liquid crystal alignment film.

The invention provides a liquid crystal alignment agent including a polymer (A) and a solvent (B). The polymer (A) is obtained by reacting a mixture. The mixture includes a tetracarboxylic dianhydride component (a) and a compound (b). The compound (b) includes a diamine compound (b-1) represented by formula (1), a diamine compound (b-2) represented by formula (2), and a compound (b-3), wherein the compound (b-3) is at least one selected from the group consisting of a structure represented by formula (3-1) and a structure represented by formula (3-2).

Specifically, the diamine compound (b-1) represented by formula (1) is as follows.

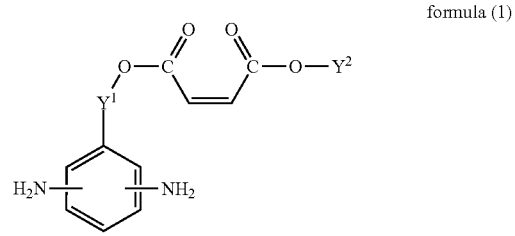

formula (1)

In formula (1), $Y^1$ represents a $C_1$ to $C_{12}$ alkylene group; and $Y^2$ represents a group having a steroid (cholesterol) skeleton or a group represented by formula (1-1).

The group represented by formula (1-1) is as shown below.

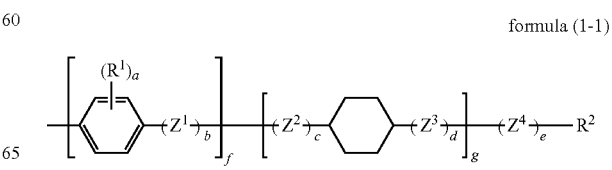

formula (1-1)

In formula (1-1), $R^1$ each independently represents a fluorine atom or a methyl group; $R^2$ represents a hydrogen atom, a fluorine atom, a $C_1$ to $C_{12}$ alkyl group, a $C_1$ to $C_{12}$ fluoroalkyl group, a $C_1$ to $C_{12}$ alkoxy group, —OCH$_2$F, —OCHF$_2$, or —OCF$_3$; $Z^2$, and $Z^3$ each independently represent a single bond, a $C_1$ to $C_3$ alkylene group,

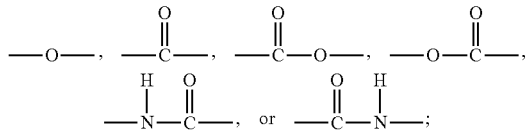

$Z^4$ each independently represents

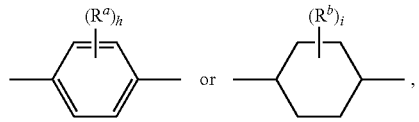

$R^a$ and $R^b$ each independently represent a fluorine atom or a methyl group, h and i each independently represent 0, 1, or 2; a represents 0, 1, or 2; b, c, and d each independently represent an integer of 0 to 4; and e, f, and g each independently represent an integer of 0 to 3, and e+f+g≥1.

Moreover, the diamine compound (b-2) represented by formula (2) is as follows.

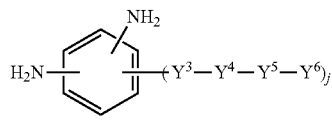

formula (2)

In formula (2), $Y^3$ each independently represents

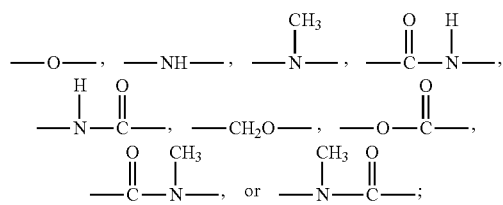

$Y^4$ each independently represents a single bond, a $C_1$ to $C_{20}$ divalent aromatic hydrocarbon group, a divalent alicyclic hydrocarbon group, or a divalent aromatic hydrocarbon group; $Y^5$ each independently represents a single bond,

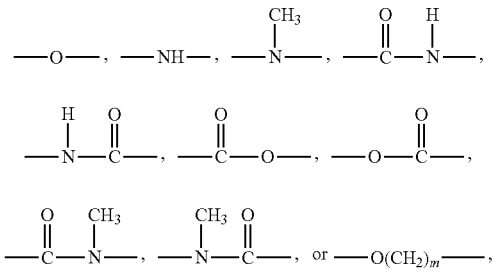

wherein m represents an integer of 1 to 5; $Y^6$ each independently represents a nitrogen-containing aromatic heterocyclic group; and j represents an integer of 1 to 4.

The structure represented by formula (3-1) is as shown below.

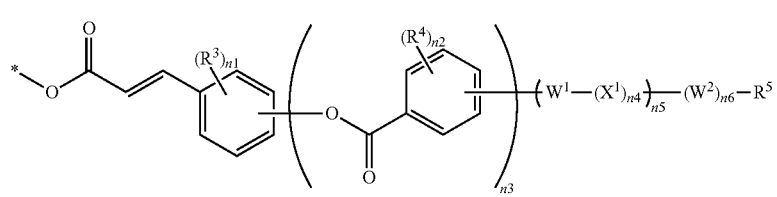

formula (3-1)

In formula (3-1), $R^3$ and $R^4$ each independently represent a $C_1$ to $C_6$ alkyl group, a $C_1$ to $C_6$ alkoxy group, a halogen atom, or a cyano group; $R^5$ represents a $C_1$ to $C_{40}$ alkyl group or a $C_1$ to $C_{40}$ alkyl group substituted by a fluorine atom; $W^1$ and $W^2$ each independently represent

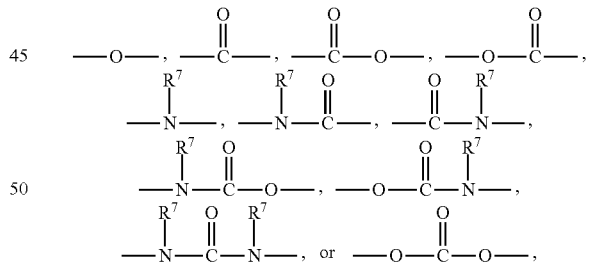

wherein $R^7$ represents a hydrogen atom or a $C_1$ to $C_4$ alkyl group; $X^1$ represents a methylene group, an arylene group, a divalent alicyclic group, —Si(CH$_3$)$_2$—, —CH═CH—, a methylene group having a substituent, an arylene group having a substituent, a divalent alicyclic group having a substituent, —Si(CH$_3$)$_2$— having a substituent, or —CH═CH— having a substituent, wherein the substituent is a cyano group, a halogen atom, or a $C_1$ to $C_4$ alkyl group; n1 and n2 each independently represent an integer of 0 to 4; n3 represents an integer of 0 or 1; n4 represents an integer of 1 to 6; n5 represents an integer of 0 to 2; n6 represents 0 or 1; and * each independently represents a bonding position of a structure containing a diamino group.

The structure represented by formula (3-2) is as shown below.

formula (3-2)

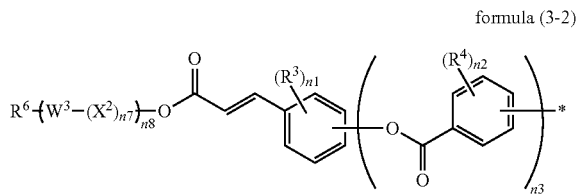

In formula (3-2), $R^3$ and $R^4$ each independently represent a $C_1$ to $C_6$ alkyl group, a $C_1$ to $C_6$ alkoxy group, a halogen atom, or a cyano group; $R^6$ represents a $C_1$ to $C_{40}$ alkyl group or a $C_1$ to $C_{40}$ alkyl group substituted by a fluorine atom; $W^3$ represents

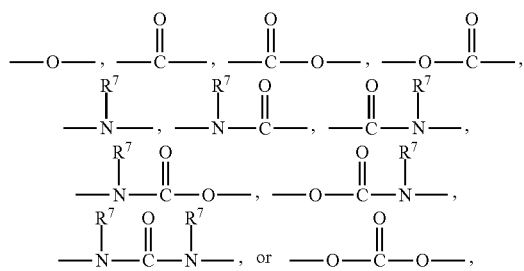

wherein $R^7$ represents a hydrogen atom or a $C_1$ to $C_4$ alkyl group; $X^2$ represents a methylene group, an arylene group, a divalent alicyclic group, —Si(CH$_3$)$_2$—, —CH=CH—, —C≡C—, a methylene group having a substituent, an arylene group having a substituent, a divalent alicyclic group having a substituent, —Si(CH$_3$)$_2$— having a substituent, or —CH=CH— having a substituent, wherein the substituent is a cyano group, a halogen atom, or a $C_1$ to $C_4$ alkyl group; n1 and n2 each independently represent an integer of 0 to 4; n3 represents an integer of 0 or 1; n7 represents an integer of 1 to 6; n8 represents an integer of 0 to 2; and * each independently represents a bonding position of a structure containing a diamino group.

In an embodiment of the invention, in formula (2), $Y^3$ each independently represents

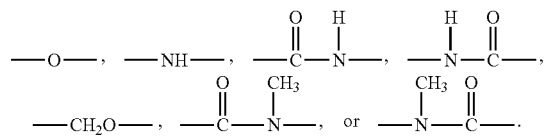

In an embodiment of the invention, in formula (2), $Y^4$ each independently represents a single bond, a $C_1$ to $C_5$ alkylene group, or a phenylene group.

In an embodiment of the invention, in formula (2), $Y^5$ each independently represents a single bond,

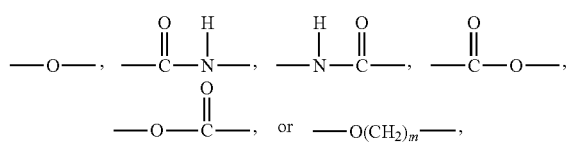

wherein m represents an integer of 1 to 5.

In an embodiment of the invention, in formula (2), $Y^6$ each independently represents a pyrrolyl group, an imidazolyl group, a pyrazolyl group, a pyridyl group, or a pyrimidinyl group.

In an embodiment of the invention, in formula (2), j represents an integer of 1 to 3.

In an embodiment of the invention, based on a usage amount of 100 moles of the compound (b), the usage amount of the diamine compound (b-1) represented by formula (1) is 0.3 moles to 10 moles, the usage amount of the diamine compound (b-2) represented by formula (2) is 0.3 moles to 10 moles, and the usage amount of the compound (b-3) at least one selected from the group consisting of a structure represented by formula (3-1) and a structure represented by formula (3-2) is 5 moles to 90 moles.

The invention further provides a liquid crystal alignment film. The liquid crystal alignment film is formed by the above liquid crystal alignment agent.

The invention further provides a liquid crystal display element. The liquid crystal display element includes the above liquid crystal alignment film.

In an embodiment of the invention, the component (b) further comprises a diamine compound other than the diamine compound (b-1), the diamine compound (b-2) and the compound (b-3).

In an embodiment of the invention, based on a usage amount of 100 moles of the component (b), a usage amount of the diamine compound (b-1) represented by formula (1) is 0.3 moles to 10 moles, a usage amount of the diamine compound (b-2) represented by formula (2) is 0.3 moles to 10 moles, a usage amount of the compound (b-3) at least one selected from the group consisting of a structure represented by formula (3-1) and a structure represented by formula (3-2) is 5 moles to 90 moles, and a usage amount of the diamine compound other than the diamine compound (b-1), the diamine compound (b-2) and the compound (b-3) is 0 moles to 94 moles.

Based on the above, the ultraviolet reliability of the liquid crystal alignment film formed by the liquid crystal alignment agent of the invention is good. Therefore, the liquid crystal alignment agent of the invention is suitable for a liquid crystal display element.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

The FIGURE is a side view of a liquid crystal display element according to an embodiment of the invention.

DESCRIPTION OF THE EMBODIMENTS

<Liquid Crystal Alignment Agent>

The invention provides a liquid crystal alignment agent including a polymer (A) and a solvent (B). Moreover, the liquid crystal alignment agent can further include an additive (C) if needed.

In the following, each component of the liquid crystal alignment agent of the invention is described in detail.

It should be mentioned that, in the following, (meth) acrylic acid represents acrylic acid and/or methacrylic acid, and (meth)acrylate represents acrylate and/or methacrylate. Similarly, (meth)acryloyl group represents acryloyl group and/or methacryloyl group.

Polymer (A)

The polymer (A) is obtained by reacting a mixture. The mixture includes a tetracarboxylic dianhydride component (a) and a compound (b).

Tetracarboxylic Dianhydride Component (a)

The tetracarboxylic dianhydride component (a) includes an aliphatic tetracarboxylic dianhydride compound, an alicyclic tetracarboxylic dianhydride compound, an aromatic tetracarboxylic dianhydride compound, at least one of the tetracarboxylic dianhydride compounds represented by formula (I-1) to formula (I-6), or a combination of the compounds.

Specific examples of the aliphatic tetracarboxylic dianhydride compound can include, but are not limited to, ethane tetracarboxylic dianhydride, butane tetracarboxylic dianhydride, or a combination of the compounds.

Specific examples of the alicyclic tetracarboxylic dianhydride compound can include, but are not limited to, 2,3,4-cyclobutane tetracarboxylic dianhydride, 1,2-dimethyl-1,2,3,4-cyclobutane tetracarboxylic dianhydride, 1,3-dimethyl-1,2,3,4-cyclobutane tetracarboxylic dianhydride, 1,3-dichloro-1,2,3,4-cyclobutane tetracarboxylic dianhydride, 2,3,4-tetramethyl-1,2,3,4-cyclobutane tetracarboxylic dianhydride, 1,2,3,4-cyclopentane tetracarboxylic dianhydride, 1,2,4,5-cyclohexane tetracarboxylic dianhydride, 3,3',4,4'-dicyclohexyl tetracarboxylic dianhydride, cis-3,7-dibutyl cycloheptyl-1,5-diene-1,2,5,6-tetracarboxylic dianhydride, 2,3,5-tricarboxycyclopentylacetic dianhydride, bicyclo [2.2.2]-oct-7-ene-2,3,5,6-tetracarboxylic dianhydride, or a combination of the compounds.

Specific examples of the aromatic tetracarboxylic dianhydride compound can include, but are not limited to, an aromatic tetracarboxylic dianhydride compound such as 3,4-dicarboxy-1,2,3,4-tetrahydronaphthalene-1-succinic dianhydride, pyromellitic dianhydride, 3,3',4,4'-benzophenone tetracarboxylic dianhydride, 3',3,4,4'-biphenylsulfone tetracarboxylic dianhydride, 1,4,5,8-naphthalene tetracarboxylic dianhydride, 2,3,6,7-naphthalene tetracarboxylic dianhydride, 3,3'-4,4'-diphenyl ethane tetracarboxylic dianhydride, 3,3',4,4'-dimethyl diphenyl silane tetracarboxylic dianhydride, 3,3',4,4'-tetraphenyl silane tetracarboxylic dianhydride, 1,2,3,4-furan tetracarboxylic dianhydride, 4,4'-bis(3,4-dicarboxy phenoxy)diphenylsulfide dianhydride, 4,4'-bis(3,4-dicarboxy phenoxy)diphenylsulfone dianhydride, 4,4'-bis(3,4-dicarboxy phenoxy)diphenylpropane dianhydride, 3,3',4,4'-perfluoroisopropylidene diphenyl dicarboxylic dianhydride, 3,3',4,4'-diphenyl tetracarboxylic dianhydride, bis(phthalic acid)phenylphosphine oxide dianhydride, p-phenylene-bis(triphenylphthalic acid) dianhydride, m-phenylene-bis(triphenylphthalic acid) dianhydride, bis(triphenylphthalic acid)-4,4'-diphenylether dianhydride, bis(triphenylphthalic acid)-4,4'-diphenylmethane dianhydride, ethylene glycol-bis(anhydrotrimellitate), propylene glycol-bis(anhydrotrimellitate), 1,4-butanediol-bis(anhydrotrimellitate), 1,6-hexanediol-bis(anhydrotrimellitate), 1,8-octanediol-bis(anhydrotrimellitate), 2,2-bis(4-hydroxyphenyl)propane-bis(anhydrotrimellitate), 2,3,4,5-tetrahydrofuran tetracarboxylic dianhydride, 1,3,3a,4,5,9b-hexahydro-5-(tetrahydro-2,5-dioxo-3-furanyl)naphtho[1,2-c]furan-1,3-dione, 1,3,3a,4,5,9b-hexahydro-5-ethyl-5-(tetrahydro-2,5-dioxo-3-furanyl)naphtho[1,2-c]furan-1,3-dione, 1,3,3a,4,5,9b-hexahydro-5-ethyl-5-(tetrahydro-2,5-dioxo-3-furanyl)naphtho[1,2-c]furan-1,3-dione, 1,3,3a,4,5,9b-hexahydro-7-methyl-5-(tetrahydro-2,5-dioxo-3-furanyl) naphtho[1,2-c]furan-1,3-dione, 1,3,3a,4,5,9b-hexahydro-7-ethyl-5-(tetrahydro-2,5-dioxo-3-furanyl)naphtho[1,2-c]furan-1,3-dione, 1,3,3a,4,5,9b-hexahydro-8-methyl-5-(tetrahydro-2,5-dioxo-3-furanyl)naphtho[1,2-c]furan-1,3-dione, 1,3,3a,4,5,9b-hexahydro-8-ethyl-5-(tetrahydro-2,5-dioxo-3-furanyl) naphtho[1,2-c]furan-1,3-dione, 1,3,3a,4,5,9b-hexahydro-5,8-dimethyl-5-(tetrahydro-2,5-dioxo-3-furanyl)naphtho[1,2-c]furan-1,3-dione, 5-(2,5-dioxotetrahydrofural)-3-methyl-3-cyclohexene-1,2-dicarboxylic dianhydride, or a combination of the compounds.

The tetracarboxylic dianhydride compounds represented by formula (I-1) to formula (I-6) are as shown below.

formula (I-1)

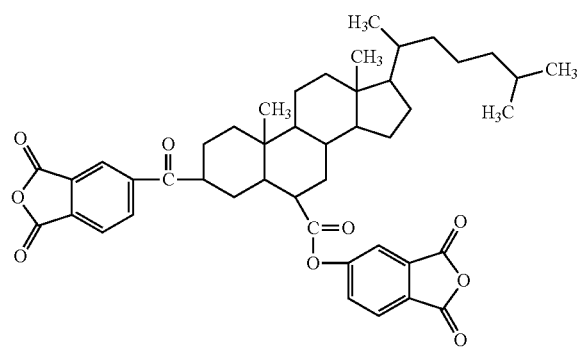

formula (I-2)

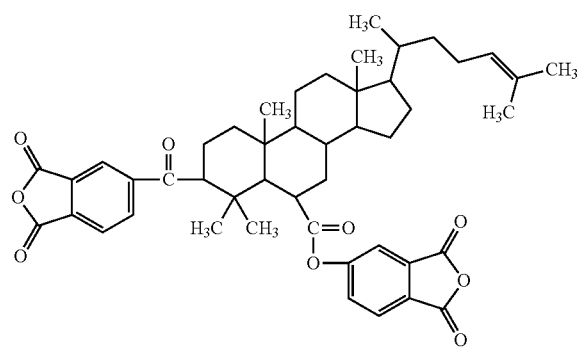

formula (I-3)

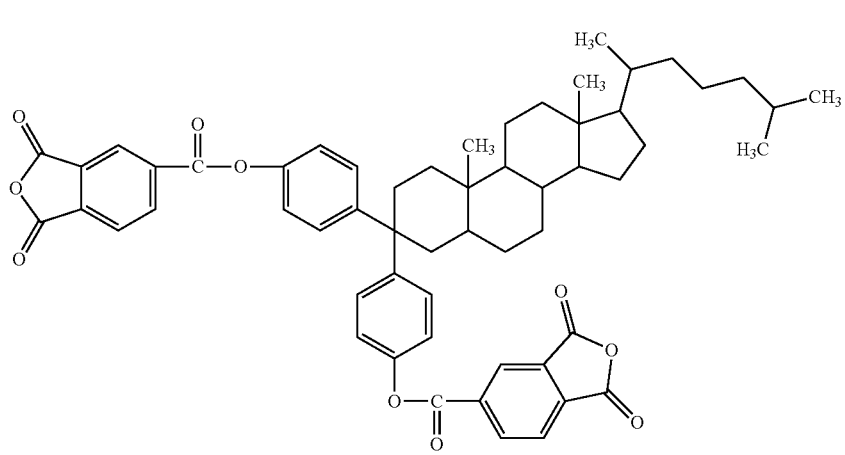

formula (I-4)

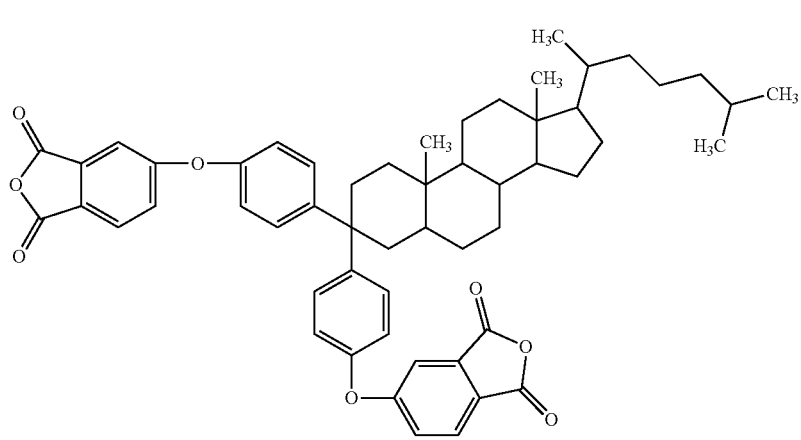

formula (I-5)

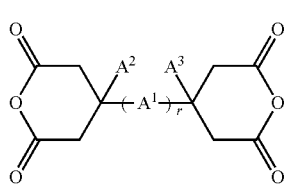

In formula (I-5), $A^1$ represents a divalent group containing an aromatic ring; r represents an integer of 1 to 2; and $A^2$ and $A^3$ can be the same or different, and can each independently represent a hydrogen atom or an alkyl group. Specific examples of the tetracarboxylic dianhydride compound represented by formula (I-5) include at least one of the compounds represented by formula (I-5-1) to formula (I-5-3).

formula (I-5-1)

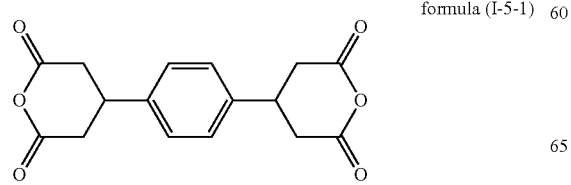

-continued formula (I-5-2)

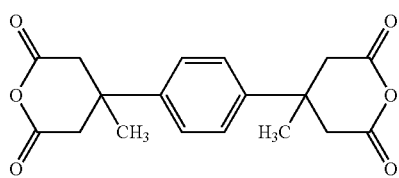

formula (I-5-3)

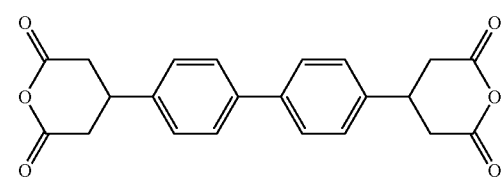

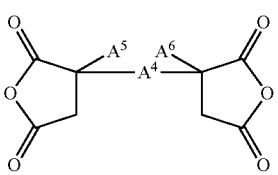

formula (I-6)

In formula (I-6), $A^4$ represents a divalent group containing an aromatic ring; and $A^5$ and $A^6$ can be the same or different, and each independently represent a hydrogen atom or an alkyl group. The tetracarboxylic dianhydride compound represented by formula (I-6) is preferably a compound represented by formula (I-6-1).

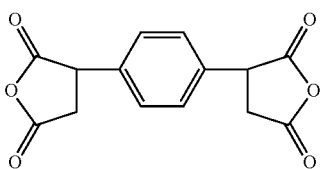

formula (I-6-1)

The tetracarboxylic dianhydride component (a) can be used alone or in multiple combinations.

Compound (b)

The compound (b) includes a diamine compound (b-1), a diamine compound (b-2), and a compound (b-3). Moreover, in addition to the diamine compound (b-1), the diamine compound (b-2), and the compound (b-3), the compound (b) can further include a diamine compound (b-4).

Diamine Compound (b-1)

The diamine compound (b-1) is a compound represented by formula (1).

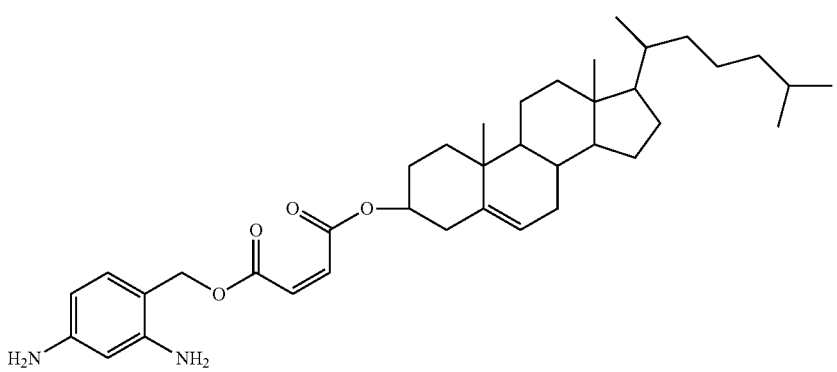

formula (1)

In formula (1), $Y^1$ represents a $C_1$ to $C_{12}$ alkylene group; and $Y^2$ represents a group having a steroid (cholesterol) skeleton or a group represented by formula (1-1).

The group represented by formula (1-1) is as shown below.

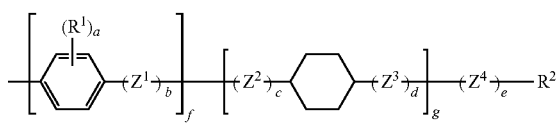

formula (1-1)

In formula (1-1), $R^1$ each independently represents a fluorine atom or a methyl group; $R^2$ represents a hydrogen atom, a fluorine atom, a $C_1$ to $C_{12}$ alkyl group, a $C_1$ to $C_{12}$ fluoroalkyl group, a $C_1$ to $C_{12}$ alkoxy group, —OCH$_2$F, —OCHF$_2$, or —OCF$_3$; $Z^1$, $Z^2$, and $Z^3$ each independently represent a single bond, a $C_1$ to $C_3$ alkylene group,

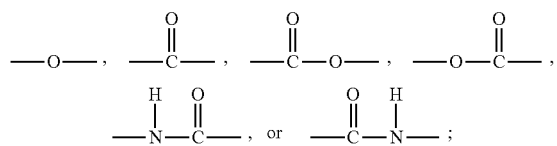

$Z^4$ each independently represents

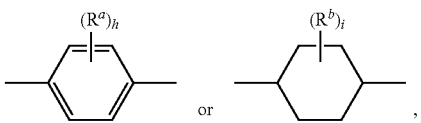

$R^a$ and $R^b$ each independently represent a fluorine atom or a methyl group, h and i each independently represent 0, 1, or 2; a represents 0, 1, or 2; b, c, and d each independently represent an integer of 0 to 4; and e, f, and g each independently represent an integer of 0 to 3, and e+f+g≥1.

Specific examples of the diamine compound (b-1) include at least one of the compounds represented by formula (1-2) to formula (1-19).

formula (1-2)

-continued
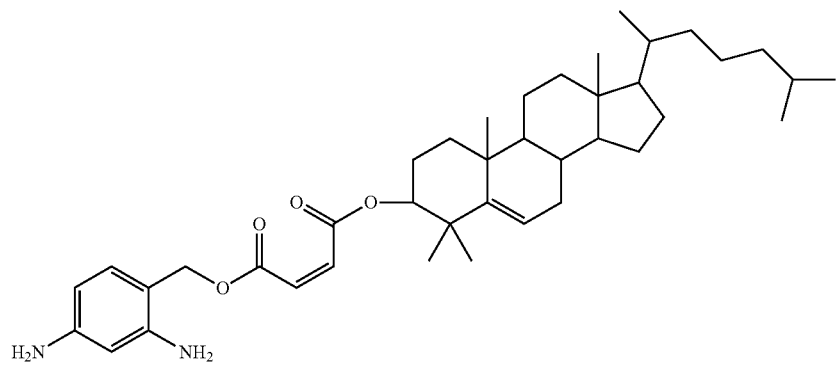
formula (1-3)
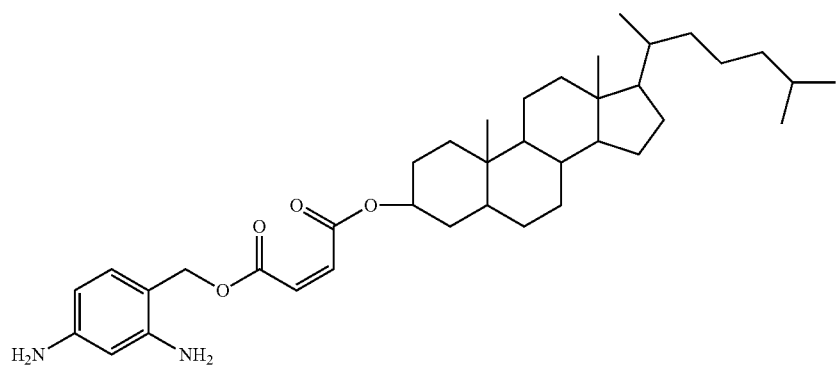
formula (1-4)
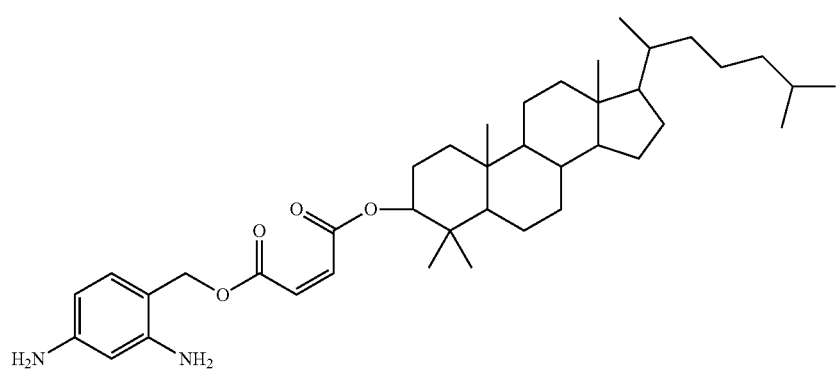
formula (1-5)
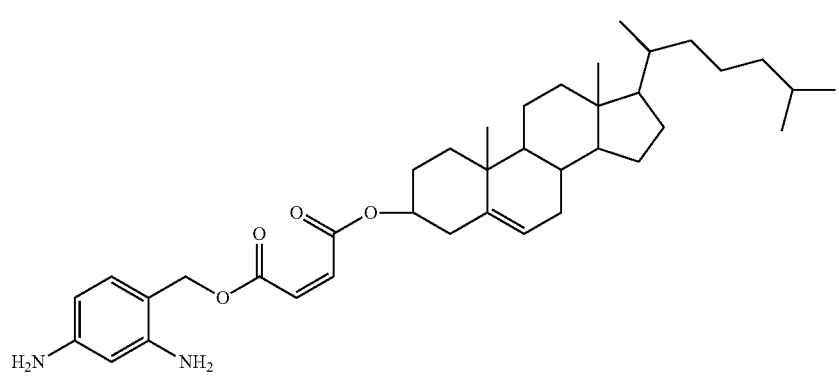
formula (1-6)

formula (1-7)
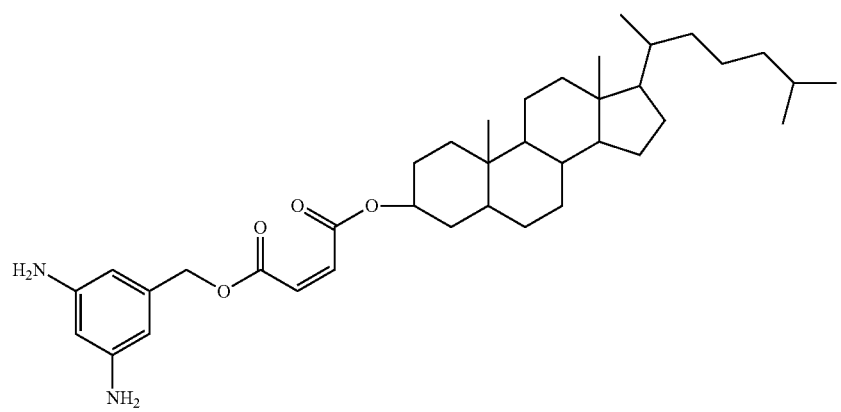
formula (1-8)
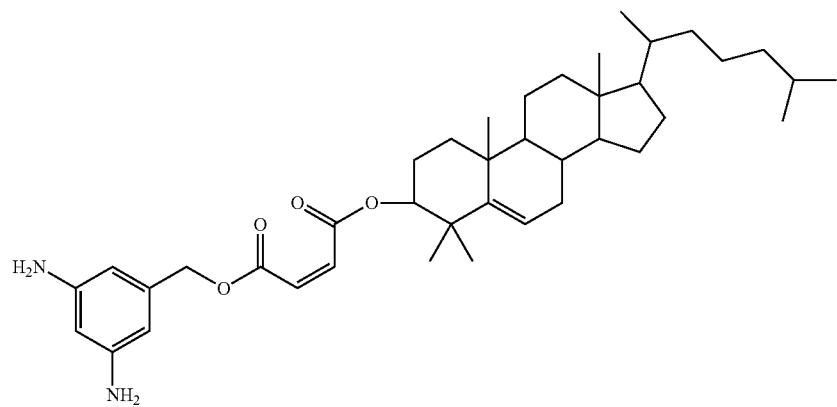
formula (1-9)
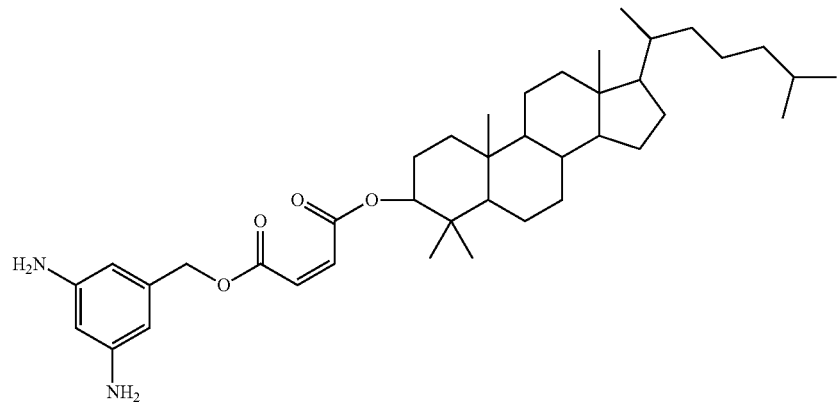
formula (1-10)
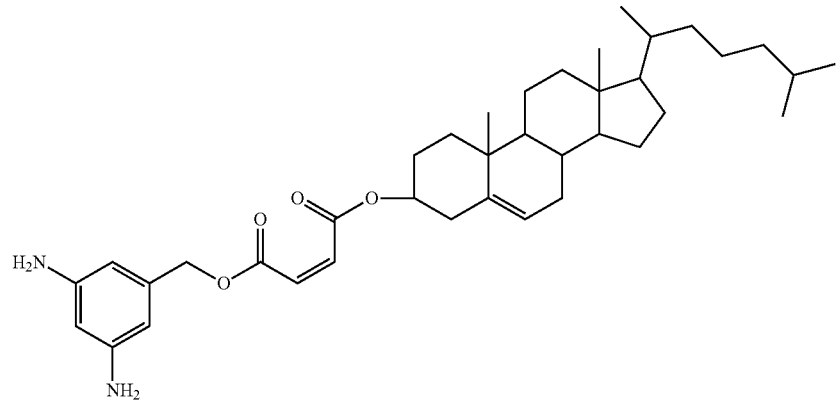

formula (1-11)
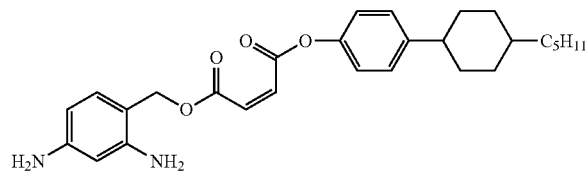
formula (1-12)
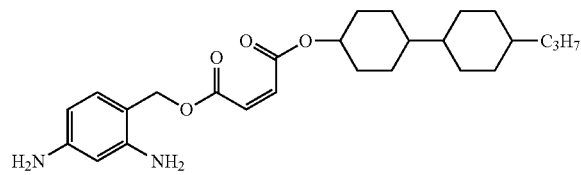
formula (1-13)
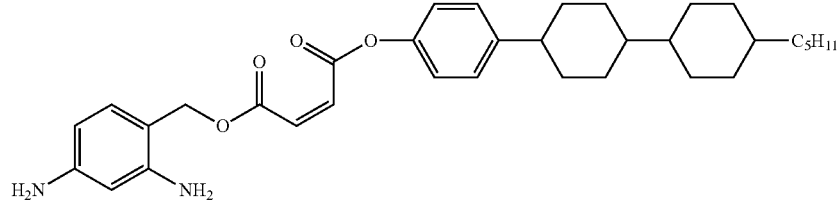
formula (1-14)
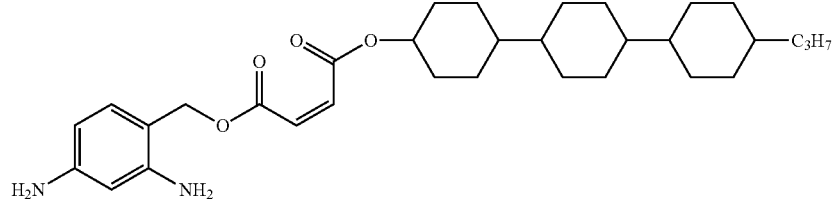
formula (1-15)
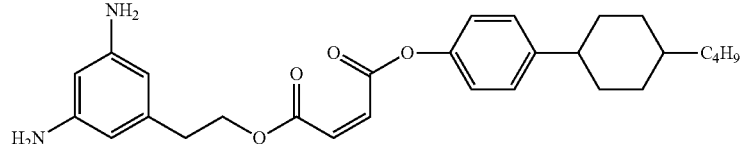
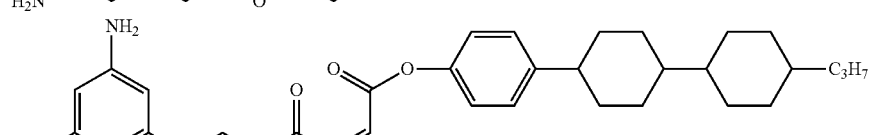
formula (1-17)
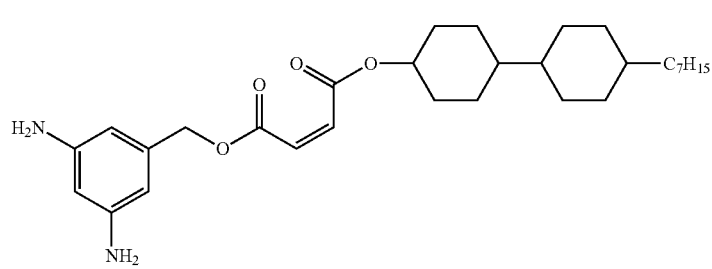
formula (1-18)
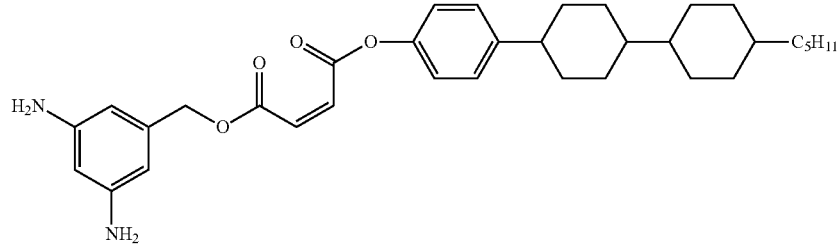
formula (1-19)
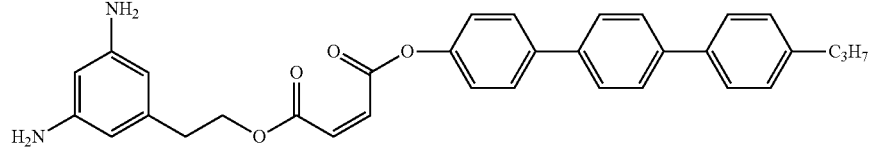

The diamine compound (b-1) can be prepared by a general organic synthesis method. For instance, the compounds represented by formula (1-2) to formula (1-19) can respectively be formed by first adding a maleic anhydride on a compound having a steroid skeleton or a compound represented by formula (1-20). Next, under the existence of potassium carbonate, a dinitrobenzoyl chloride compound is added to perform an esterification reaction. Then, a reduction reaction is performed by adding a suitable reducing agent such as tin chloride to synthesize the diamine compound (b-1).

formula (1-20)

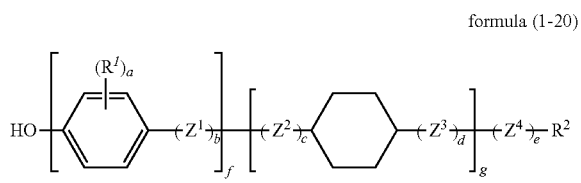

In formula (1-20), the definition of each of $R^1$, $R^2$, $Z^1$, $Z^2$, $Z^3$, $Z^4$, a, b, c, d, e, and g is respectively the same as the definition of each of $R^1$, $R^2$, $Z^1$, $Z^2$, $Z^3$, $Z^4$, a, b, c, d, e, f, and g in formula (1-1), and is not repeated herein.

The compound represented by formula (1-20) can be synthesized by a general method such as a Grignard reaction or a Friedal-Crafts acylation reaction for synthesizing a liquid crystal compound.

Based on a usage amount of 100 moles of the compound (b), the usage amount of the diamine compound (b-1) can be 0.3 moles to 10 moles, preferably 0.4 moles to 8 moles, and more preferably 0.5 moles to 5 moles.

Diamine Compound (b-2)

The diamine compound (b-2) is a compound represented by formula (2).

formula (2)

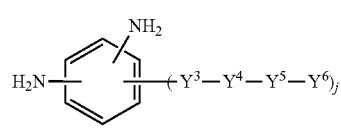

$Y^3$ each independently represents

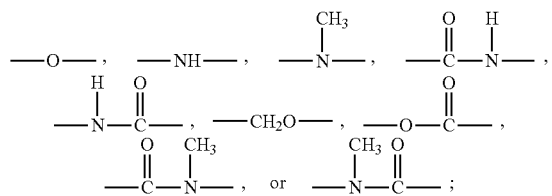

$Y^4$ each independently represents a single bond, a $C_1$ to $C_{20}$ divalent aliphatic hydrocarbon group, a divalent alicyclic hydrocarbon group, or a divalent aromatic hydrocarbon group; $Y^5$ each independently represents a single bond,

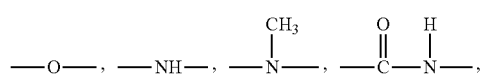

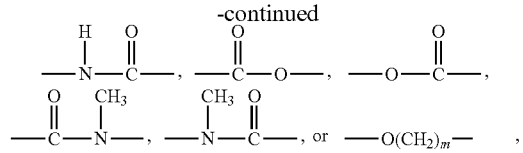

wherein m represents an integer of 1 to 5; $Y^6$ each independently represents a nitrogen-containing aromatic heterocyclic group; and j represents an integer of 1 to 4.

Specifically, the bonding positions of the 2 amino groups (—$NH_2$) in formula (2) are not particularly limited. Specific examples include a bonding group ($Y^3$) relative to a side chain, and the 2 amino groups on the benzene ring are respectively, for instance, 2,3 positions, 2,4 positions, 2,5 positions, 2,6 positions, 3,4 positions, or 3,5 positions. In particular, from the viewpoint of reactivity when polyamic acid is synthesized, the bonding positions of the 2 amino groups are preferably 2,4 positions, 2,5 positions, or 3,5 positions. In terms of ease of synthesizing the diamine compound, the bonding positions of the 2 amino groups are more preferably 2,4 positions or 2,5 positions.

In formula (2), $Y^3$ each independently represents

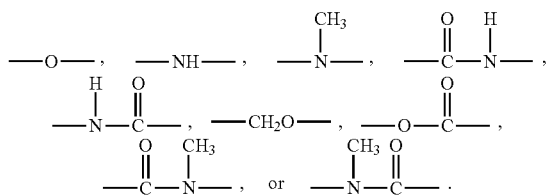

In particular, in terms of ease of synthesizing the diamine compound, $Y^3$ preferably each independently represents

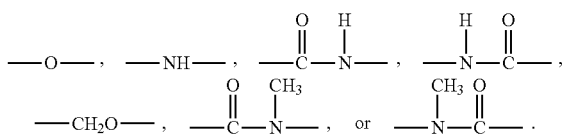

In formula (2), $Y^4$ each independently represents a single bond, a $C_1$ to $C_{20}$ divalent aliphatic hydrocarbon group, a divalent alicyclic hydrocarbon group, or a divalent aromatic hydrocarbon group. The $C_1$ to $C_{20}$ divalent aliphatic hydrocarbon group can be straight-chain or branched-chain, can also have an unsaturated bond, and is preferably a $C_1$ to $C_{10}$ divalent aliphatic hydrocarbon group. Specific examples of the alicyclic ring in the divalent alicyclic hydrocarbon group include, for instance, a cyclopropane ring, a cyclobutane ring, a cyclopentane ring, a cyclohexane ring, a cycloheptane ring, a cyclooctane ring, a cyclononane ring, a cyclodecane ring, cyclododecane ring, a cyclododecane ring, a cyclotridecane ring, a cyclotetradecane ring, a cyclopentadecane ring, a cyclohexadecane ring, a cycloheptadecane ring, a cyclooctadecane ring, a cyclononadecane ring, a cycloeicosane ring, a tricycloeicosane ring, a tricyclodocosane ring, a bicycloheptane ring, a decahydronaphthalene ring, a norbornene ring, or an adamantane ring.

Specific examples of the aromatic ring in the divalent aromatic hydrocarbon group include, for instance, a benzene ring, a naphthalene ring, a tetrahydronaphthalene ring, an azulene ring, an indene ring, a fluorene ring, an anthracene ring, a phenanthrene ring, or a phenalene ring.

Specifically, in formula (2), $Y^4$ preferably each independently represents a single bond, a $C_1$ to $C_{10}$ straight-chain or branched-chain alkylene group, a $C_1$ to $C_{10}$ straight-chain or branched-chain alkenylene group, a $C_1$ to $C_{10}$ straight-chain or branched-chain alkynylene group, a divalent alicyclic hydrocarbon group, or a divalent aromatic hydrocarbon group, wherein the alicyclic ring is a cyclopropane ring, a cyclobutane ring, a cyclopentane ring, a cyclohexane ring, a cycloheptane ring, a norbornene ring, or an adamantane ring, and the aromatic ring is a benzene ring, a naphthalene ring, a tetrahydronaphthalene ring, a fluorene ring, or an anthracene ring. $Y^4$ more preferably each independently represents a single bond, a $C_1$ to $C_{10}$ straight-chain or branched-chain alkylene group, a $C_1$ to $C_{10}$ straight-chain or branched-chain alkenylene group, a divalent alicyclic hydrocarbon group, or a divalent aromatic hydrocarbon group, wherein the alicyclic ring is a cyclohexane ring, a norbornene ring, or an adamantane ring, and the aromatic ring is a benzene ring, a naphthalene ring, a fluorene ring, or an anthracene ring. $Y^4$ yet more preferably each independently represents a single bond, a $C_1$ to $C_{10}$ straight-chain or branched-chain alkylene group, a cyclohexylene group, a phenylene group, or a naphthylene group. $Y^4$ even more preferably each independently represents a single bond, a $C_1$ to $C_5$ straight-chain or branched-chain alkylene group, or a phenylene group.

In formula (2), $Y^5$ each independently represents a single bond,

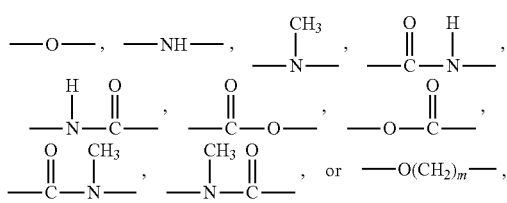

wherein in represents an integer of 1 to 5. Y preferably each independently represents a single bond,

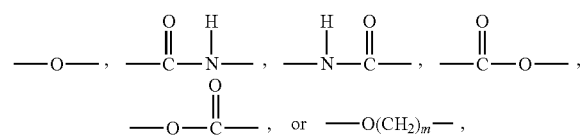

wherein in represents an integer of 1 to 5.

In formula (2), $Y^6$ each independently represents a nitrogen-containing aromatic heterocyclic group. Specifically, the nitrogen-containing aromatic heterocyclic group is a nitrogen-containing aromatic heterocyclic group containing at least one structure selected from the group consisting of formula (2a), formula (2b), and formula (2c).

formula (2a)

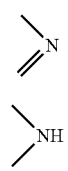

formula (2b)

formula (2c)

In formula (2c), $R^3$ represents a $C_1$ to $C_5$ straight-chain or branched-chain alkylene group.

Specific examples of the nitrogen-containing aromatic heterocyclic group in $Y^6$ include a pyrrole ring, an imidazole ring, an oxazole ring, a thiazole ring, a pyrazole ring, a pyridine ring, a pyrimidine ring, a quinoline ring, a pyrazoline ring, an isoquinoline ring, a carbazole ring, a purine ring, a thiadiazole ring, a pyridazine ring, a triazine ring, a pyrazolidine ring, a triazole ring, a pyrazine ring, a benzimidazole ring, a phenanthroline ring, an indole ring, a quinoxaline ring, a benzothiazole ring, a phenothiazine ring, an oxadiazole ring, or an acridine ring. Specifically, $Y^6$ preferably each independently represents a pyrrolyl group, an imidazolyl group, a pyrazolyl group, a pyridyl group, a pyrimidinyl group, a pyridazinyl group, a triazinyl group, a triazolyl group, a pyrazinyl group, or a benzimidazolyl group. From the viewpoint of ultraviolet reliability, $Y^6$ more preferably each independently represents a pyrrolyl group, an imidazolyl group, a pyrazolyl group, a pyridyl group, or a pyrimidinyl group.

Moreover, $Y^5$ is preferably bonded to a substituent not adjacent to formula (2a), formula (2b), and formula (2c) contained in $Y^6$.

In formula (2), j represents an integer of 1 to 4. Moreover, from the viewpoint of reactivity with the tetracarboxylic dianhydride compound, j preferably represents an integer of 1 to 3.

In formula (2), a preferred combination of $Y^3$, $Y^4$, $Y^5$, $Y^6$, and j is: $Y^3$ is

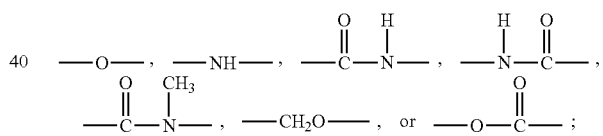

$Y^4$ is a $C_1$ to $C_{10}$ straight-chain or branched-chain alkylene group, a $C_1$ to $C_{10}$ straight-chain or branched-chain alkenylene group, a divalent alicyclic hydrocarbon group, or a divalent aromatic hydrocarbon group, wherein the alicyclic ring is a cyclopropane ring, a cyclobutane ring, a cyclopentane ring, a cyclohexane ring, a cycloheptane ring, a norbornene ring, or an adamantane ring, and the aromatic ring is a benzene ring, a naphthalene ring, a tetrahydronaphthalene ring, a fluorene ring, or an anthracene ring; $Y^5$ is a single bond,

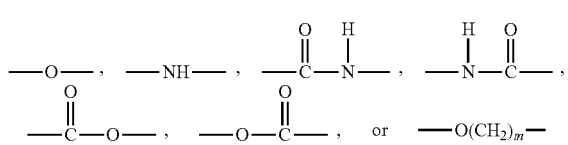

(m is an integer of 1 to 5); the nitrogen-containing aromatic heterocyclic ring in $Y^6$ is a pyrrole ring, an imidazole ring, an oxazole ring, a thiazole ring, a pyrazole ring, a pyridine ring, a pyrimidine ring, a quinoline ring, a pyrazoline ring, an isoquinoline ring, a carbazole ring, a purine ring, a thiadiazole ring, a pyridazine ring, a triazine ring, a pyrazolidine ring, a triazole ring, a pyrazine ring, a benzimidazole ring, a phenanthroline ring, an indole ring, a quinoxaline ring, a benzothiazole ring, a phenothiazine ring, an oxadiazole ring, or an acridine ring; and j is 1 or 2.

In formula (2), a no e preferred combination of $Y^3$, $Y^4$, $Y^5$, $Y^6$, and j is: $Y^3$ is

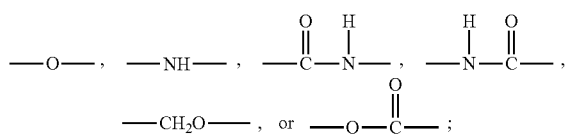

$Y^4$ is a $C_1$ to $C_{10}$ straight-chain or branched-chain alkylene group, a $C_1$ to $C_{10}$ straight-chain or branched-chain alkenylene group, a divalent alicyclic hydrocarbon group, or a divalent aromatic hydrocarbon group, wherein the alicyclic ring is a cyclohexane ring, a norbornene ring, or an adamantane ring, and the aromatic ring is a benzene ring, a naphthalene ring, a fluorene ring, or an anthracene ring; $Y^5$ is a single bond,

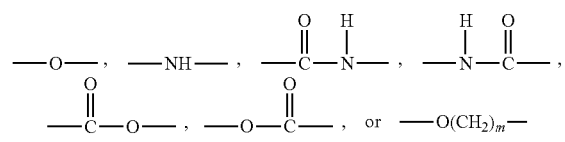

(m is an integer of 1 to 5); $Y^6$ is a pyrrolyl group, an imidazolyl group, a pyrazolyl group, a pyridyl group, a pyrimidinyl group, a pyrazolinyl group, a carbazolyl group, a pyridazinyl group, a pyrazolinyl group, a triazinyl group, a pyrazolidinyl group a triazolyl group, a pyrazinyl group, or a benzimidazolyl group; and j is 1 or 2.

In formula (2), an even more preferred combination of $Y^3$, $Y^4$, $Y^5$, $Y^6$, and j is: $Y^3$ is

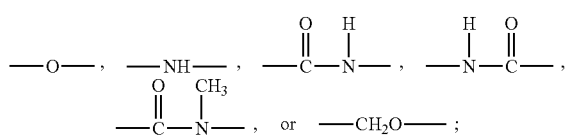

$Y^4$ is a $C_1$ to $C_5$ straight-chain or branched-chain alkylene group or a phenylene group; $Y^5$ is a single bond,

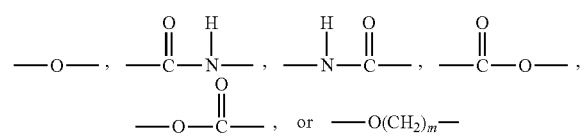

(m is an integer of 1 to 5); $Y^6$ is a pyrrolyl group, an imidazolyl group, a pyrazolyl group, a pyridyl group, or a pyrimidinyl group; and j is 1, 2, or 3.

Specific examples of the diamine compound (b-2) include a diamine compound formed by a combination of $Y^3$, $Y^4$, $Y^5$, $Y^6$, and j of Table I to Table VIII.

TABLE I

| Diamine compound (b-2) NO. | $Y^3$ | $Y^4$ | $Y^5$ | $Y^6$ |
|---|---|---|---|---|
| 1 | —O— | $C_1$ to $C_5$ straight-chain or branched-chain alkylene group | single bond | pyrrolyl group |
| 2 | —O— | $C_1$ to $C_5$ straight-chain or branched-chain alkylene group | single bond | imidazole group |
| 3 | —O— | $C_1$ to $C_5$ straight-chain or branched-chain alkylene group | single bond | pyrazolyl group |
| 4 | —O— | $C_1$ to $C_5$ straight-chain or branched-chain alkylene group | single bond | pyridyl group |
| 5 | —O— | $C_1$ to $C_5$ straight-chain or branched-chain alkylene group | single bond | pyrimidinyl group |
| 6 | —NH— | $C_1$ to $C_5$ straight-chain or branched-chain alkylene group | single bond | pyrrolyl group |
| 7 | —NH— | $C_1$ to $C_5$ straight-chain or branched-chain alkylene group | single bond | imidazole group |
| 8 | —NH— | $C_1$ to $C_5$ straight-chain or branched-chain alkylene group | single bond | pyrazolyl group |
| 9 | —NH— | $C_1$ to $C_5$ straight-chain or branched-chain alkylene group | single bond | pyridyl group |
| 10 | —NH— | $C_1$ to $C_5$ straight-chain or branched-chain alkylene group | single bond | pyrimidinyl group |
| 11 | —C(=O)—NH— | $C_1$ to $C_5$ straight-chain or branched-chain alkylene group | single bond | pyrrolyl group |
| 12 | —C(=O)—NH— | $C_1$ to $C_5$ straight-chain or branched-chain alkylene group | single bond | imidazole group |
| 13 | —C(=O)—NH— | $C_1$ to $C_5$ straight-chain or branched-chain alkylene group | single bond | pyrazolyl group |
| 14 | —C(=O)—NH— | $C_1$ to $C_5$ straight-chain or branched-chain alkylene group | single bond | pyridyl group |
| 15 | —C(=O)—NH— | $C_1$ to $C_5$ straight-chain or branched-chain alkylene group | single bond | pyrimidinyl group |
| 16 | —NH—C(=O)— | $C_1$ to $C_5$ straight-chain or branched-chain alkylene group | single bond | pyrrolyl group |
| 17 | —NH—C(=O)— | $C_1$ to $C_5$ straight-chain or branched-chain alkylene group | single bond | imidazole group |
| 18 | —NH—C(=O)— | $C_1$ to $C_5$ straight-chain or branched-chain alkylene group | single bond | pyrazolyl group |
| 19 | —NH—C(=O)— | $C_1$ to $C_5$ straight-chain or branched-chain alkylene group | single bond | pyridyl group |
| 20 | —NH—C(=O)— | $C_1$ to $C_5$ straight-chain or branched-chain alkylene group | single bond | pyrimidinyl group |

TABLE II

| Diamine compound (b-2) NO. | Y³ | Y⁴ | Y⁵ | Y⁶ |
|---|---|---|---|---|
| 21 | —CH₂O— | C₁ to C₅ straight-chain or branched-chain alkylene group | single bond | pyrrolyl group |
| 22 | —CH₂O— | C₁ to C₅ straight-chain or branched-chain alkylene group | single bond | imidazole group |
| 23 | —CH₂O— | C₁ to C₅ straight-chain or branched-chain alkylene group | single bond | pyrazolyl group |
| 24 | —CH₂O— | C₁ to C₅ straight-chain or branched-chain alkylene group | single bond | pyridyl group |
| 25 | —CH₂O— | C₁ to C₅ straight-chain or branched-chain alkylene group | single bond | pyrimidinyl group |
| 26 | —C(=O)—N(CH₃)— | C₁ to C₅ straight-chain or branched-chain alkylene group | single bond | pyrrolyl group |
| 27 | —C(=O)—N(CH₃)— | C₁ to C₅ straight-chain or branched-chain alkylene group | single bond | imidazole group |
| 28 | —C(=O)—N(CH₃)— | C₁ to C₅ straight-chain or branched-chain alkylene group | single bond | pyrazolyl group |
| 29 | —C(=O)—N(CH₃)— | C₁ to C₅ straight-chain or branched-chain alkylene group | single bond | pyridyl group |
| 30 | —C(=O)—N(CH₃)— | C₁ to C₅ straight-chain or branched-chain alkylene group | single bond | pyrimidinyl group |

TABLE III

| Diamine compound (b-2) NO. | Y³ | Y⁴ | Y⁵ | Y⁶ |
|---|---|---|---|---|
| 31 | —O— | phenylene group | —O— | pyrrolyl group |
| 32 | —O— | phenylene group | —O— | imidazole group |
| 33 | —O— | phenylene group | —O— | pyrazolyl group |
| 34 | —O— | phenylene group | —O— | pyridyl group |
| 35 | —O— | phenylene group | —C(=O)—NH— | pyrimidinyl group |
| 36 | —O— | phenylene group | —C(=O)—NH— | pyrrolyl group |
| 37 | —O— | phenylene group | —C(=O)—NH— | imidazole group |
| 38 | —O— | phenylene group | —C(=O)—NH— | pyrazolyl group |
| 39 | —O— | phenylene group | —NH—C(=O)— | pyridyl group |
| 40 | —O— | phenylene group | —NH—C(=O)— | pyrimidinyl group |
| 41 | —O— | phenylene group | —NH—C(=O)— | pyrrolyl group |
| 42 | —O— | phenylene group | —NH—C(=O)— | imidazole group |
| 43 | —O— | phenylene group | —C(=O)— | pyrazolyl group |
| 44 | —O— | phenylene group | —C(=O)—O— | pyridyl group |
| 45 | —O— | phenylene group | —C(=O)—O— | pyrimidinyl group |
| 46 | —O— | phenylene group | —C(=O)—O— | pyrrolyl group |
| 47 | —O— | phenylene group | —O—C(=O)— | imidazole group |
| 48 | —O— | phenylene group | —O—C(=O)— | pyrazolyl group |
| 49 | —O— | phenylene group | —O—C(=O)— | pyridyl group |
| 50 | —O— | phenylene group | —O—C(=O)— | pyrimidinyl group |
| 51 | —O— | phenylene group | —O(CH₂)ₘ— (m: 1 to 5) | pyrrolyl group |
| 52 | —O— | phenylene group | —O(CH₂)ₘ— (m: 1 to 5) | imidazole group |
| 53 | —O— | phenylene group | —O(CH₂)ₘ— (m: 1 to 5) | pyrazolyl group |
| 54 | —O— | phenylene group | —O(CH₂)ₘ— (m: 1 to 5) | pyridyl group |
| 55 | —NH— | phenylene group | —O— | pyrrolyl group |
| 56 | —NH— | phenylene group | —O— | imidazole group |
| 57 | —NH— | phenylene group | —O— | pyrazolyl group |
| 58 | —NH— | phenylene group | —O— | pyridyl group |
| 59 | —NH— | phenylene group | —C(=O)—NH— | pyrimidinyl group |
| 60 | —NH— | phenylene group | —C(=O)—NH— | pyrrolyl group |

TABLE IV

| Diamine compound (b-2) NO. | $Y^3$ | $Y^4$ | $Y^5$ | $Y^6$ |
|---|---|---|---|---|
| 61 | —NH— | phenylene group | —C(=O)—NH— | imidazole group |
| 62 | —NH— | phenylene group | —C(=O)—NH— | pyrazolyl group |
| 63 | —NH— | phenylene group | —NH—C(=O)— | pyridyl group |
| 64 | —NH— | phenylene group | —NH—C(=O)— | pyrimidinyl group |
| 65 | —NH— | phenylene group | —NH—C(=O)— | pyrrolyl group |
| 66 | —NH— | phenylene group | —NH—C(=O)— | imidazole group |
| 67 | —NH— | phenylene group | —C(=O)—O— | pyrazolyl group |
| 68 | —NH— | phenylene group | —C(=O)—O— | pyridyl group |
| 69 | —NH— | phenylene group | —C(=O)—O— | pyrimidinyl group |
| 70 | —NH— | phenylene group | —C(=O)—O— | pyrrolyl group |
| 71 | —NH— | phenylene group | —O—C(=O)— | imidazole group |
| 72 | —NH— | phenylene group | —O—C(=O)— | pyrazolyl group |
| 73 | —NH— | phenylene group | —O—C(=O)— | pyridyl group |
| 74 | —NH— | phenylene group | —O—C(=O)— | pyrimidinyl group |
| 75 | —NH— | phenylene group | —O(CH$_2$)$_m$— (m: 1 to 5) | pyrrolyl group |
| 76 | —NH— | phenylene group | —O(CH$_2$)$_m$— (m: 1 to 5) | imidazole group |
| 77 | —NH— | phenylene group | —O(CH$_2$)$_m$— (m: 1 to 5) | pyrazolyl group |
| 78 | —NH— | phenylene group | —O(CH$_2$)$_m$— (m: 1 to 5) | pyridyl group |

TABLE V

| Diamine compound (b-2) NO. | $Y^3$ | $Y^4$ | $Y^5$ | $Y^6$ |
|---|---|---|---|---|
| 79 | —C(=O)—NH— | phenylene group | —O— | pyrrolyl group |
| 80 | —C(=O)—NH— | phenylene group | —O— | imidazole group |
| 81 | —C(=O)—NH— | phenylene group | —O— | pyrazolyl group |
| 82 | —C(=O)—NH— | phenylene group | —O— | pyridyl group |
| 83 | —C(=O)—NH— | phenylene group | —C(=O)—NH— | pyrimidinyl group |
| 84 | —C(=O)—NH— | phenylene group | —C(=O)—NH— | pyrrolyl group |
| 85 | —C(=O)—NH— | phenylene group | —C(=O)—NH— | imidazole group |
| 86 | —C(=O)—NH— | phenylene group | —C(=O)—NH— | pyrazolyl group |
| 87 | —C(=O)—NH— | phenylene group | —NH—C(=O)— | pyridyl group |
| 88 | —C(=O)—NH— | phenylene group | —NH—C(=O)— | pyrimidinyl group |
| 89 | —C(=O)—NH— | phenylene group | —NH—C(=O)— | pyrrolyl group |
| 90 | —C(=O)—NH— | phenylene group | —NH—C(=O)— | imidazole group |
| 91 | —C(=O)—NH— | phenylene group | —C(=O)—O— | pyrazolyl group |
| 92 | —C(=O)—NH— | phenylene group | —C(=O)—O— | pyridyl group |
| 93 | —C(=O)—NH— | phenylene group | —C(=O)—O— | pyrimidinyl group |
| 94 | —C(=O)—NH— | phenylene group | —C(=O)—O— | pyrrolyl group |
| 95 | —C(=O)—NH— | phenylene group | —O—C(=O)— | imidazole group |
| 96 | —C(=O)—NH— | phenylene group | —O—C(=O)— | pyrazolyl group |
| 97 | —C(=O)—NH— | phenylene group | —O—C(=O)— | pyridyl group |

TABLE V-continued

| Diamine compound (b-2) NO. | Y³ | Y⁴ | Y⁵ | Y⁶ |
|---|---|---|---|---|
| 98 | —C(=O)—N(H)— | phenylene group | —O—C(=O)— | pyrimidinyl group |
| 99 | —C(=O)—N(H)— | phenylene group | —O(CH₂)ₘ— (m: 1 to 5) | pyrrolyl group |
| 100 | —C(=O)—N(H)— | phenylene group | —O(CH₂)ₘ— (m: 1 to 5) | imidazole group |
| 101 | —C(=O)—N(H)— | phenylene group | —O(CH₂)ₘ— (m: 1 to 5) | pyrazolyl group |
| 102 | —C(=O)—N(H)— | phenylene group | —O(CH₂)ₘ— (m: 1 to 5) | pyridyl group |
| 103 | —N(H)—C(=O)— | phenylene group | —O— | pyrrolyl group |
| 104 | —N(H)—C(=O)— | phenylene group | —O— | imidazole group |
| 105 | —N(H)—C(=O)— | phenylene group | —O— | pyrazolyl group |
| 106 | —N(H)—C(=O)— | phenylene group | —O— | pyridyl group |
| 107 | —N(H)—C(=O)— | phenylene group | —C(=O)—N(H)— | pyrimidinyl group |
| 108 | —N(H)—C(=O)— | phenylene group | —C(=O)—N(H)— | pyrrolyl group |
| 109 | —N(H)—C(=O)— | phenylene group | —C(=O)—N(H)— | imidazole group |
| 110 | —N(H)—C(=O)— | phenylene group | —C(=O)—N(H)— | pyrazolyl group |

TABLE VI

| Diamine compound (b-2) NO. | Y³ | Y⁴ | Y⁵ | Y⁶ |
|---|---|---|---|---|
| 111 | —N(H)—C(=O)— | phenylene group | —N(H)—C(=O)— | pyridyl group |
| 112 | —N(H)—C(=O)— | phenylene group | —N(H)—C(=O)— | pyrimidinyl group |
| 113 | —N(H)—C(=O)— | phenylene group | —N(H)—C(=O)— | pyrrolyl group |
| 114 | —N(H)—C(=O)— | phenylene group | —N(H)—C(=O)— | imidazole group |
| 115 | —N(H)—C(=O)— | phenylene group | —C(=O)—O— | pyrazolyl group |
| 116 | —N(H)—C(=O)— | phenylene group | —C(=O)—O— | pyridyl group |
| 117 | —N(H)—C(=O)— | phenylene group | —C(=O)—O— | pyrimidinyl group |
| 118 | —N(H)—C(=O)— | phenylene group | —C(=O)—O— | pyrrolyl group |
| 119 | —N(H)—C(=O)— | phenylene group | —O—C(=O)— | imidazole group |
| 120 | —N(H)—C(=O)— | phenylene group | —O—C(=O)— | pyrazolyl group |
| 121 | —N(H)—C(=O)— | phenylene group | —O—C(=O)— | pyridyl group |
| 122 | —N(H)—C(=O)— | phenylene group | —O—C(=O)— | pyrimidinyl group |
| 123 | —N(H)—C(=O)— | phenylene group | —O(CH₂)ₘ— (m: 1 to 5) | pyrrolyl group |
| 124 | —N(H)—C(=O)— | phenylene group | —O(CH₂)ₘ— (m: 1 to 5) | imidazole group |
| 125 | —N(H)—C(=O)— | phenylene group | —O(CH₂)ₘ— (m: 1 to 5) | pyrazolyl group |
| 126 | —N(H)—C(=O)— | phenylene group | —O(CH₂)ₘ— (m: 1 to 5) | pyridyl group |

TABLE VII

| Diamine compound (b-2) NO. | Y³ | Y⁴ | Y⁵ | Y⁶ |
|---|---|---|---|---|
| 127 | —CH₂O— | phenylene group | —O— | pyrrolyl group |
| 128 | —CH₂O— | phenylene group | —O— | imidazole group |
| 129 | —CH₂O— | phenylene group | —O— | pyrazolyl group |
| 130 | —CH₂O— | phenylene group | —O— | pyridyl group |
| 131 | —CH₂O— | phenylene group | —C(=O)—N(H)— | pyrimidinyl group |

TABLE VII-continued

| Diamine compound (b-2) NO. | Y³ | Y⁴ | Y⁵ | Y⁶ |
|---|---|---|---|---|
| 132 | —CH₂O— | phenylene group | —C(=O)—N(H)— | pyrrolyl group |
| 133 | —CH₂O— | phenylene group | —C(=O)—N(H)— | imidazole group |
| 134 | —CH₂O— | phenylene group | —C(=O)—N(H)— | pyrazolyl group |
| 135 | —CH₂O— | phenylene group | —N(H)—C(=O)— | pyridyl group |
| 136 | —CH₂O— | phenylene group | —N(H)—C(=O)— | pyrimidinyl group |
| 137 | —CH₂O— | phenylene group | —N(H)—C(=O)— | pyrrolyl group |
| 138 | —CH₂O— | phenylene group | —N(H)—C(=O)— | imidazole group |
| 139 | —CH₂O— | phenylene group | —C(=O)—O— | pyrazolyl group |
| 140 | —CH₂O— | phenylene group | —C(=O)—O— | pyridyl group |
| 141 | —CH₂O— | phenylene group | —C(=O)—O— | pyrimidinyl group |
| 142 | —CH₂O— | phenylene group | —C(=O)—O— | pyrrolyl group |
| 143 | —CH₂O— | phenylene group | —O—C(=O)— | imidazole group |
| 144 | —CH₂O— | phenylene group | —O—C(=O)— | pyrazolyl group |
| 145 | —CH₂O— | phenylene group | —O—C(=O)— | pyridyl group |
| 146 | —CH₂O— | phenylene group | —O—C(=O)— | pyrimidinyl group |
| 147 | —CH₂O— | phenylene group | —O(CH₂)ₘ— (m: 1 to 5) | pyrrolyl group |
| 148 | —CH₂O— | phenylene group | —O(CH₂)ₘ— (m: 1 to 5) | imidazole group |
| 149 | —CH₂O— | phenylene group | —O(CH₂)ₘ— (m: 1 to 5) | pyrazolyl group |
| 150 | —CH₂O— | phenylene group | —O(CH₂)ₘ— (m: 1 to 5) | pyridyl group |
| 151 | —C(=O)—N(CH₃)— | phenylene group | —O— | pyrrolyl group |
| 152 | —C(=O)—N(CH₃)— | phenylene group | —O— | imidazole group |
| 153 | —C(=O)—N(CH₃)— | phenylene group | —O— | pyrazolyl group |
| 154 | —C(=O)—N(CH₃)— | phenylene group | —O— | pyridyl group |
| 155 | —C(=O)—N(CH₃)— | phenylene group | —C(=O)—N(H)— | pyrimidinyl group |

TABLE VIII

| Diamine compound (b-2) NO. | Y³ | Y⁴ | Y⁵ | Y⁶ |
|---|---|---|---|---|
| 156 | —C(=O)—N(CH₃)— | phenylene group | —C(=O)—N(H)— | pyrrolyl group |
| 157 | —C(=O)—N(CH₃)— | phenylene group | —C(=O)—N(H)— | imidazole group |
| 158 | —C(=O)—N(CH₃)— | phenylene group | —C(=O)—N(H)— | pyrazolyl group |
| 159 | —C(=O)—N(CH₃)— | phenylene group | —C(=O)—N(H)— | pyridyl group |
| 160 | —C(=O)—N(CH₃)— | phenylene group | —N(H)—C(=O)— | pyrimidinyl group |
| 161 | —C(=O)—N(CH₃)— | phenylene group | —N(H)—C(=O)— | pyrrolyl group |
| 162 | —C(=O)—N(CH₃)— | phenylene group | —N(H)—C(=O)— | imidazole group |
| 163 | —C(=O)—N(CH₃)— | phenylene group | —N(H)—C(=O)— | pyrazolyl group |
| 164 | —C(=O)—N(CH₃)— | phenylene group | —C(=O)—O— | pyridyl group |
| 165 | —C(=O)—N(CH₃)— | phenylene group | —C(=O)—O— | pyrimidinyl group |
| 166 | —C(=O)—N(CH₃)— | phenylene group | —C(=O)—O— | pyrrolyl group |
| 167 | —C(=O)—N(CH₃)— | phenylene group | —C(=O)—O— | imidazole group |

TABLE VIII-continued

| Diamine compound (b-2) NO. | $Y^3$ | $Y^4$ | $Y^5$ | $Y^6$ |
|---|---|---|---|---|
| 168 | —C(=O)—N(CH₃)— | phenylene group | —O—C(=O)— | pyrazolyl group |
| 169 | —C(=O)—N(CH₃)— | phenylene group | —O—C(=O)— | pyridyl group |
| 170 | —C(=O)—N(CH₃)— | phenylene group | —O—C(=O)— | pyrimidinyl group |
| 171 | —C(=O)—N(CH₃)— | phenylene group | —O—C(=O)— | pyrrolyl group |
| 172 | —C(=O)—N(CH₃)— | phenylene group | —O(CH₂)$_m$— (m: 1 to 5) | imidazole group |
| 173 | —C(=O)—N(CH₃)— | phenylene group | —O(CH₂)$_m$— (m: 1 to 5) | pyrazolyl group |
| 174 | —C(=O)—N(CH₃)— | phenylene group | —O(CH₂)$_m$— (m: 1 to 5) | pyridyl group |

The method of making the diamine compound (b-2) of the invention is not particularly limited, and can include, for instance, the following method: a dinitro compound represented by formula (2d) is first synthesized, and then the nitro groups are reduced to amino groups under the existence of a catalyst, a solvent, and a hydride.

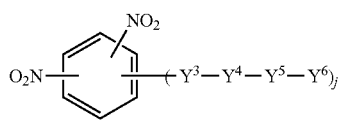

formula (2d)

In formula (2d), $Y^3$, $Y^4$, $Y^5$, $Y^6$, and j are respectively defined the same as $Y^3$, $Y^4$, $Y^5$, $Y^6$, and j in formula (2) and are not repeated herein.

Specific examples of the catalyst are not particularly limited, but can include, palladium-carbon, platinum dioxide, raney nickel, platinum black, rhodium-alumina, platinum on activated carbon sulfide, or a combination of the catalysts. Specific examples of the solvent are not particularly limited, but can include ethyl acetate, toluene, tetrahydrofuran, dioxane, alcohol, or a combination of the solvents. Specific examples of the hydride are not particularly limited, but can include hydrogen gas, hydrazine, hydrogen chloride, or a combination of the compounds.

The dinitro compound represented by formula (2d) is synthesized by a method in which $Y^4$ and $Y^6$ are first bonded through $Y^5$, and then $Y^4$ and a benzene ring containing a dinitro group are bonded through $Y^3$. Alternatively, the dinitro compound represented by formula (2d) is synthesized by a method in which a benzene ring containing a dinitro group and $Y^4$ are first bonded through $Y^3$, and then $Y^4$ and $Y^6$ are bonded through $Y^5$.

Y is a bonding group such as

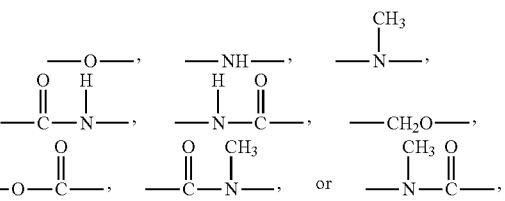

and the bonding groups can be formed by a known organic synthesis method.

For instance, in the case that $Y^3$ is —O— or —CH₂O—, the dinitro compound represented by formula (2d) can be obtained by reacting a halogen derivative containing a dinitro group and a hydroxyl derivative containing $Y^4$, $Y^5$, and $Y^6$ under the existence of a base. Alternatively, the dinitro compound represented by formula (2d) can be obtained by reacting a hydroxyl derivative containing a dinitro group and a halogen derivative containing $Y^4$, $Y^5$, and $Y^6$ under the existence of a base.

In the case that $Y^3$ is —NH—, the dinitro compound represented by formula (2d) can be obtained by reacting a halogen derivative containing a dinitro group and an amino group-substituted derivative containing $Y^4$, $Y^5$, and $Y^6$ under the existence of a base.

In the case that $Y^3$ is

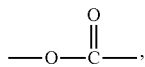

the dinitro compound represented by formula (2d) can be obtained by reacting a hydroxyl derivative containing a dinitro group and an acid chloride compound containing $Y^4$, $Y^5$, and $Y^6$ under the existence of a base.

In the case that $Y^3$ is

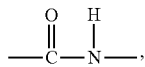

the dinitro compound represented by formula (2d) can be obtained by reacting an acid chloride compound containing a dinitro group and an amino group-substituted compound containing $Y^4$, $Y^5$, and $Y^6$ under the existence of a base.

In the case that $Y^3$ is

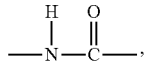

the dinitro compound represented by formula (2d) can be obtained by reacting an amino group-substituted compound and an acid chloride compound containing a dinitro group and containing $Y^4$, $Y^5$, and $Y^6$ under the existence of a base.

Specific examples of the halogen derivative containing a dinitro group and the derivative containing a dinitro group include 3,5-dinitrochlorobenzene, 2,4-dinitrochlorobenzene, 2,4-dinitro fluorobenzene, 3,5-dinitro benzoyl chloride, 3,5-dinitrobenzoic acid, 2,4-dinitrobenzoyl chloride, 2,4-dinitrobenzoic acid, 3,5-dinitro benzyl chloride, 2,4-dinitrobenzyl chloride, 3,5-dinitrobenzyl alcohol, 2,4-dinitrobenzyl alcohol, 2,4-dinitroaniline, 3,5-dinitroaniline, 2,6-dinitroaniline, 2,4-dinitrophenol, 2,5-dinitrophenol, 2,6-dinitrophenol, or 2,4-dinitrophenylacetic acid. The halogen derivative containing a dinitro group and the derivative containing a dinitro group can be used alone or in multiple combinations based on the obtainability and the reactivity of the raw materials.

Based on a usage amount of 100 moles of the compound (b), the usage amount of the diamine compound (b-2) can be 0.3 moles to 10 moles, preferably 0.4 moles to 8 moles, and more preferably 0.5 moles to 5 moles.

Moreover, when the diamine compound (b-2) contains a pyrrole group, an imidazole group, a pyrazole group, a pyridine group, or a pyrimidine group, the ultraviolet reliability of the formed liquid crystal alignment film can be further improved.

Compound (b-3)

The compound (b-3) is, for instance, at least one selected from the group consisting of a structure represented by formula (3-1) and a structure represented by formula (3-2).

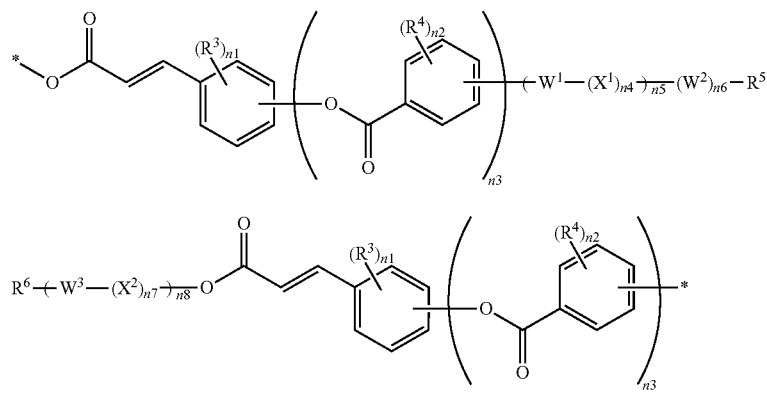

formula (3-1)

formula (3-2)

In formula (3-1), $R^3$ and $R^4$ each independently represent a $C_1$ to $C_6$ alkyl group, a $C_1$ to $C_6$ alkoxy group, a halogen atom, or a cyano group; $R^5$ represents a $C_1$ to $C_{40}$ alkyl group or a $C_1$ to $C_{40}$ alkyl group substituted by a fluorine atom, $W^1$ and $W^2$ each independently represent

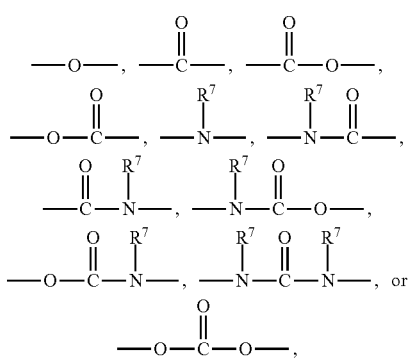

herein $R^7$ represents a hydrogen atom or a $C_1$ to $C_4$ alkyl group; $X^1$ represents a methylene group, an arylene group, a divalent alicyclic group, —Si(CH$_3$)$_2$—, —CH=CH—, —C≡C—, a methylene group having a substituent, an arylene group having a substituent, a divalent alicyclic group having a substituent, —Si(CH$_3$)$_2$— having a substituent, or —CH=CH— having a substituent, wherein the substituent is a cyano group, a halogen atom, or a $C_1$ to $C_4$ alkyl group; n1 and n2 each independently represent an integer of 0 to 4; n3 represents an integer of 0 or 1; n4 represents an integer of 1 to 6; n5 represents an integer of 0 to 2; n6 represents 0 or 1; and * each independently represents a bonding position of a structure containing a diamino group In formula (3-2), $R^3$ and $R^4$ each independently represent a $C_1$ to $C_6$ alkyl group, a $C_1$ to $C_6$ alkoxy group, a halogen atom, or a cyano group; $R^6$ represents a $C_1$ to $C_{40}$ alkyl group or a $C_1$ to $C_{40}$ alkyl group substituted by a fluorine atom; $W^3$ represents

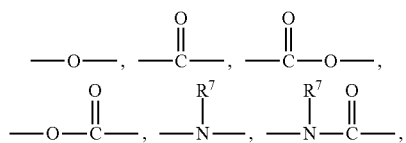

-continued

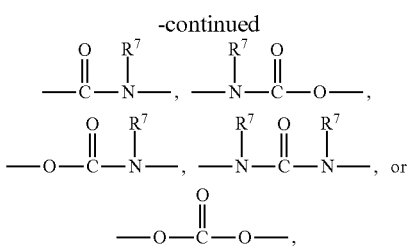

wherein $R^7$ represents a hydrogen atom or a $C_1$ to $C_4$ alkyl group; $X^2$ represents a methylene group, an arylene group, a divalent alicyclic group, —Si(CH$_3$)$_2$—, —CH=CH—, —C≡C—, a methylene group having a substituent, an arylene group having a substituent, a divalent alicyclic group having a substituent, —Si(CH$_3$)$_2$— having a substituent, or —CH=CH— having a substituent, wherein the substituent is a cyano group, a halogen atom, or a $C_1$ to $C_4$ alkyl group; n1 and n2 each independently represent an integer of 0 to 4; n3 represents an integer of 0 or 1; n7 represents an integer of 1 to 6; n8 represents an integer of 0 to 2; and * each independently represents a bonding position of a structure containing a diamino group.

In formula (3-1) and formula (3-2), specific examples of the $C_1$ to $C_{40}$ alkyl group can include, for instance, n-pentyl, n-hexyl, n-heptyl, n-octyl, n-nonyl, n-decyl, n-lauryl, n-dodecyl, n-tridecyl, n-tetradecyl, n-pentadecyl, n-hexadecyl, n-heptadecyl, n-octadecyl, n-nonadecyl, or n-eicosyl. Specific examples of the $C_1$ to $C_{40}$ alkyl group substituted by a fluorine atom can include, for instance, 4,4,4-trifluorobutyl, 4,4,5,5,5-pentafluoropentyl, 4,4,5,5,6,6,6-heptafluorohexyl, 3,3,4,4,5,5,5-heptafluoropentyl, 2,2,2-trifluoroethyl, 2,2,3,3,3-pentafluoropropyl, 2-(perfluorobutyl)ethyl, 2-(perfluorooctyl)ethyl, or 2-(perfluorodecyl)ethyl.

A portion or all of the hydrogen atoms of the $C_1$ to $C_{40}$ alkyl group substituted by a fluorine atom are substituted by fluorine atoms. Preferably, the $C_1$ to $C_{40}$ alkyl group substituted by a fluorine atom is a $C_1$ to $C_{20}$ alkyl group substituted by a fluorine atom in which a portion or all of the hydrogen atoms are substituted by fluorine atoms.

The $C_1$ to $C_{40}$ alkyl group substituted by a fluorine atom is preferably a straight-chain or branched-chain $C_1$ to $C_{16}$ fluoroalkyl group. Moreover, from the viewpoint of exhibiting good liquid crystal alignment, the $C_1$ to $C_{40}$ alkyl group substituted by a fluorine atom is preferably a $C_1$ to $C_8$ straight-chain fluoroalkyl group. The $C_1$ to $C_{40}$ alkyl group substituted by a fluorine atom is more preferably a $C_3$ to $C_6$ straight-chain fluoroalkyl group such as 2,2,2-trifluoroethyl, 3,3,3-trifluoro-n-propyl, 4,4,4-trifluoro-n-butyl, 4,4,5,5,5-pentafluoro-n-pentyl, or 4,4,5,5,6,6,6-heptafluoro-n-hexyl, and is preferably 2,2,2-trifluoroethyl, 3,3,3-trifluoro-n-propyl, 4,4,4-trifluoro-n-butyl, or 4,4,5,5,5-pentafluoro-n-pentyl.

Specific examples of the compound (b-3) having the structure represented by formula (3-1) include compounds represented by formula (3-1-1) to formula (3-1-25).

formula (3-1-1)

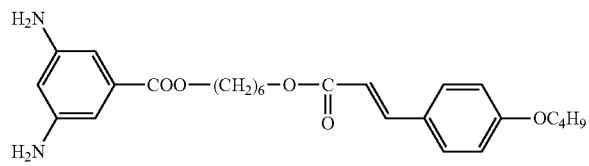

formula (3-1-2)

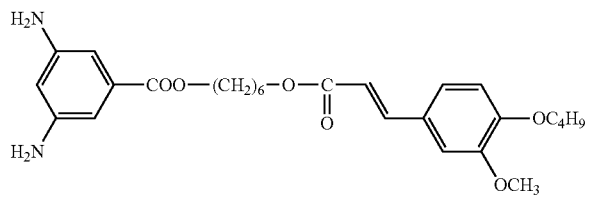

formula (3-1-3)

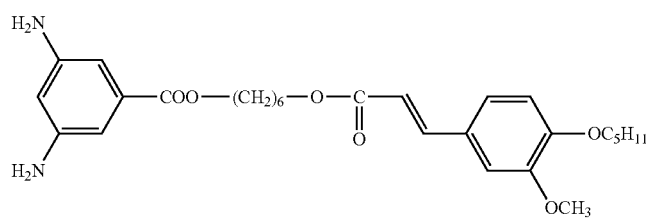

formula (3-1-4)

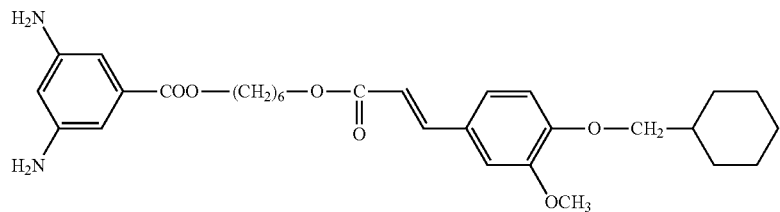

formula (3-1-5)

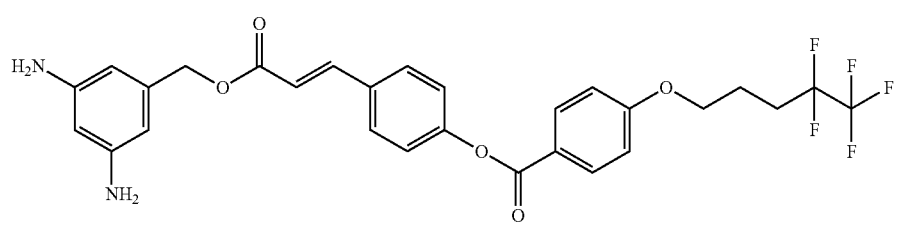

formula (3-1-6)

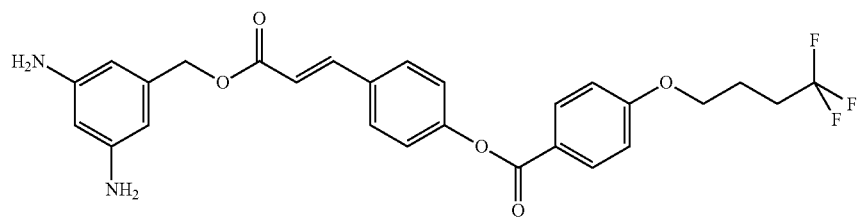

formula (3-1-7)
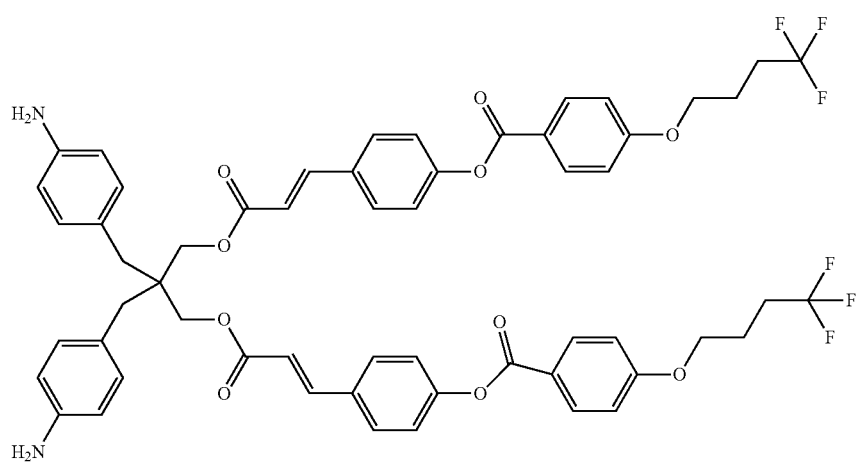
formula (3-1-8)
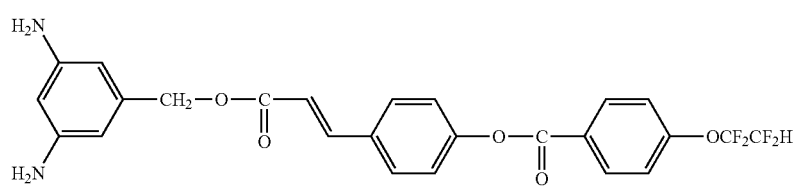
formula (3-1-9)
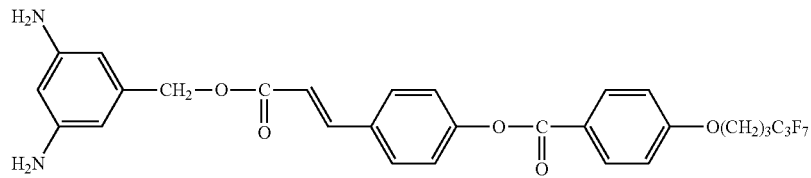
formula (3-1-10)
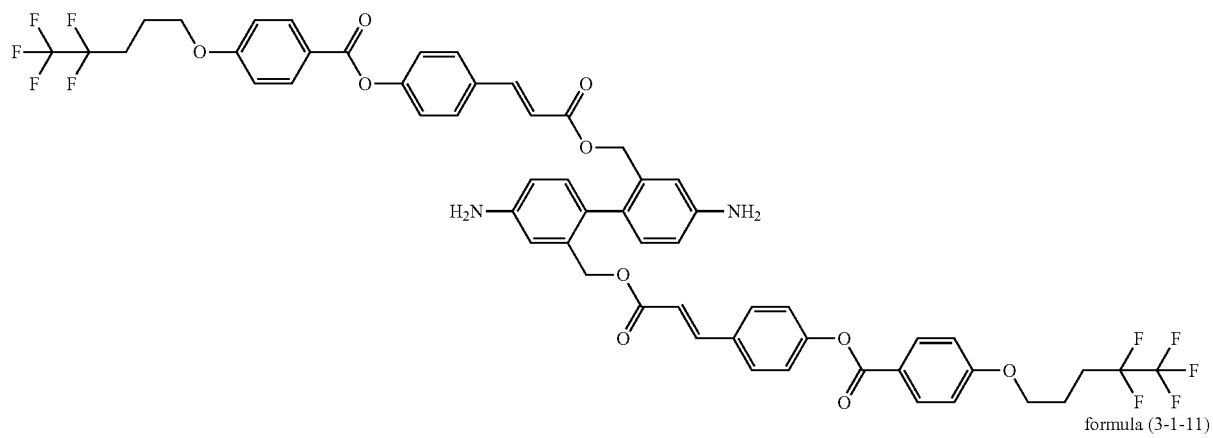
formula (3-1-11)
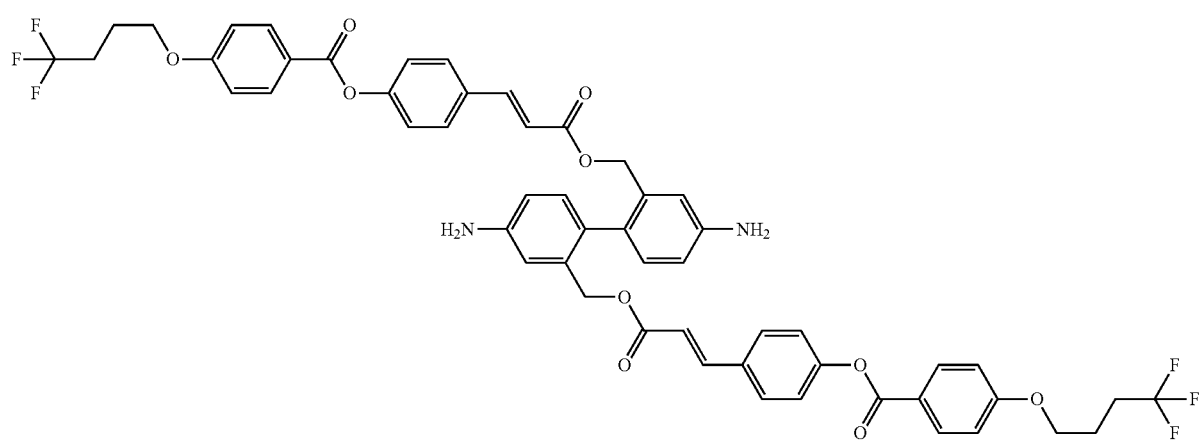

formula (3-1-12)
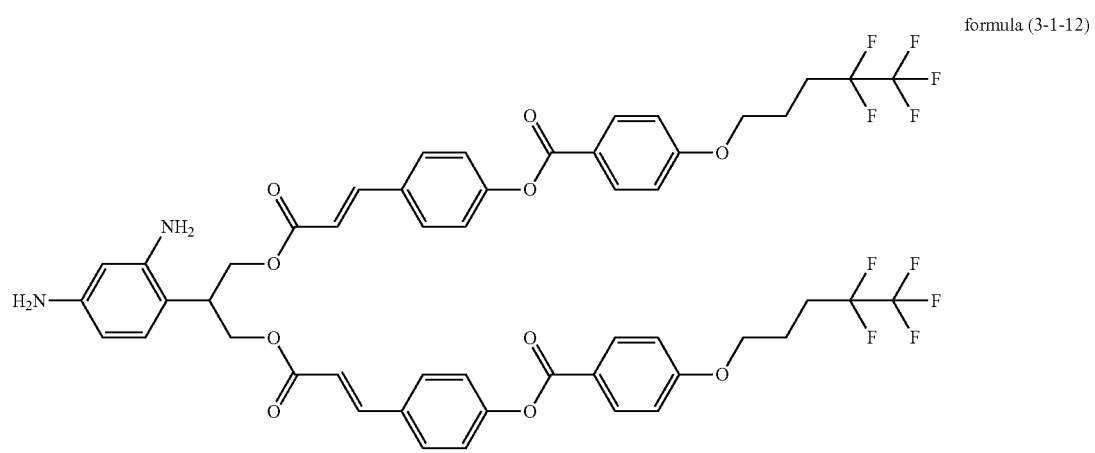
formula (3-1-13)
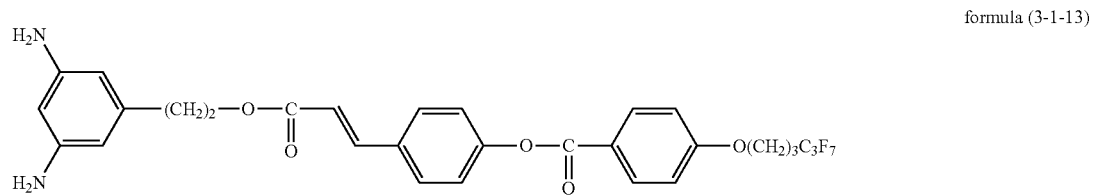
formula (3-1-14)
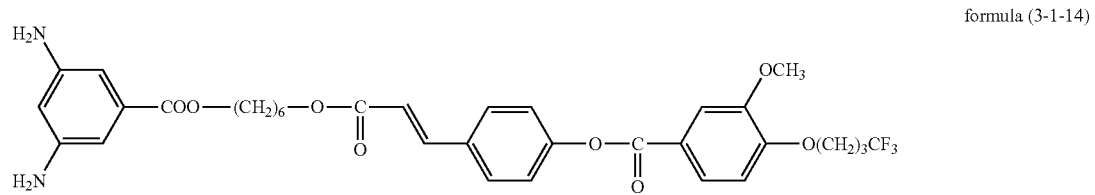
formula (3-1-15)
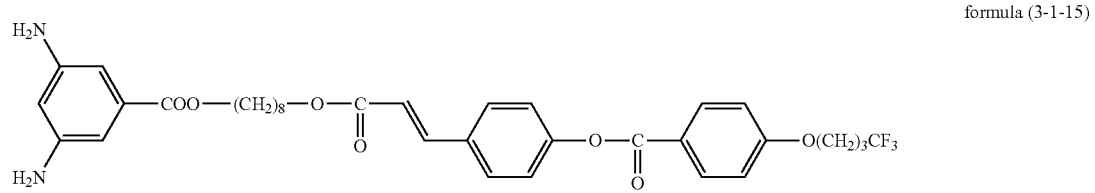
formula (3-1-16)
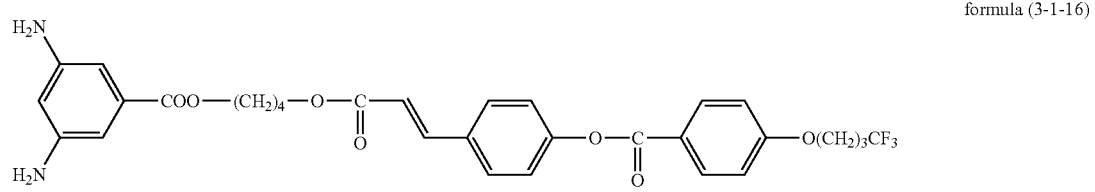
formula (3-1-17)
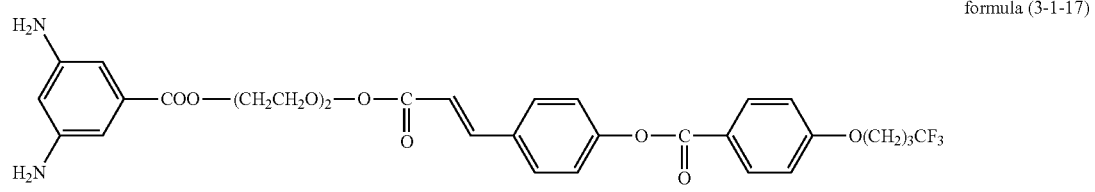
formula (3-1-18)
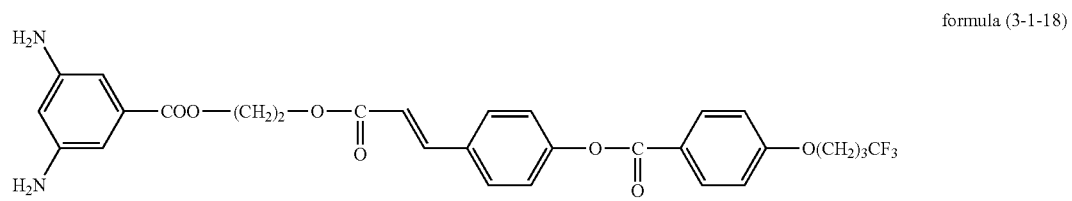

-continued
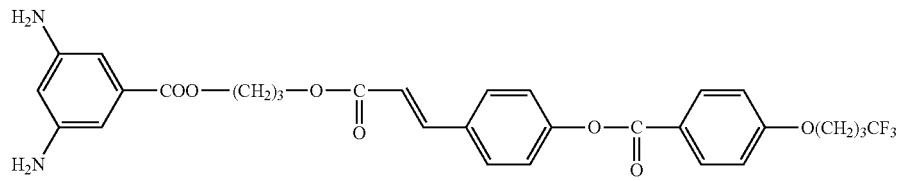
formula (3-1-19)
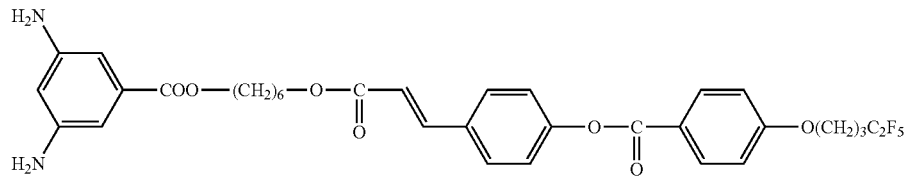
formula (3-1-20)
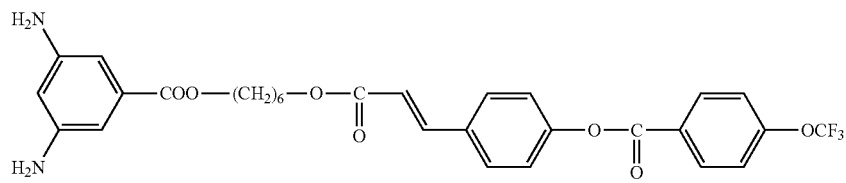
formula (3-1-21)
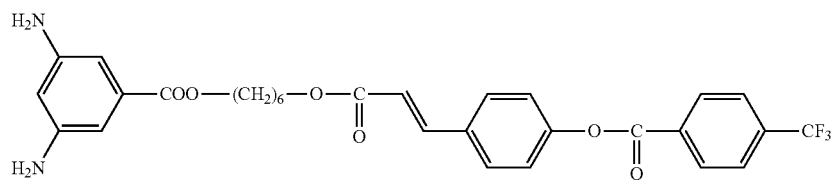
formula (3-1-22)
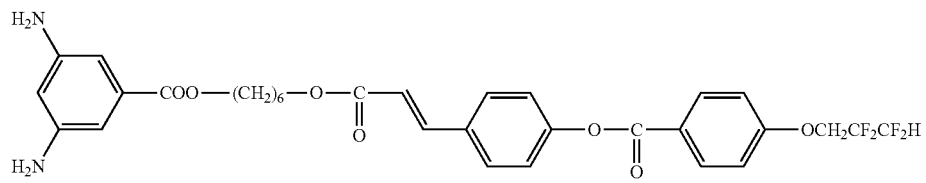
formula (3-1-23)
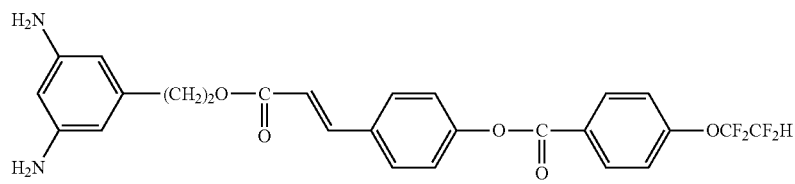
formula (3-1-24)
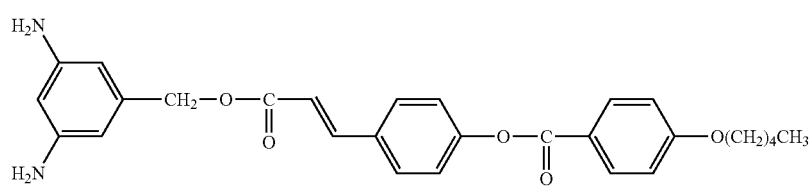
formula (3-1-25)
Specific examples of the compound (b-3) having the structure represented by formula (3-2) include compounds represented by formula (3-2-1) to formula (3-2-2).
-continued
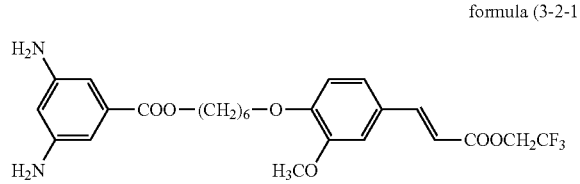
formula (3-2-1)
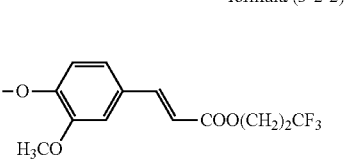
formula (3-2-2)

The compound (b-3) is preferably at least one selected from the group consisting of diamine compounds represented by formula (3-1-3), formula (3-1-6), formula (3-1-7), and formula (3-2-1).

Based on a usage amount of 100 moles of the compound (b), the usage amount of the compound (b-3) at least one selected from the group consisting of a structure represented by formula (3-1) and a structure represented by formula (3-2) can be 5 moles to 90 moles, preferably 8 moles to 85 moles, and more preferably 10 moles to 80 moles. When the diamine compound (b-1), the diamine compound (b-2), and the compound (b-3) are all used in the polymer (A) in the liquid crystal alignment agent, the ultraviolet reliability of the formed liquid crystal alignment film is good.

Diamine Compound (b-4)

In addition to the diamine compound (b-1), the diamine compound (b-2), and the compound (b-3), without affecting the efficacy, the compound (b) of the invention can also optionally be used as a mixture with a diamine compound (b-4). Specific examples of the diamine compound (b-4) include, but are not limited to, 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 4,4'-diaminoheptane, 1,3-diamino-2,2-dimethylpropane, 1,6-diamino-2,5-dimethylhexane, 1,7-diamino-2,5-dimethylheptane, 1,7-diamino-4,4-dimethylheptane, 1,7-diamino-3-methylheptane, 1,9-diamino-5-methylnonane, 2,11-diaminododecane, 1,12-diaminooctadecane, 1,2-bis(3-aminopropoxy)ethane, 4,4'-diaminodicyclohexylmethane, 4,4'-diamino-3,3'-dimethyldicyclohexylamine, 1,3-diaminocyclohexane, 1,4-diaminocyclohexane, isophorone diamine, tetrahydrodicyclopentadiene diamine, tricyclo(6.2.1.0$^{2:7}$)-undecylenedimethyldiamine, 4,4'-methylenebis(cyclohexylamine), 4,4'-diaminodiphenyl methane, 4,4'-diaminodiphenylethane, 4,4'-diaminodiphenylsulfone, 4,4'-diaminobenzanilide, 4,4'-diaminodiphenyl ether, 3,4'-diaminodiphenyl ether, 1,5-diaminonaphthalene, 5-amino-1-(4'-aminophenyl)-1,3,3-trimethyl indane, 6-amino-1-(4'-aminophenyl)-1,3,3-trimethyl indane, hexahydro-4,7-methanoindanylenedimethylenediamine, 3,3'-diamino benzophenone, 3,4'-diamino benzophenone, 4,4'-diamino benzophenone, 2,2-bis[4-(4-aminophenoxy)phenyl]propane, 2,2-bis[4-(4-aminophenoxy)phenyl]hexafluoropropane, 2,2-bis(4-aminophenyl)hexafluoropropane, 2,2-bis[4-(4-aminophenoxy) phenyl]sulfone, 1,4-bis(4-aminophenoxy)benzene, 1,3-bis(4-aminophenoxy)benzene, 1,3-bis(3-aminophenoxy)benzene, 9,9-bis(4-aminophenyl)-10-hydroanthracene, 9,10-bis(4-aminophenyl)anthracene, 2,7-diaminofluorene, 9,9-bis(4-aminophenyl)fluorene, 4,4'-methylene-bis(2-chloroaniline), 4,4'-(p-phenylene isopropylidene)bisaniline, 4,4'-(m-phenylene isopropylidene)bisaniline, 2,2'-bis[4-(4-amino-2-trifluoromethylphenoxy) phenyl] hexafluoropropane, 4,4'-bis[(4-amino-2-trifluoromethyl) phenoxy]-octafluorobiphenyl, 5-[4-(4-n-pentylcyclohexyl) cyclohexyl]phenylmethylene-1,3-diaminobenzene, 1,1-bis [4-(4-aminophenoxy)phenyl]-4-(4-ethylphenyl) cyclohexane, at least one of the diamine compounds represented by formula (II-1) to formula (II-30), or a combination of the compounds.

The diamine compounds represented by formula (II-1) to formula (II-30) are as shown below.

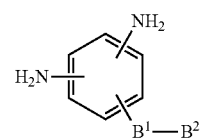

formula (II-1)

In formula (II-1), represents

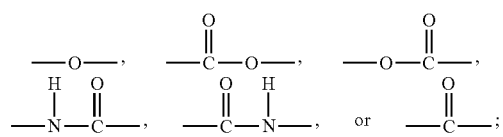

and B$^2$ represents a group having a steroid skeleton, a trifluoromethyl group, a fluorine group, a C$_2$ to C$_{30}$ alkyl group, or a monovalent group of a cyclic structure containing a nitrogen atom derived from, for instance, pyridine, pyrimidine, triazine, piperidine, or piperazine.

Specific examples of the compound represented by formula (II-1) include, but are not limited to, 2,4-diaminophenyl ethyl formate, 3,5-diaminophenyl ethyl formate, 2,4-diaminophenyl propyl formate, 3,5-diaminophenyl propyl formate, 1-dodecoxy-2,4-diaminobenzene, 1-hexadecoxy-2,4-diaminobenzene, 1-octadecoxy-2,4-diaminobenzene, at least one of the compounds represented by formula (II-1-1) to formula (II-1-6), or a combination of the compounds.

The compounds represented by formula (II-1-1) to formula (II-1-6) are as shown below.

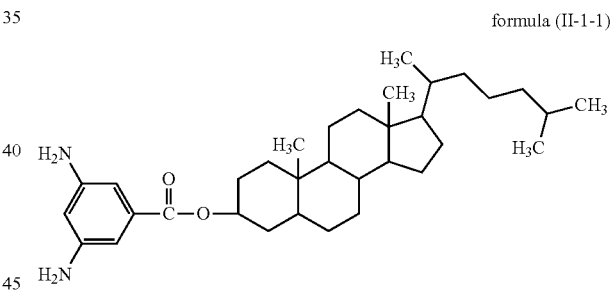

formula (II-1-1)

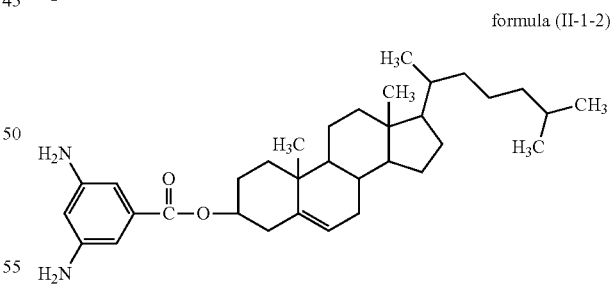

formula (II-1-2)

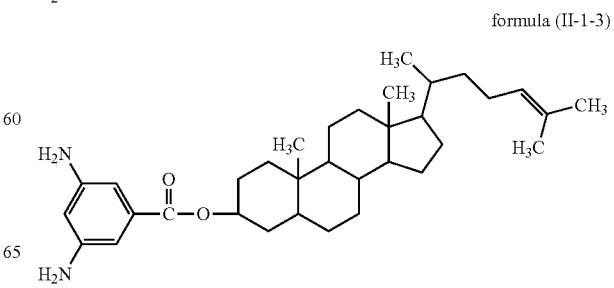

formula (II-1-3)

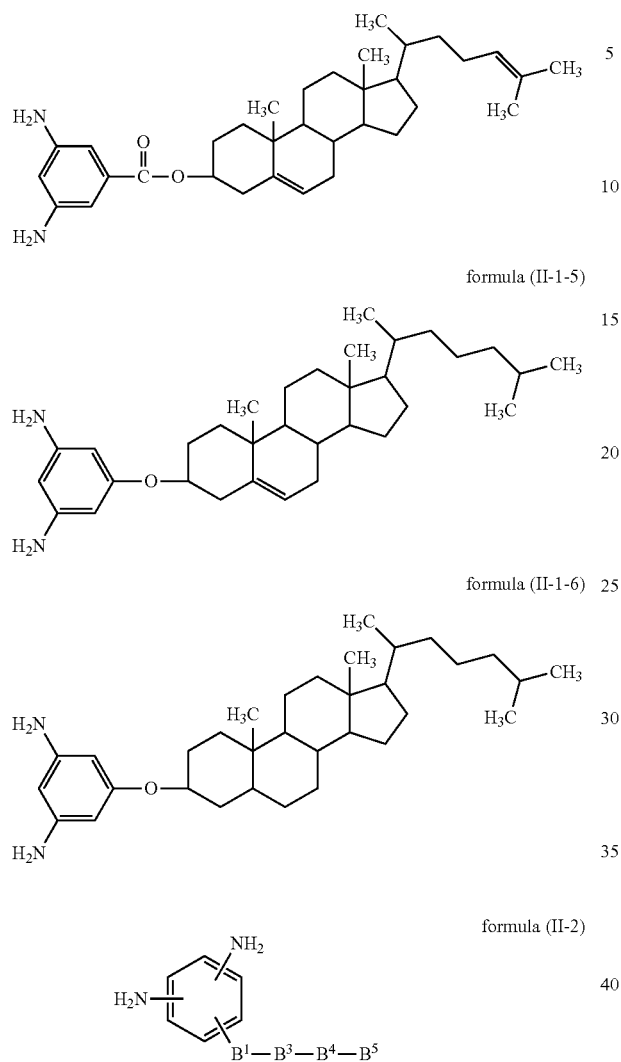

formula (II-1-4)
formula (II-1-5)
formula (II-1-6)

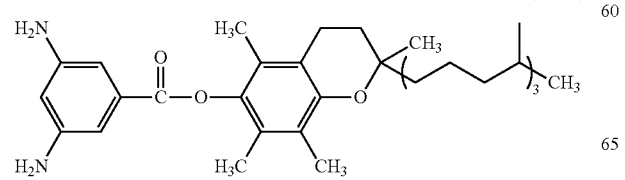

formula (II-2)

In formula (II-2), $B^1$ is the same as the $B^1$ in formula (II-1), $B^3$ and $B^4$ each independently represent a divalent aliphatic ring, a divalent aromatic ring, or a divalent heterocyclic group; $B^5$ represents a $C_3$ to $C_{18}$ alkyl group, a $C_3$ to $C_{18}$ alkoxy group, a $C_1$ to $C_5$ fluoroalkyl group, a $C_1$ to $C_5$ fluoroalkyloxy group, a cyano group, or a halogen atom.

Specific examples of the compound represented by formula (II-2) include at least one of the compounds represented by formula (II-2-1) to formula (II-2-13). Specifically, the compounds represented by formula (II-2-1) to formula (II-2-13) are as follows.

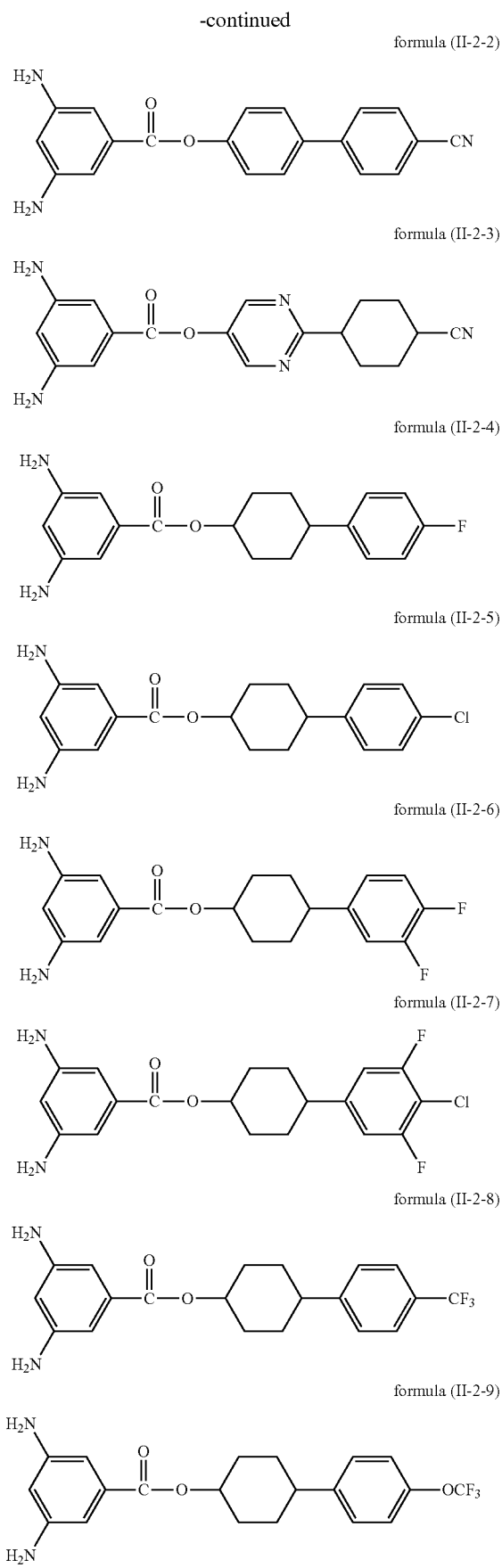

formula (II-2-1)
formula (II-2-2)
formula (II-2-3)
formula (II-2-4)
formula (II-2-5)
formula (II-2-6)
formula (II-2-7)
formula (II-2-8)
formula (II-2-9)

-continued

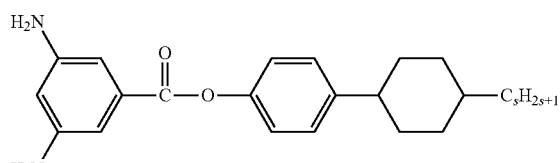
formula (II-2-10)

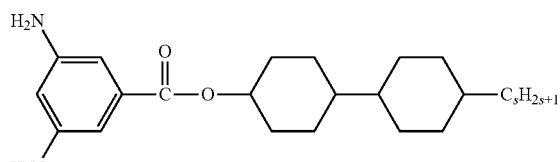
formula (II-2-11)

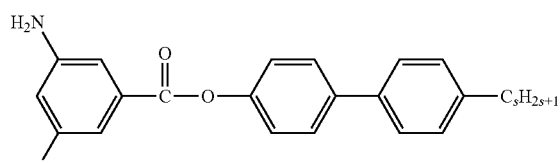
formula (II-2-12)

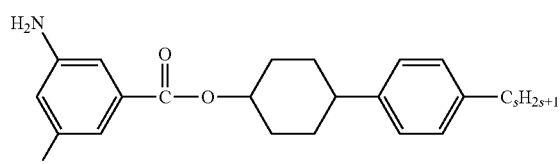
formula (II-2-13)

In formula (II-2-10) to formula (II-2-13), s represents an integer of 3 to 12.

$$\text{H}_2\text{N}-\left(\underset{B^6}{\underset{|}{\bigcirc}}\right)_u-\text{NH}_2 \quad \text{formula (II-3)}$$

In formula (II-3), $B^6$ each independently represents a hydrogen atom, a $C_1$ to $C_5$ acyl group, a $C_1$ to $C_5$ alkyl group, a $C_1$ to $C_5$ alkoxy group, or a halogen atom, and $B^6$ in each repeating unit can be the same or different; and u represents an integer of 1 to 3.

Specific examples of the compound represented by formula (II-3) include: (1) when u is 1: p-diaminobenzene, m-diaminobenzene, o-diaminobenzene, or 2,5-diaminotoluene . . . etc.; (2) when u is 2: 4,4'-diaminobiphenyl, 2,2'-dimethyl 4,4'-diaminobiphenyl, 3,3'-dimethyl-4,4'-diaminobiphenyl, 3,3'-dimethoxy-4,4'-diaminobiphenyl, 2,2'-dichloro-4,4'-diaminobiphenyl, 3,3'-dichloro-4,4'-diaminobiphenyl, 2,2',5,5'-tetrachloro-4,4'-diaminobiphenyl, 2,2'-dichloro-4,4'-diamino-5,5'-dimethoxybiphenyl, or 4,4'-diamino-2,2'-bis(trifluoromethyl)biphenyl . . . etc.; or (3) when u is 3: 1,4-bis(4'-aminophenyl)benzene . . . etc.

Specific examples of the compound represented by formula (II-3) preferably include p-diaminobenzene, 2,5-diaminotoluene, 4,4'-diaminobiphenyl, 3,3'-dimethoxy-4,4'-diaminobiphenyl, 1,4-bis(4'-aminophenyl)benzene, or a combination of the compounds.

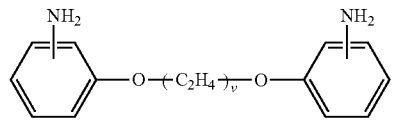
formula (II-4)

In formula (II-4), v represents an integer of 2 to 12.

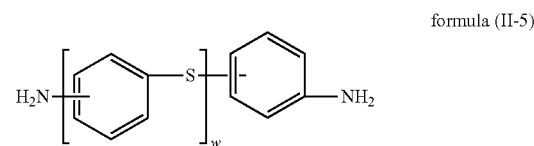
formula (II-5)

In formula (II-5), w represents an integer of 1 to 5. The compound represented by formula (II-5) is preferably 4,4'-diamino-diphenyl sulfide.

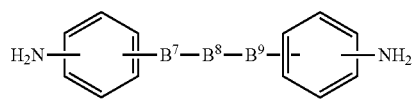
formula (II-6)

In formula (II-6), $B^7$ and $B^9$ each independently represent a divalent organic group, and $B^7$ and $B^9$ can be the same or different; $B^8$ represents a divalent group of a cyclic structure containing a nitrogen atom derived from, for instance, pyridine, pyrimidine, triazine, piperidine, or piperazine.

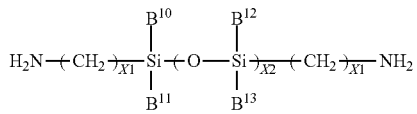
formula (II-7)

In formula (II-7), $B^{10}$, $B^{11}$, $B^{12}$, and $B^{13}$ each independently represent a $C_1$ to $C_{12}$ hydrocarbon group, and $B^{10}$, $B^{11}$, $B^{12}$, and $B^{13}$ can be the same or different; X1 each independently represents an integer of 1 to 3; and X2 represents an integer of 1 to 20.

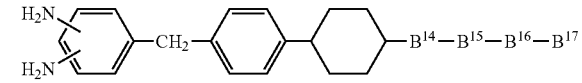
formula (II-8)

In formula (II-8), $B^{14}$ represents an oxygen atom or a cyclohexylene group; $B^{15}$ represents a methylene group ($-CH_2$); $B^{16}$ represents a phenylene group or a cyclohexylene group; and $B^{17}$ represents a hydrogen atom or a heptyl group.

Specific examples of the compound represented by formula (II-8) include a compound represented by formula (II-8-1), a compound represented by formula (II-8-2), or a combination of the compounds.

formula (II-8-1)
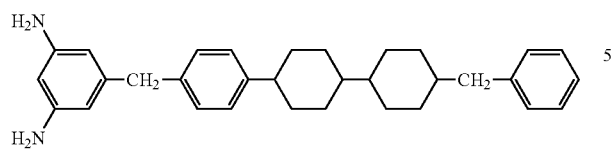
formula (II-8-2)
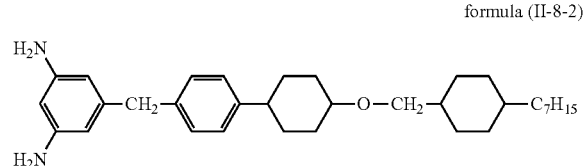
The compounds represented by formula (II-9) to formula (II-30) are as shown below.
formula (II-9)
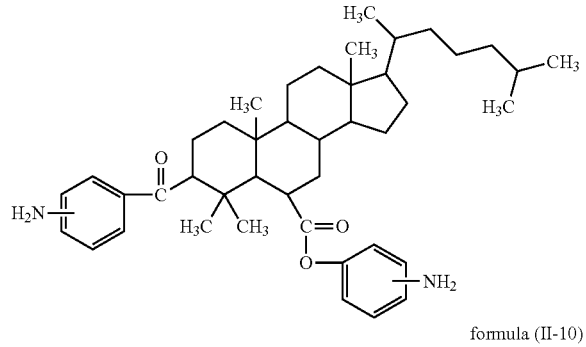
formula (II-10)
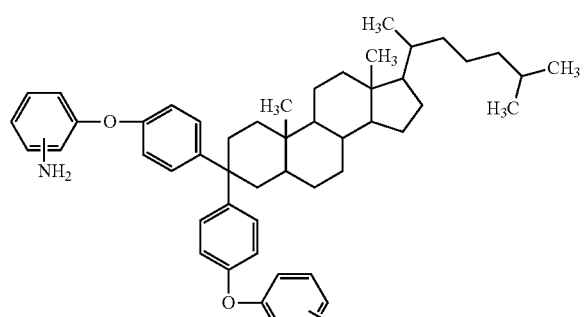
(formula (II-11))
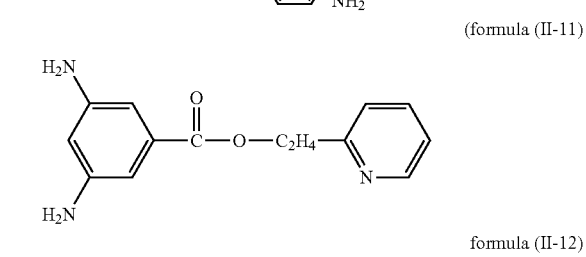
formula (II-12)
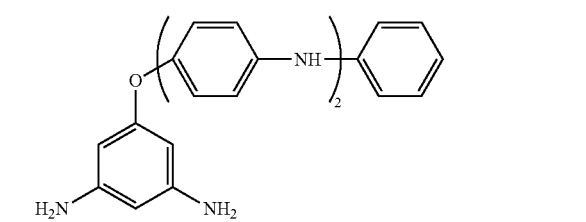
formula (II-13)
formula (II-14)
formula (II-15)
formula (II-16)
formula (II-17)
formula (II-18)
formula (II-19)
formula (II-20)

formula (II-21)
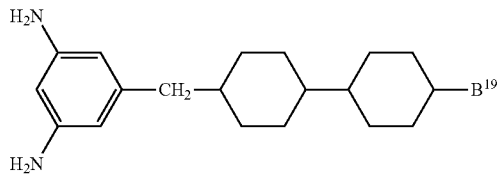

formula (II-22)
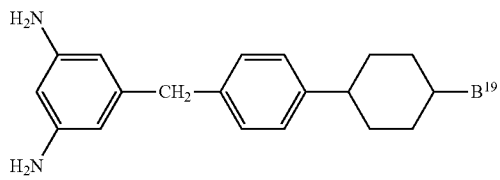

formula (II-23)
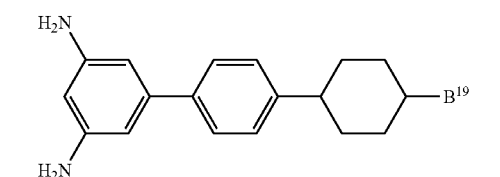

formula (II-24)
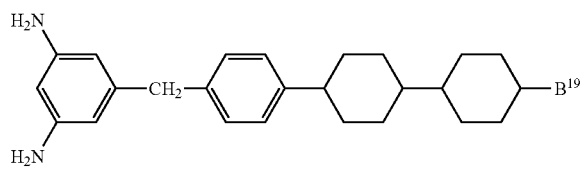

formula (II-25)
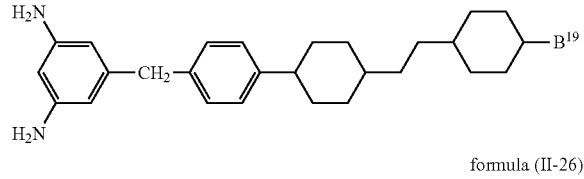

formula (II-26)
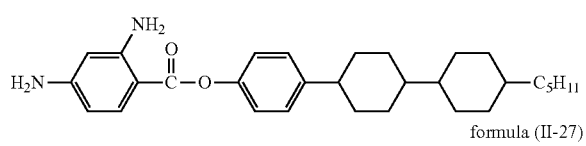

formula (II-27)
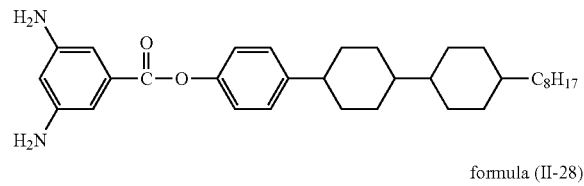

formula (II-28)
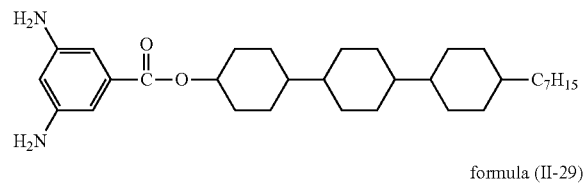

formula (II-29)
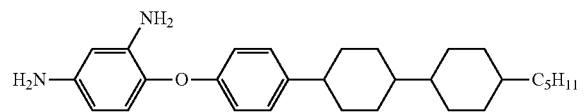

formula (II-30)
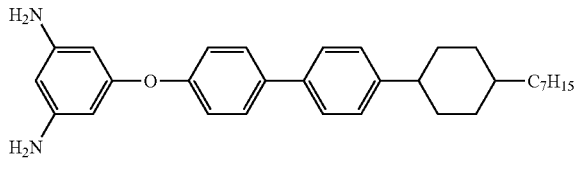

In formula (II-17) to formula (II-25), $B^{18}$ preferably represents a $C_1$ to $C_{10}$ alkyl group or a $C_1$ to $C_{10}$ alkoxy group; and $B^{19}$ preferably represents a hydrogen atom, a $C_1$ to $C_{10}$ alkyl group, or a $C_1$ to $C_{10}$ alkoxy group.

Specific examples of the diamine compound (b-4) preferably include, but are not limited to, 1,2-diaminoethane, 4,4'-diaminodicyclohexylmethane, 4,4'-diaminodiphenyl methane, 4,4'-diaminodiphenyl ether, 5-[4-(4-n-pentylcyclohexyl)cyclohexyl]phenylmethylene-1,3-diaminobenzene, 1,1-bis[4-(4-aminophenoxy)phenyl]-4-(4-ethylphenyl)cyclohexane, 2,4-diaminophenyl ethyl formate, a compound represented by formula (II-1-1), a compound represented by formula (II-1-2), a compound represented by formula (II-1-5), a compound represented by formula (II-2-1), a compound represented by formula (II-2-11), p-diaminobenzene, m-diaminobenzene, o-diaminobenzene, a compound represented by formula (II-8-1), a compound represented by formula (II-26), a compound represented by formula (II-29), or a combination of the compounds.

The diamine compound (b-4) can be used alone or in multiple combinations.

In the diamine compound (b-4), when at least one of the diamine compounds represented by formula (II-1), formula (II-2), and formula (II-26) to formula (II-30) is used in the polymer (A) in the liquid crystal alignment agent, the ultraviolet reliability of the formed liquid crystal alignment film is particularly good.

Based on a total number of moles of 100 moles of the compound (b), the usage amount of the diamine compound (b-4) can be 0 moles to 94 moles, preferably 10 moles to 92 moles, and more preferably 20 moles to 89 moles.

Method of Preparing Polymer (A)

The polymer (A) can include at least one of polyamic acid and polyimide.

Moreover, the polymer (A) can further include a polyimide-based block copolymer. The method of preparing each of the various polymers above is further described below.

Method of Preparing Polyamic Acid

The method of preparing the polyamic acid includes first dissolving a mixture in a solvent, wherein the mixture includes the tetracarboxylic dianhydride component (a) and the compound (b). A polycondensation reaction is then performed at a temperature of 0° C. to 100° C. After reacting for 1 hour to 24 hours, the reaction solution is distilled under reduced pressure with an evaporator to obtain the polyamic acid. Alternatively, the reaction solution is poured into a large amount of a poor solvent to obtain a precipitate. Then, the precipitate is dried with a method of drying under reduced pressure to obtain the polyamic acid. In the mixture, based on a total usage amount of 100 moles of the compound (b), the usage amount of the tetracarboxylic dianhydride component (a) is preferably 20 moles to 200 moles, more preferably 30 moles to 120 moles.

The solvent used in the polycondensation reaction can be the same or different as the solvent in the liquid crystal alignment agent below, and the solvent used in the polycondensation reaction is not particularly limited, provided the solvent can dissolve the reactants and the products. The solvent preferably includes, but is not limited to (1) an aprotic polar solvent such as N-methyl-2-pyrrolidinone (NMP), N,N-dimethyl acetamide, N,N-dimethyl formamide, dimethyl sulfoxide, γ-butyrolactone, tetramethylurea, or hexamethylphosphor amide; or (2) a phenolic solvent such as m-cresol, xylenol, phenol, or halogenated phenol. Based on a total usage amount of 100 parts by weight of the mixture, the usage amount of the solvent used in the polycondensation reaction is preferably 200 parts by weight to 2000 parts by weight, more preferably 300 parts by weight to 1800 parts by weight.

It should be mentioned that, in the polycondensation reaction, the solvent can be used with a suitable amount of a poor solvent, wherein the poor solvent does not cause precipitation of the polyamic acid. The poor solvent can be used alone or in multiple combinations, and includes, but is not limited to (1) an alcohol such as methanol, ethanol, isopropanol, cyclohexanol, ethylene glycol, propylene glycol, 1,4-butanediol, or triglycol; (2) a ketone such as acetone, methyl ethyl ketone, methyl isobutyl ketone, or cyclohexanone; (3) an ester such as methyl acetate, ethyl acetate, butyl acetate, diethyl oxalate, diethyl malonate, or ethylene glycol monoethyl ether acetate; (4) an ether such as diethyl ether, ethylene glycol monomethyl ether, ethylene glycol monoethyl ether, ethylene glycol n-propyl ether, ethylene glycol isopropyl ether, ethylene glycol n-butyl ether, ethylene glycol dimethyl ether, or diethylene glycol dimethyl ether; (5) a halogenated hydrocarbon such as dichloromethane, 1,2-dichloroethane, 1,4-dichlorobutane, trichloroethane, chlorobenzene, or o-dichlorobenzene; or (6) a hydrocarbon such as tetrahydrofuran, hexane, heptane, octane, benzene, toluene, or xylene, or any combination of the solvents. Based on a usage amount of 100 parts by weight of the compound (b), the usage amount of the poor solvent is preferably 0 parts by weight to 60 parts by weight, more preferably 0 parts by weight to 50 parts by weight.

Method of Preparing Polyimide

The method of preparing the polyimide includes heating the polyamic acid obtained by the above method of preparing polyamic acid under the existence of a dehydrating agent and a catalyst. During the heating process, the amic acid functional group in the polyamic acid can be converted into an imide functional group through a cyclodehydration reaction (i.e., imidization).

The solvent used in the cyclodehydration reaction can be the same as the solvent (B) in the liquid crystal alignment agent and is therefore not repeated herein. Based on a usage amount of 100 parts by weight of the polyamic acid, the usage amount of the solvent used in the cyclodehydration reaction is preferably 200 parts by weight to 2000 parts by weight, more preferably 300 parts by weight to 1800 parts by weight.

To obtain a preferable degree of imidization of the polyamic acid, the operating temperature of the cyclodehydration reaction is preferably 40° C. to 200° C., more preferably 40° C. to 150° C. If the operating temperature of the cyclodehydration reaction is less than 40° C., then the imidization reaction is incomplete, and the degree of imidization of the polyamic acid is thereby reduced. However, if the operating temperature of the cyclodehydration reaction is higher than 200° C., then the weight-average molecular weight of the obtained polyimide is lower.

The dehydrating agent used in the cyclodehydration reaction can be selected from an anhydride compound, and specific examples thereof include, for instance, acetic anhydride, propionic anhydride, or trifluoroacetic anhydride. Based on 1 mole of the polyamic acid, the usage amount of the dehydrating agent is 0.01 moles to 20 moles. The catalyst used in the cyclodehydration reaction can be selected from (1) a pyridine compound such as pyridine, trimethyl pyridine, or dimethyl pyridine; or (2) a tertiary amine compound such as triethylamine. Based on a usage amount of 1 mole of the dehydrating agent, the usage amount of the catalyst can be 0.5 moles to 10 moles.

Method of Preparing Polyimide-Based Block Copolymer

The polyimide-based block copolymer is selected from a polyamic acid block copolymer, a polyimide block copolymer, a polyamic acid-polyimide block copolymer, or any combination of the polymers.

The method of preparing the polyimide-based block copolymer preferably includes first dissolving a starting material in a solvent and then performing a polycondensation reaction, wherein the starting material includes at least one type of polyamic acid and/or at least one type of polyimide, and can further include a carboxylic anhydride component and a diamine component.

The carboxylic anhydride component and the diamine component in the starting material can be the same as the tetracarboxylic dianhydride component (a) and the compound (b) used in the method of preparing polyamic acid. Moreover, the solvent used in the polycondensation reaction can be the same as the solvent in the liquid crystal alignment agent below and is not repeated herein.

Based on a usage amount of 100 parts by weight of the starting material, the usage amount of the solvent used in the polycondensation reaction is preferably 200 parts by weight to 2000 parts by weight, more preferably 300 parts by weight to 1800 parts by weight. The operating temperature of the polycondensation reaction is preferably 0° C. to 200° C., more preferably 0° C. to 100° C.

The starting material preferably includes, but is not limited to (1) two polyamic acids for which the terminal groups are different and the structures are different; (2) two polyimides for which the terminal groups are different and the structures are different; (3) a polyamic acid and a polyimide for which the terminal groups are different and the structures are different; (4) a polyamic acid, a carboxylic anhydride component, and a diamine component, wherein the structure of at least one of the carboxylic anhydride component and the diamine component is different from the structures of the carboxylic anhydride component and the diamine component used to form the polyamic acid; (5) a polyimide, a carboxylic anhydride component, and a diamine component, wherein the structure of at least one of the carboxylic anhydride component and the diamine component is different from the structures of the carboxylic anhydride component and the diamine component used to form the polyimide; (6) a polyamic acid, a polyimide, a carboxylic anhydride component, and a diamine component, wherein the structure of at least one of the carboxylic anhydride component and the diamine component is different from the structures of the carboxylic anhydride component and the diamine component used to form the polyamic acid or the polyimide; (7) two polyamic acids having different structures, a carboxylic anhydride component, and a diamine component; (8) two polyimides having different structures, a carboxylic anhydride component, and a diamine component; (9) two polyamic acids having anhydride groups as terminal groups and having different structures, and a diamine component; (10) two polyamic acids having amine groups as terminal groups and having different structures, and a carboxylic anhydride component; (11) two polyimides having anhydride groups as terminal groups and having different structures, and a diamine component; or (12) two polyimides having amine groups as terminal groups and having different structures, and a carboxylic anhydride component.

Without affecting the efficacy of the invention, the polyamic acid, the polyimide, and the polyimide-based block copolymer are preferably terminal-modified polymers in which molecular weight regulation is first performed. By using the terminal-modified polymers, the coating performance of the liquid crystal alignment agent can be improved. The method of preparing the terminal-modified polymers can include adding a monofunctional compound at the same time a polycondensation reaction is performed on the polyamic acid.

Specific examples of the monofunctional compound include, but are not limited to, (1) a monoanhydride such as maleic anhydride, phthalic anhydride, itaconic anhydride, n-decyl succinic anhydride, n-dodecyl succinic anhydride, n-tetradecyl succinic anhydride, or n-hexadecyl succinic anhydride; (2) a monoamine compound such as aniline, cyclohexylamine, n-butylamine, n-amylamine, n-hexylamine, n-heptylamine, n-octylamine, n-nonylamine, n-decylamine, n-undecylamine, n-dodecylamine, n-tridecylamine, n-tetradecyl amine, n-pentadecylamine, n-hexadecylamine, n-heptadecylamine, n-octadecylamine, or n-eicosylamine; or (3) a monoisocyanate compound such as phenyl isocyanate or naphthyl isocyanate.

Solvent (B)

Specific examples of the solvent (B) include, but are not limited to, for instance, N-methyl-2-pyrrolidone (NMP), γ-butyrolactone, γ-butyrolactam, 4-hydroxy-4-methyl-2-pentanone, ethylene glycol monomethyl ether, butyl lactate, butyl acetate, methyl methoxypropionate, ethyl ethoxypropionate, ethylene glycol monomethyl ether, ethylene glycol monoethyl ether, ethylene glycol n-propyl ether, ethylene glycol isopropyl ether, ethylene glycol n-butyl ether, ethylene glycol dimethyl ether, ethylene glycol ethyl ether acetate, diethylene glycol dimethyl ether, diethylene glycol diethyl ether, diethylene glycol monomethyl ether, diethylene glycol monoethyl ether, diethylene glycol monomethyl ether acetate, diethylene glycol monoethyl ether acetate, N,N-dimethyl formamide, or N,N-dimethyl acetamide. The solvent (B) can be used alone or multiple combinations.

Based on a usage amount of 100 parts by weight of the polymer (A), the usage amount of the solvent (B) is 500 parts by weight to 3000 parts by weight, preferably 800 parts by weight to 2500 parts by weight, and more preferably 1000 parts by weight to 2000 parts by weight.

Additive (C)

Without affecting the efficacy of the invention, an additive (C) can further optionally be added to the liquid crystal alignment agent, wherein the additive (C) includes a compound having at least two epoxy groups, a silane compound having a functional group, or a combination thereof.

The compound having at least two epoxy groups includes, but is not limited to, ethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, glycerol diglycidyl ether, 2,2-dibromo-neopentyl glycol diglycidyl ether, 1,3,5,6-tetraglycidyl-2,4-hexanediol, N,N,N',N'-tetraglycidyl-m-xylenediamine, 1,3-bis(N,N-diglycidylaminomethyl)cyclohexane, N,N,N',N'-tetraglycidyl-4,4'-diaminodiphenyl methane, N,N-glycidyl-p-glycidyloxy 3-(N-allyl-N-glycidyl)aminopropyltrimethoxysilane, 3-(N,N-diglycidyl) aminopropyl trimethoxysilane, or a combination of the compounds.

The compound having at least two epoxy groups can be used alone or in multiple combinations.

Based on a usage amount of 100 parts by weight of the polymer (A), the usage amount of the compound having at least two epoxy groups can be 0 parts by weight to 40 parts by weight, preferably 0.1 parts by weight to 30 parts by weight.

Specific examples of the silane compound having a functional group include, but are not limited to, 3-aminopropyltrimethoxysilane, 3-aminopropyltriethoxysilane, 2-aminopropyl trimethoxysilane, 2-aminopropyltriethoxysilane, N-(2-aminoethyl)-3-aminopropyltrimethoxy silane, N-(2-arninoethyl)-3-aminopropyldimethoxysilane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilaine, N-triethoxysilylpropyltriethylenetriamine, N-trimethoxysilylpropyltriethylenetriamine, 10-trimethoxysilyl-1,4,7-triazadecane, 10-triethoxysilyl-1,4,7-triazadecane, 9-trimethoxysilyl-3,6-diazanonylacetate, 9-triethoxysilyl-3,6-diazanonylacetate, N-benzyl-3-aminopropyltrimethoxysilane, N-benzyl-3-aminopropyltriethoxysilane, N-phenyl-3-aminopropyltrimethoxysilane, N-phenyl-3-aminopropyltriethoxysilane, N-bis(oxyethylene)-3-aminopropyltrimethoxysilane, N-bis(oxyethylene)-3-aminopropyltriethoxysilane, or a combination of the compounds. The additive (C) can be used alone or in multiple combinations.

Based on a usage amount of 100 parts by weight of the polymer (A), the usage amount of the silane compound having a functional group can be 0 parts by weight to 10 parts by weight, preferably 0.5 parts by weight to 10 parts by weight.

Based on a total usage amount of 100 parts by weight of the polymer (A), the usage amount of the additive (C) is preferably 0.5 parts by weight to 50 parts by weight, more preferably 1 part by weight to 45 parts by weight.

<Method of Preparing Liquid Crystal Alignment Agent>

The method of preparing the liquid crystal alignment agent of the invention is not particularly limited, and a general mixing method can be used for the preparation. For instance, the polymer (A) prepared by the above method is first added to the solvent (B) under a temperature condition of 0° C. to 200° C., and then the additive (C) is optionally added, and lastly the components are continuously stirred with a stirring apparatus until dissolved. Preferably, the solvent (B) is added at a temperature of 20° C. to 60° C.

At 25° C., the viscosity of the liquid crystal alignment agent of the invention is generally 15 cps to 35 cps, preferably 17 cps to 33 cps, more preferably 20 cps to 30 cps.

<Method of Forming Liquid Crystal Alignment Film>

The liquid crystal alignment agent of the invention is suitable for forming a liquid crystal alignment film through a photoalignment method.

The method of forming the liquid crystal alignment film can include, for instance, coating the liquid crystal alignment agent on a substrate to form a coating film, and irradiating the coating film with polarized or non-polarized radiation from a direction inclined relative to the coating film surface; or the coating film is irradiated with polarized radiation from a direction perpendicular to the coating film surface to provide liquid crystal alignment to the coating film.

First, the liquid crystal alignment agent of the invention is coated on one side of the transparent conductive film of the substrate on which a patterned transparent conductive film is disposed through a suitable coating method such as a roll coating method, a spin coating method, a printing method, or an ink-jet method. After coating, a pre-bake treatment is performed on the coating surface, and then a post-bake treatment is performed to form a coating film. The purpose of the pre-bake treatment is to volatilize the organic solvent in the pre-coating layer. The pre-bake treatment is, for instance, performed under the conditions of 0.1 minutes to 5 minutes at 40° C. to 120° C. The post-bake treatment is preferably performed under the condition of 120° C. to 300° C., more preferably 150° C. to 250° C., and is preferably performed for 5 minutes to 200 minutes, more preferably 10 minutes to 100 minutes. The film thickness of the coating film after post-bake is preferably 0.001 μm to 1 μm, more preferably 0.005 μm to 0.5 μm.

The substrate can include, for instance, a glass such as a float glass or a soda-lime glass; or a transparent substrate formed by, for instance, a plastic such as poly(ethylene terephthalate), poly(butylene terephthalate), polyethersulfone, or polycarbonate.

The transparent conductive film can include, for instance, a NESA film formed by $SnO_2$ or an ITO (indium tin oxide) film formed by $In_2O_3$—$SnO_2$. To form the transparent conductive film patterns, a method such as photo-etching or a method in which a mask is used when the transparent conductive film is formed can be used.

When the liquid crystal alignment agent is coated, to improve the adhesion between the substrate or transparent conductive film and the coating film, a functional silane compound or a titanate compound . . . etc. can be pre-coated on the substrate and the transparent conductive film.

Then, liquid crystal alignment is provided by irradiating the coating film with polarized or non-polarized radiation, and the liquid crystal alignment film is formed by the coating film. Here, the radiation can include, for instance, ultraviolet and visible light having a wavelength of 150 nm to 800 nm, and preferably includes ultraviolet having a wavelength of 300 nm to 400 nm. When the radiation used is polarized light (linearly polarized light or partially polarized light), irradiation can be performed from a direction perpendicular to the coating film surface. Moreover, to provide a pretilt angle, irradiation can also be performed from an inclined angle. Moreover, when non-polarized radiation is irradiated, irradiation needs to be performed from the direction inclined with respect to the coating film surface.

The light source of the radiation exposure can include, for instance, a low-pressure mercury lamp, a high-pressure mercury lamp, a deuterium lamp, a metal halide lamp, an argon resonance lamp, a xenon lamp, or an excimer laser. The ultraviolet in the preferred wavelength region can be obtained by, for instance, using the light sources above with, for instance, a filter or a diffraction grating.

The radiation exposure is preferably equal to or greater than 1 J/μm and less than 10000 $J/m^2$, more preferably 10 $J/m^2$ to 3000 $J/m^2$. Moreover, when liquid crystal alignment is provided to a coating film formed by a conventionally known liquid crystal alignment agent through a photoalignment method, a radiation exposure equal to or greater than 10000 $J/m^2$ is needed. However, if the liquid crystal alignment agent of the invention is used, then even if the radiation exposure in the photoalignment method is equal to or less than 3000 $J/m^2$, further equal to or less than 1000 $J/m^2$, and further equal to or less than 300 $J/m^2$, good photoalignment can still be provided. As a result, production cost of the liquid crystal display element can be reduced.

<Liquid Crystal Display Element and Fabrication Method Thereof>

The liquid crystal display element of the invention includes the liquid crystal alignment film formed by the liquid crystal alignment agent of the invention. The liquid crystal display element of the invention can be made according to the following method.

Two substrates on which a liquid crystal alignment film is formed are prepared, and liquid crystal is disposed between the two substrates to make a liquid crystal cell. To make the liquid crystal cell, the following two methods can be provided.

The first method includes first disposing the two substrates opposite to each other with a gap (cell gap) in between such that each liquid crystal alignment film is opposite to one another. Then, the peripheries of the two substrates are laminated together with a sealant. Next, liquid crystal is injected into the cell gap divided by the surfaces of the substrates and the sealant, and then the injection hole is sealed to obtain the liquid crystal cell.

The second method is called ODF (one drop fill, instillation). First, an ultraviolet curable sealing material for instance is coated on a predetermined portion on one of the two substrates on which a liquid crystal alignment film is formed. Then, liquid crystal is dropped onto the liquid crystal alignment film, and then the other substrate is laminated such that the liquid crystal alignment films are opposite to each other. Next, ultraviolet is irradiated on the entire surface of the substrate such that the sealant is cured. The liquid crystal cell can thus be made.

When any one of the above methods is used, preferably, after the liquid crystal cell is next heated to the temperature at which the liquid crystal used is in an isotropic phase, the liquid crystal cell is slowly cooled to room temperature to remove flow alignment when the liquid crystal is filled.

Next, by laminating a polarizer on the outer surface of the liquid crystal cell, the liquid crystal display element of the invention can be obtained. Here, when the liquid crystal alignment films are parallelly aligned, a liquid crystal display element having a TN-type or STN-type liquid crystal cell can be obtained by adjusting the angle formed by the polarization direction of the linear polarized radiation irradiated in the two substrates on which a liquid crystal alignment film is formed and the angle of each substrate and polarizing plate. Moreover, when the liquid crystal alignment films are perpendicularly aligned, by forming the liquid crystal cell, the directions of the easy-to-align axes of the two substrates on which a liquid crystal alignment film is formed are parallel, and then the polarizing plate and the liquid crystal cell are laminated together, such that the polarization direction thereof and the easy-to-align axes form a 45° angle. As a result, a liquid crystal display element having a vertical alignment-type liquid crystal cell can be formed.

The sealant for instance, an epoxy resin including a curing agent and an alumina ball as a spacer can be used.

Specific examples of the liquid crystal include, for instance, a nematic liquid crystal or a smectic liquid crystal. When a TN-type or STN-type liquid crystal cell is used, the TN-type or STN-type liquid crystal cell preferably has a nematic liquid crystal having positive dielectric anisotropy, and examples thereof can include, for instance, a biphenyl-based liquid crystal, a phenyl cyclohexane-based liquid crystal, an ester-based liquid crystal, a terphenyl liquid crystal, a biphenyl cyclohexane-based liquid crystal, a pyrimidine-based liquid crystal, a dioxane-based liquid crystal, a bicyclooctane-based liquid crystal, or a cubane-based liquid crystal. Moreover, the following can further be added to the liquid crystal above: a cholesteric liquid crystal such as cholesteryl chloride, cholesteryl nonanoate, or cholesteryl carbonate . . . etc.; a chiral agent sold under the product name of, for instance, "C-15" or "CB-15" (made by Merck & Co.); or a ferroelectric liquid crystal such as p-decyloxybenzylidene-p-amino-2-methyl butyl cinnamate.

Moreover, when a vertical alignment-type liquid crystal cell is used, the vertical alignment-type liquid crystal cell preferably has a nematic liquid crystal having negative dielectric anisotropy, and examples thereof can include, for instance, a dicyanobenzene-based liquid crystal, a pyridazine-based liquid crystal, a Schiff base-based liquid crystal, an azoxy-based liquid crystal, a biphenyl-based liquid crystal, or a phenyl cyclohexane-based liquid crystal.

The polarizer used on the outside of the liquid crystal cell can include, for instance, a polarizer formed by a polarizing film known as "H film" obtained when iodine is absorbed at the same time that polyvinyl alcohol is stretch aligned by clamping with a cellulose acetate protective film, or a polarizer formed by the "H film" itself.

The liquid crystal display element of the invention thus made has excellent display performance, and even after prolonged use, the display performance is not worsened.

The FIGURE is a side view of a liquid crystal display element according to an embodiment of the invention. A liquid crystal display element 100 includes a first unit 110, a second unit 120, and a liquid crystal unit 130, wherein the second unit 120 and the first unit 110 are separately disposed and the liquid crystal unit 130 is disposed between the first unit 110 and the second unit 120.

The first unit 110 includes a first substrate 112, a first conductive film 114, and a first liquid crystal alignment film 116, wherein the first conductive film 114 is located between the first substrate 112 and the first liquid crystal alignment film 116, and the first liquid crystal alignment film 116 is located on one side of the liquid crystal unit 130.

The second unit 120 includes a second substrate 122, a second conductive film 124, and a second liquid crystal alignment film 126, wherein the second conductive film 124 is located between the second substrate 122 and the second liquid crystal alignment film 126, and the second liquid crystal alignment film 126 is located on another side of the liquid crystal unit 130. In other words, the liquid crystal unit 130 is located between the first liquid crystal alignment film 116 and the second liquid crystal alignment film 126.

The first substrate 112 and the second substrate 122 are selected from, for instance, a transparent material, wherein the transparent material includes, but is not limited to, for instance, alkali-free glass, soda-lime glass, hard glass (Pyrex glass), quartz glass, polyethylene terephthalate, polybutylene terephthalate, polyethersulfone, or polycarbonate for a liquid crystal display apparatus. The material of each of the first conductive film 114 and the second conductive film 124 is selected from, for instance, tin oxide ($SnO_2$) or indium oxide-tin oxide ($In_2O_3$—$SnO_2$).

The first liquid crystal alignment film 116 and the second liquid crystal alignment film 126 are respectively the above liquid crystal alignment films, and the function thereof is to make the liquid crystal unit 130 form a pretilt angle. Moreover, when a voltage is applied to the first conductive film 114 and the second conductive film 124, an electric field can be generated between the first conductive film 114 and the second conductive film 124. The electric field can drive the liquid crystal unit 130, thereby causing change to the arrangement of the liquid crystal molecules in the liquid crystal unit 130.

The following examples are used to further describe the invention. However, it should be understood that, the examples are only exemplary, and are not intended to limit the implementation of the invention.

Preparation Examples of Diamine Compound (b-2)

Preparation example 1 to preparation example 4 of the diamine compound (b-2) are described below:

Preparation Example 1

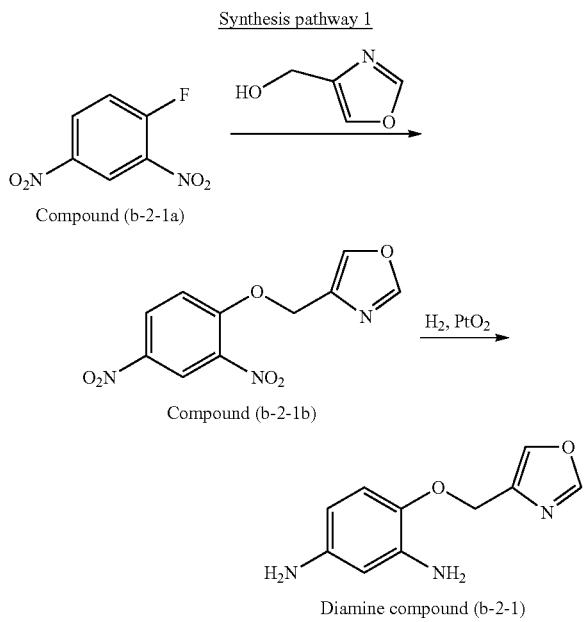

(1) Synthesis of Compound (b-2-1b)

60 g of a tetrahydrofuran solution containing 29.84 g (160 mmol) of 1-fluoro-2,4-dinitrobenzene (compound (b-2-1a)) was added dropwise to 250 g of a tetrahydrofuran solution containing 31.80 g (321 mmol) of 4-oxazolemethanol and 97.39 g (932 mmol) of triethylamine. After the dropwise addition was complete and the completion of the reaction was confirmed with high-performance liquid chromatography (HPLC), 1 L of dichloromethane was added, and the mixture was washed with 800 mL of distilled water three times. Then, the organic layer was dried with anhydrous magnesium sulfate, filtered, and then the solvent was distilled by an evaporator. Lastly, recrystallization was performed by using a cosolvent of 500 g ethyl acetate/650 g n-hexane, thereby obtaining a compound (b-2-1b).

(2) Synthesis of Diamine Compound (b-2-1)

Under the existence of hydrogen gas, a mixture of 19.28 g (72.7 mmol) of the obtained compound (b-2-1b), platinum oxide (IV) ($PtO_2$, aqueous type, 2.0 g, 10 wt %), and 200 g (100/50 (v/v %)) of ethyl acetate/ethanol was stirred at 40° C. After the reaction was complete, the catalyst was filtered with celite and the solvent was distilled with an evaporator. Lastly, purification was performed on mobile phase n-hexane/ethyl acetate (100/50 (v/v %)) via silica gel column chromatography, thereby obtaining a diamine compound (b-2-1).

Preparation Example 2

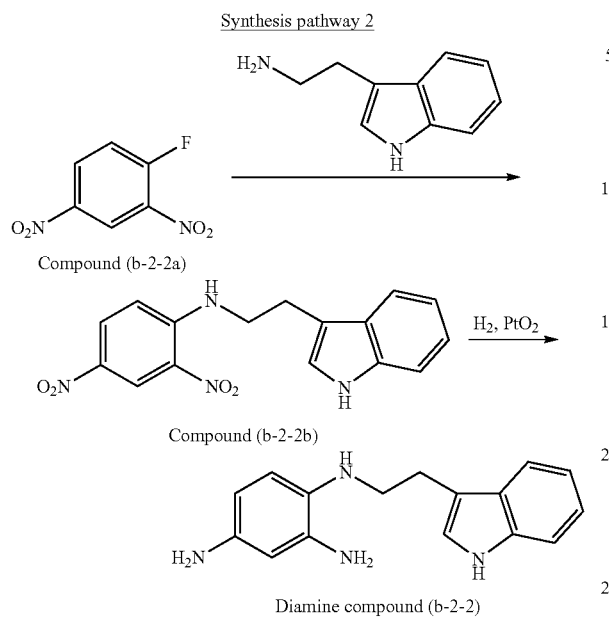

Diamine compound (b-2-2)

(1) Synthesis of Compound (b-2-2b)

840 g of an ethanol solution containing 43.00 g (231 mmol) of 1-fluoro-2,4-dinitrobenzene (compound (b-2-2a)) was added dropwise to a mixed solution containing 44.38 g (277 mmol) of 3-(2-aminoethyl) indole, 29.12 g (347 mmol) of sodium bicarbonate, and 630 g of distilled water. After the dropwise addition was complete and the completion of the reaction was confirmed with HPLC, 2 L of dichloromethane was added and the aqueous layer was removed. Next, the organic layer was washed with 500 mL of saturated salt water three times, then the organic layer was dried with anhydrous magnesium sulfate and filtered, and then the solvent was distilled by an evaporator. Lastly, recrystallization was performed by using a cosolvent of 500 g ethyl acetate/900 g n-hexane, thereby obtaining a compound (b-2-2b).

(2) Synthesis of Diamine Compound (b-2-2)

Under the existence of hydrogen gas, a mixture of 3.56 g (10.9 mmol) of the obtained compound (b-2-2b), platinum oxide (IV) (PtO$_2$, aqueous type, 0.4 g, 10 wt %), and 30 g of 1,4-dioxane was stirred at 23° C. After the reaction was complete, the catalyst was filtered with celite and the solvent was distilled with an evaporator, thereby obtaining a diamine compound (b-2-2).

Preparation Example 3

The compound represented by formula (b-2-3) (diamine compound (b-2-3) hereinafter) was synthesized according to the following synthesis pathway 3.

Synthesis pathway 3

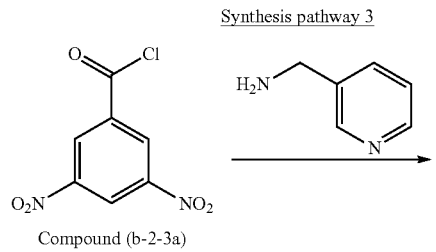

Compound (b-2-3a)

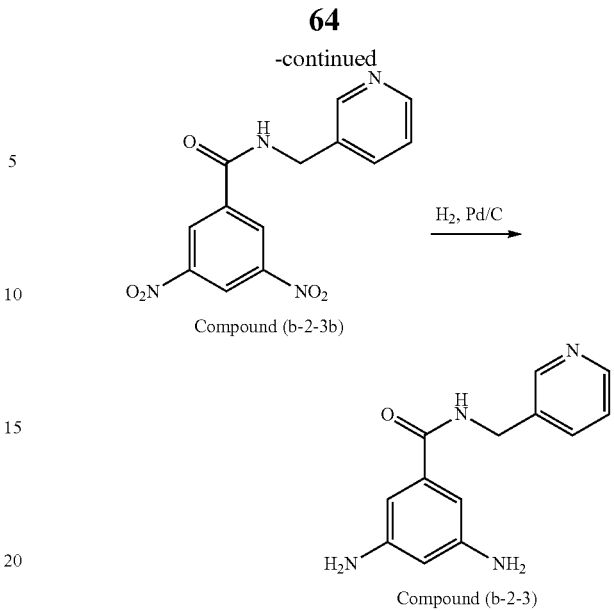

Compound (b-2-3)

(1) Synthesis of Compound (b-2-3b)

300 g of a tetrahydrofuran solution containing 29.92 g (277 mmol) of 3-(aminomethyl)pyridine and 28.03 g (277 mmol) of triethylamine was cooled to 10° C. or less, and 150 g of a tetrahydrofuran solution containing 60.76 g (263 mmol) of 3,5-dinitro benzoyl chloride (compound (b-2-3a)) was added dropwise thereto while noting heat generation. After the dropwise addition was complete, the reaction temperature was raised to 23° C. and the reaction was continued. Next, after the completion of the reaction was confirmed with HPLC, the reaction solution was poured into 2 L of distilled water, and the precipitated solid was filtered. Then, after washing with water, the solid was washed with 450 g of ethanol through dispersion, thereby obtaining a compound (b-2-3b).

(2) Synthesis of Diamine Compound (b-2-3)

Under the existence of hydrogen gas, a mixture of 72.00 g (238 mmol) of the obtained compound (b-2-3b), 5% of palladium-carbon (aqueous type, 7.2 g, 10 wt %), and 720 g of 1,4-dioxane was stirred at 60° C. After the reaction was complete, the catalyst was filtered with celite and the solvent was distilled with an evaporator. Lastly, after washing with 360 g of ethanol by dispersion, a diamine compound (b-2-3) was obtained.

Preparation Example 4

The compound represented by formula (b-2-4) (diamine compound (b-2-4) hereinafter) was synthesized according to the following synthesis pathway 4.

Synthesis pathway 4

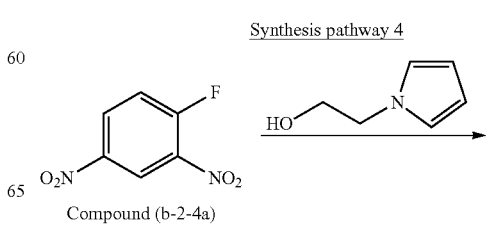

Compound (b-2-4a)

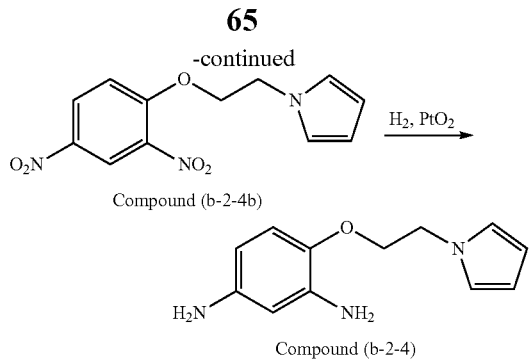

Compound (b-2-4b)

Compound (b-2-4)

(1) Synthesis of Compound (b-2-4b)

60 g of a tetrahydrofuran solution containing 29.84 g (160 mmol) of 1-fluoro-2,4-dinitrobenzene (compound (b-2-4a)) was added dropwise to 240 g of a tetrahydrofuran solution containing 35.67 g (321 mmol) of 1-(2-hydroxyethyl)pyrrole and 97.39 g (932 mmol) of triethylamine. After the dropwise addition was complete and the completion of the reaction was confirmed with HPLC, 1 L of dichloromethane was added, and the mixture was washed with 600 mL of distilled water three times. Then, the organic layer was dried with anhydrous magnesium sulfate, filtered, and then the solvent was distilled by an evaporator. Lastly, recrystallization was performed by using a cosolvent of 500 g ethyl acetate/660 g n-hexane, thereby obtaining a compound (b-2-4b).

(2) Synthesis of Diamine Compound (b-2-4)

Under the existence of hydrogen gas, a mixture of 20.15 g (72.7 mmol) of the obtained compound (b-2-4b), platinum oxide (IV) ($PtO_2$, aqueous type, 2.0 g, 10 wt %), and 200 g (100/50 (v/v %)) of ethyl acetate/ethanol was stirred at 40° C. After the reaction was complete, the catalyst as filtered with celite and the solvent was distilled with an evaporator. Lastly, purification was performed on mobile phase n-hexane/ethyl acetate (100/50 (v/v %)) via silica gel column chromatography, thereby obtaining a diamine compound (b-2-4).

Synthesis Embodiments of Polymer (A)

In the following, synthesis embodiment A-1-1 to synthesis embodiment A-1-10 of the polymer (A) are described:

Synthesis Embodiment A-1-1

A nitrogen inlet, a stirrer, a condenser, and a thermometer were provided in a four-neck flask having a volume of 500 ml, and then nitrogen gas was introduced. Then, in the four-neck flask, 0.60 g (0.001 mol) of a diamine compound (b-1-1 hereinafter) represented by formula (1-10), 0.31 g (0.0015 mol) of the diamine compound (b-2-1 hereinafter) obtained in preparation example 1, 7.47 g (0.015 mol) of a diamine compound (b-3-1 hereinafter) represented by formula (3-1-3), 3.50 g (0.0325 mol) of p-diaminobezene (b-4-1 hereinafter), and 80 g of N-methyl-2-pyrrolidone (NMP hereinafter) were added, and the components were stirred at room temperature until dissolved. Next, 9.80 g (0.05 mol) of 1,2,3,4-cyclobutane tetracarboxylic dianhydride (a-1 hereinafter) and 20 g of NMP were added, and the mixture was reacted at room temperature for 2 hours. After the reaction was complete, the reaction solution was poured into 1500 ml of water to precipitate a polymer. Then, the obtained polymer was filtered and was repeatedly washed with methanol and filtered three times. The polymer was then placed in a vacuum oven and dried at a temperature of 60° C., thereby obtaining a polymer (A-1-1).

Synthesis Example A-1-2 to Synthesis Example A-1-10

Polymer (A-1-2) to polymer (A-1-10) of synthesis example A-1-2 to synthesis example A-1-10 were respectively prepared with the same steps as synthesis example A-1-1, and the difference thereof is: the type and the usage amount of the monomers were changed (as shown in Table 1).

Synthesis Examples of Polymer

In the following, synthesis example A-2-1 to synthesis example A-2-5 of the polymer are described:

Synthesis Example A-2-1

A nitrogen inlet, a stirrer, a condenser, and a thermometer were provided in a four-neck flask having a volume of 500 ml, and then nitrogen gas was introduced. Then, in the four-neck flask, 0.60 g (0.001 mol) of a diamine compound (b-1-1 hereinafter) represented by formula (1-10), 0.31 g (0.0015 mol) of the diamine compound (b-2-1 hereinafter) obtained in preparation example 1, 7.47 g (0.015 mol) of a diamine compound (b-3-1 hereinafter) represented by formula (3-1-3), 3.50 g (0.0325 mol) of p-diaminobezene (b-4-1 hereinafter), and 80 g of N-methyl-2-pyrrolidone (NMP hereinafter) were added, and the components were stirred at room temperature until dissolved. Next, 9.80 g (0.05 mol) of 1,2,3,4-cyclobutane tetracarboxylic dianhydride (a-1 hereinafter) and 20 g of NMP were added. After the mixture was reacted at room temperature for 6 hours, 97 g of NMP, 2.55 g of acetic anhydride, and 19.75 g of pyridine were added. Then, the temperature was raised to 60° C., and the mixture was continuously stirred for 2 hours to perform an imidization reaction. After the reaction was complete, the reaction solution was poured into 1500 ml of water to precipitate a polymer. Then, the obtained polymer was filtered and was repeatedly washed with methanol and filtered three times. The polymer was then placed in a vacuum oven and dried at a temperature of 60° C., thereby obtaining a polymer (A-2-1).

Synthesis Example A-2-2 to Synthesis Example A-2-5

Polymer (A-2-2) to polymer (A-2-5) of synthesis example A-2-2 to synthesis example A-2-5 were respectively prepared with the same steps as synthesis example A-2-1, and the difference thereof is: the type and the usage amount of the monomers, the catalysts, and the dehydrating agents were changed (as shown in Table 2).

Comparative Synthesis Example A-3-1 to Comparative Synthesis Example A-3-7 of Polymer Polymer (A-3-1) to polymer (A-3-7) of comparative synthesis example A-3-1 to comparative synthesis example A-3-7 were respectively prepared with the same steps as synthesis example A-1-1, and the difference thereof is: the type and the usage amount of the monomers were changed (as shown in Table 3).

Comparative Synthesis Example A-3-8 to Comparative Synthesis Example A-3-11 of Polymer Polymer (A-3-8) to polymer (A-3-11) of comparative synthesis example A-3-8 to comparative synthesis example A-3-11 were respectively prepared with the same steps as synthesis example A-2-1, and the difference thereof is: the type and the usage amount of the monomers, the catalysts, and the dehydrating agents were changed (as shown in Table 3).

The compounds corresponding to the labels in Table 1, Table 2, and Table 3 are as shown below.

| Abbreviation | Component |
|---|---|
| a-1 | 1,2,3,4-cyclobutane tetracarboxylic dianhydride |
| a-2 | 2,3,5-tricarboxylic cyclopentyl acetic dianhydride |
| a-3 | Compound represented by formula (I-3) | b-1-1 formula (1-10)

b-1-2 formula (1-7)

b-1-3 formula (1-18)

| Abbreviation | Component |
|---|---|
| b-1-4 | 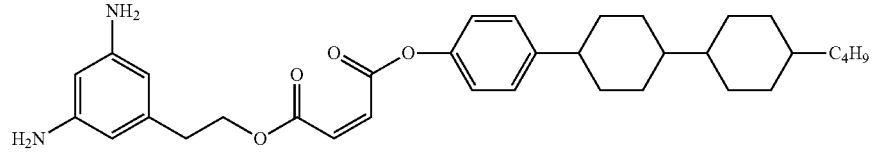
formula (1-15) |
| b-2-1 | Diamine compound (b-2-1) |
| b-2-2 | Diamine compound (b-2-2) |
| b-2-3 | Diamine compound (b-2-3) |
| b-2-4 | Diamine compound (b-2-4) |
| b-3-1 | 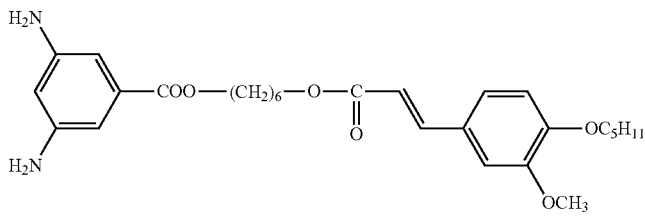
formula (3-1-3) |
| b-3-2 | 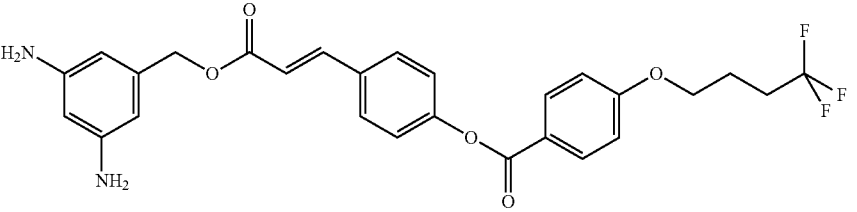 [SMILES: Nc1cc(N)cc(COC(=O)/C=C/c2ccc(OC(=O)c3ccc(OCCCC(F)(F)F)cc3)cc2)c1]
formula (3-1-6) |
| b-3-3 | 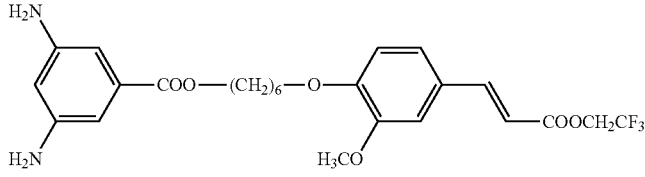
formula (3-2-1) |
| b-3-4 | 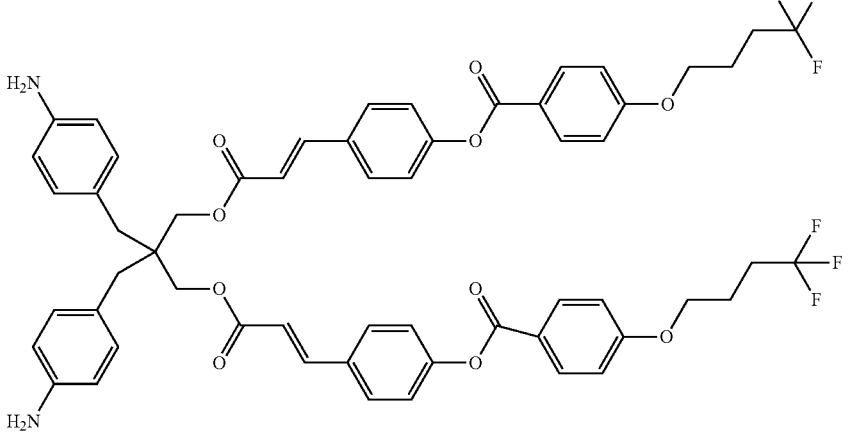
formula (3-1-7) |

-continued

| Abbreviation | Component |
|---|---|
| b-4-1 | p-diaminobezene |
| b-4-2 | 4,4'-diaminodiphenyl methane |
| b-4-3 | (structure) formula (II-1-2) |
| b-4-4 | (structure) formula (II-29) |
| b-4-5 | 3,3'-diaminochalcone |
| b-4-6 | 4,4'-diamino-2,2'-stilbene |

TABLE 1

| Component (unit: mole %) | | | A-1-1 | A-1-2 | A-1-3 | A-1-4 | A-1-5 | A-1-6 | A-1-7 | A-1-8 | A-1-9 | A-1-10 |
|---|---|---|---|---|---|---|---|---|---|---|---|---|
| Tetracarboxylic | | a-1 | 100 | — | — | — | 100 | 70 | — | — | 80 | — |
| dianhydride | | a-2 | — | 100 | — | 50 | — | 30 | 100 | — | 20 | 100 |
| component (a) | | a-3 | — | — | 100 | 50 | — | — | — | 100 | — | — |
| Diamine | Diamine | b-1-1 | 2 | — | — | — | — | 10 | — | — | — | — |
| component | compound | b-1-2 | — | 1 | — | — | — | — | — | 3 | — | 4 |
| (b) | (b-1) | b-1-3 | — | — | 0.7 | — | 7 | — | 0.5 | 3 | — | — |
| | | b-1-4 | — | — | — | 0.3 | — | — | — | — | 8 | — |
| | Diamine | b-2-1 | 3 | — | — | — | — | 3 | — | — | — | — |
| | compound | b-2-2 | — | 9 | — | — | — | 5 | — | — | — | — |
| | (b-2) | b-2-3 | — | — | 0.3 | — | 5 | — | — | 0.7 | — | 6 |
| | | b-2-4 | — | — | — | 1 | — | — | 0.5 | — | 10 | — |
| | Diamine | b-3-1 | 30 | — | — | — | 30 | — | — | — | — | — |
| | compound | b-3-2 | — | 50 | — | — | 30 | — | 9 | — | — | 90 |
| | (b-3) | b-3-3 | — | — | 10 | — | — | 20 | — | 15 | 50 | — |
| | | b-3-4 | — | — | — | 5 | — | — | — | — | 20 | — |
| | Diamine | b-4-1 | 65 | — | 80 | — | 28 | 62 | — | 45 | — | — |
| | compound | b-4-2 | — | 40 | — | 85 | — | — | 90 | 33 | — | — |
| | (b-4) | b-4-3 | — | — | 9 | — | — | — | — | — | 12 | — |
| | | b-4-4 | — | — | — | 8.7 | — | — | — | — | — | — |
| | | b-4-5 | — | — | — | — | — | — | — | — | — | — |
| | | b-4-6 | — | — | — | — | — | — | — | — | — | — |

TABLE 2

| Component (unit: mole %) | | | A-2-1 | A-2-2 | A-2-3 | A-2-4 | A-2-5 |
|---|---|---|---|---|---|---|---|
| Tetracarboxylic | | a-1 | 100 | — | — | 70 | — |
| dianhydride | | a-2 | — | 100 | 60 | 30 | 100 |
| component (a) | | a-3 | — | — | 40 | — | — |
| Diamine | Diamine | b-1-1 | 2 | — | — | 10 | — |
| component | compound | b-1-2 | — | 5 | — | — | 4 |
| (b) | (b-1) | b-1-3 | — | — | 0.8 | — | — |
| | | b-1-4 | — | — | — | — | — |
| | Diamine | b-2-1 | 3 | — | — | 3 | — |
| | compound | b-2-2 | — | 5 | — | 5 | — |
| | (b-2) | b-2-3 | — | — | 0.2 | — | 6 |
| | | b-2-4 | — | — | — | — | — |

TABLE 2-continued

| Component (unit: mole %) | | Synthesis example | | | | |
|---|---|---|---|---|---|---|
| | | A-2-1 | A-2-2 | A-2-3 | A-2-4 | A-2-5 |
| Diamine compound (b-3) | b-3-1 | 30 | — | — | — | — |
| | b-3-2 | — | 50 | — | — | 90 |
| | b-3-3 | — | — | — | 20 | — |
| | b-3-4 | — | — | 10 | — | — |
| Diamine compound (b-4) | b-4-1 | 65 | — | 80 | 62 | — |
| | b-4-2 | — | 40 | — | — | — |
| | b-4-3 | — | — | 9 | — | — |
| | b-4-4 | — | — | — | — | — |
| | b-4-5 | — | — | — | — | — |
| | b-4-6 | — | — | — | — | — |

TABLE 3

| Component (unit: mole %) | | | Comparative synthesis example | | | | | |
|---|---|---|---|---|---|---|---|---|
| | | | A-3-1 | A-3-2 | A-3-3 | A-3-4 | A-3-5 | A-3-6 |
| Tetracarboxylic dianhydride component (a) | | a-1 | 100 | — | — | — | 80 | 100 |
| | | a-2 | — | 100 | — | 100 | 20 | — |
| | | a-3 | — | — | 100 | — | — | — |
| Diamine component (b) | Diamine compound (b-1) | b-1-1 | — | — | — | — | — | — |
| | | b-1-2 | — | 1 | — | — | — | — |
| | | b-1-3 | — | — | 0.7 | — | — | — |
| | | b-1-4 | — | — | — | — | — | — |
| | Diamine compound (b-2) | b-2-1 | 3 | — | — | — | — | — |
| | | b-2-2 | — | — | — | — | — | — |
| | | b-2-3 | — | — | 0.3 | — | — | — |
| | | b-2-4 | — | — | — | — | 10 | — |
| | Diamine compound (b-3) | b-3-1 | 30 | — | — | — | — | — |
| | | b-3-2 | — | 50 | — | 10 | — | — |
| | | b-3-3 | — | — | — | — | — | — |
| | | b-3-4 | — | — | — | — | — | — |
| | Diamine compound (b-4) | b-4-1 | 65 | 9 | 90 | — | 70 | 70 |
| | | b-4-2 | — | 40 | — | 90 | 8 | — |
| | | b-4-3 | 2 | — | 9 | — | 12 | — |
| | | b-4-4 | — | — | — | — | — | — |
| | | b-4-5 | — | — | — | — | — | 30 |
| | | b-4-6 | — | — | — | — | — | — |

| Component (unit: mole %) | | | Comparative synthesis example | | | | |
|---|---|---|---|---|---|---|---|
| | | | A-3-7 | A-3-8 | A-3-9 | A-3-10 | A-3-11 |
| Tetracarboxylic dianhydride component (a) | | a-1 | — | — | — | 100 | — |
| | | a-2 | 100 | 100 | 60 | — | 100 |
| | | a-3 | — | — | 40 | — | — |
| Diamine component (b) | Diamine compound (b-1) | b-1-1 | — | — | — | — | — |
| | | b-1-2 | — | 5 | — | — | — |
| | | b-1-3 | — | — | — | — | — |
| | | b-1-4 | — | — | — | — | — |
| | Diamine compound (b-2) | b-2-1 | — | — | — | — | — |
| | | b-2-2 | — | — | — | — | — |
| | | b-2-3 | — | — | — | — | — |
| | | b-2-4 | — | — | — | — | — |
| | Diamine compound (b-3) | b-3-1 | — | — | — | — | — |
| | | b-3-2 | — | — | — | — | — |
| | | b-3-3 | — | — | — | — | — |
| | | b-3-4 | — | — | — | — | — |
| | Diamine compound (b-4) | b-4-1 | — | 50 | 80 | 70 | — |
| | | b-4-2 | 80 | 40 | 11 | — | 80 |
| | | b-4-3 | — | — | 9 | — | — |
| | | b-4-4 | — | 5 | — | — | — |
| | | b-4-5 | — | — | — | 30 | — |
| | | b-4-6 | 20 | — | — | — | 20 |

Examples and Comparative Examples of Liquid Crystal Alignment Agent, Liquid Crystal Alignment Film, and Liquid Crystal Display Element Example 1 to example 15 and comparative example 1 to comparative example 11 of the liquid crystal alignment agent, the liquid crystal alignment film, and the liquid crystal display element are described below:

Example 1 a. Liquid Crystal Alignment Agent 100 parts by weight of the polymer (A-1-1), 1200 parts by weight of N-methyl-2-pyrrolidone (B-1 hereinafter), and 600 parts by weight of ethylene glycol n-butyl ether(B-2 hereinafter) were weighed. Then, the components were continuously stirred at room temperature with a stirring apparatus until dissolved, thereby forming the liquid crystal alignment agent of example 1.

b. Liquid Crystal Alignment Film and Liquid Crystal Display Element

The liquid crystal alignment agent was coated on a glass substrate having a layer of conductive film formed by ITO with a spin coating method. Then, pre-bake was performed on a heating plate at a temperature of 100° C. for 5 minutes, and post-bake was performed in a circulation oven at a temperature 220° C. for 30 minutes, thereby obtaining a coating film.

A Hg—Xe lamp and a Glan-Taylor prism were used to irradiate the surface of the coating film with polarized ultraviolet containing a 313 nm bright line for 50 seconds from a direction inclined 45° from the normal of the substrate, thereby providing liquid crystal alignment capability. A liquid crystal alignment film was thus fabricated. Here, the illumination of the irradiated surface under a wavelength of 313 nm was 2 mW/cm². The same operation was performed to fabricate two (one pair) substrates having a coating film (liquid crystal alignment film) on which a polarized ultraviolet irradiation treatment was performed.

Next, an epoxy resin sealant containing an alumina ball having a diameter of 5.5 μm was coated on the periphery of the surface of the pair of substrates on which a liquid crystal alignment film as formed with screen printing such that the liquid crystal alignment film of each substrate was opposite to each other. Moreover, the substrates were laminated by a method in which the irradiation direction of the polarized ultraviolet was antiparallel, and then a pressure of 10 kg was applied with a hot press to perform hot press lamination at 150° C.

Next, liquid crystal was injected from the liquid crystal injection hole, and an epoxy resin-based sealant was used to seal the liquid crystal injection hole. To remove flow alignment when liquid crystal was injected, the liquid crystal was heated to 150° C. and then slowly cooled to room temperature. Lastly, the polarizers were laminated on two sides on the outside of the substrate with a method in which the polarization directions of the polarizers were perpendicular to each other and form 45° with the polarization direction of the ultraviolet of the liquid crystal alignment film, thereby obtaining the liquid crystal display element of example 1.

The liquid crystal display element of example 1 was evaluated by each of the following evaluation methods, and the results thereof are as shown in Table 4.

Example 2 to Example 15

The liquid crystal alignment agent, the liquid crystal alignment film, and the liquid crystal display element of each of example 2 to example 15 were prepared by the same steps as example 1, and the difference thereof is: the type and the usage amount of the components were changed, as shown in Table 4. The liquid crystal display element of each of examples 2 to 15 was evaluated with the evaluation methods below, and the results thereof are as shown in Table 4.

Comparative Example 1 to Comparative Example 11

The liquid crystal alignment agent, the liquid crystal alignment film, and the liquid crystal display element of each of comparative example 1 to comparative example 11 were prepared by the same steps as example 1, and the difference is: the type and the usage amount of the components were changed, as shown in Table 5. The liquid crystal display element of each of comparative example 1 to comparative example 11 was evaluated with the evaluation methods below, and the results thereof are as shown in Table 5.

The compounds corresponding to the labels in Table 4 and Table 5 are as shown below.

| Abbreviation | Component |
|---|---|
| A-1-1 | Polymer (A-1-1) |
| A-1-2 | Polymer (A-1-2) |
| A-1-3 | Polymer (A-1-3) |
| A-1-4 | Polymer (A-1-4) |
| A-1-5 | Polymer (A-1-5) |
| A-1-6 | Polymer (A-1-6) |
| A-1-7 | Polymer (A-1-7) |
| A-1-8 | Polymer (A-1-8) |
| A-1-9 | Polymer (A-1-9) |
| A-1-10 | Polymer (A-1-10) |
| A-2-1 | Polymer (A-2-1) |
| A-2-2 | Polymer (A-2-2) |
| A-2-3 | Polymer (A-2-3) |
| A-2-4 | Polymer (A-2-4) |
| A-2-5 | Polymer (A-2-5) |
| A-3-1 | Polymer (A-3-1) |
| A-3-2 | Polymer (A-3-2) |
| A-3-3 | Polymer (A-3-3) |
| A-3-4 | Polymer (A-3-4) |
| A-3-5 | Polymer (A-3-5) |
| A-3-6 | Polymer (A-3-6) |
| A-3-7 | Polymer (A-3-7) |
| B-1 | N-methyl-2-pyrrolidone (NMP) |
| B-2 | ethylene glycol n-butyl ether |
| B-3 | N,N-dimethylacetamide |
| B-4 | γ-butyrolactone |
| C-1 | N,N,N',N'-tetraglycidyl-4,4'-diaminodiphenyl methane |
| C-2 | N,N-glycidyl-p-glycidyloxy aniline |

Evaluation Methods

Ultraviolet Reliability

The ultraviolet reliability of the liquid crystal alignment film was evaluated by the voltage holding ratio of the liquid crystal display element. More specifically, the measuring method of the voltage holding ratio of the liquid crystal display element is as described below.

The voltage holding ratio of the liquid crystal display element of each example and comparative example was measured with an electrical measuring machine (made by Toyo Corporation, Model 6254). The test conditions include the application of a voltage of 4 V for 2 ms, release of the voltage, and measurement of the voltage holding ratio (calculated as VHR1) 1667 ms from release. Then, after the liquid crystal display element was irradiated with 4200 mJ/cm² of ultraviolet (model of ultraviolet irradiation machine: KN-SH48K1, made by Kuang Neng), the voltage holding ratio (calculated as VHR2) after ultraviolet irradiation was measured with the same test conditions. Lastly, percentage change of voltage holding ratio (calculated as $VHR^{UV}$ (%)) was obtained by calculating with formula (7). A lower percentage change of voltage holding ratio indicates better ultraviolet reliability.

$$VHR^{UV}(\%) = \frac{VHR1 - VHR2}{VHR1} \times 100\% \qquad \text{formula (7)}$$

The evaluation criteria of percentage change of voltage holding ratio are as shown below.

※: $VHR^{UV}<4\%$

◎: $4\% \leq VHR^{UV}<5\%$

○: $5\% \leq VHR^{UV}<10\%$

Δ: $10\% \leq VHR^{UV}<20\%$

X: $20\% \leq VHR^{UV}$

TABLE 4

| Component (unit: parts by weight) | | Example | | | | | | | |
|---|---|---|---|---|---|---|---|---|---|
| | | 1 | 2 | 3 | 4 | 5 | 6 | 7 | 8 |
| Polymer (A) | A-1-1 | 100 | — | — | — | — | — | — | — |
| | A-1-2 | — | 100 | — | — | — | — | — | — |
| | A-1-3 | — | — | 100 | — | — | — | — | — |
| | A-1-4 | — | — | — | 100 | — | — | — | — |
| | A-1-5 | — | — | — | — | 100 | — | — | — |
| | A-1-6 | — | — | — | — | — | 100 | — | — |
| | A-1-7 | — | — | — | — | — | — | 100 | — |
| | A-1-8 | — | — | — | — | — | — | — | 100 |
| | A-1-9 | — | — | — | — | — | — | — | — |
| | A-1-10 | — | — | — | — | — | — | — | — |
| | A-2-1 | — | — | — | — | — | — | — | — |
| | A-2-2 | — | — | — | — | — | — | — | — |
| | A-2-3 | — | — | — | — | — | — | — | — |
| | A-2-4 | — | — | — | — | — | — | — | — |
| | A-2-5 | — | — | — | — | — | — | — | — |
| | A-3-1 | — | — | — | — | — | — | — | — |
| | A-3-2 | — | — | — | — | — | — | — | — |
| | A-3-3 | — | — | — | — | — | — | — | — |
| | A-3-4 | — | — | — | — | — | — | — | — |
| | A-3-5 | — | — | — | — | — | — | — | — |
| | A-3-6 | — | — | — | — | — | — | — | — |
| | A-3-7 | — | — | — | — | — | — | — | — |
| | A-3-8 | — | — | — | — | — | — | — | — |
| | A-3-9 | — | — | — | — | — | — | — | — |
| | A-3-10 | — | — | — | — | — | — | — | — |
| | A-3-11 | — | — | — | — | — | — | — | — |
| Solvent (B) | B-1 | 1200 | — | 800 | 700 | — | 1000 | 900 | 850 |
| | B-2 | 600 | 1600 | — | 700 | 1500 | — | 300 | 850 |
| | B-3 | — | — | 1000 | — | 100 | — | 300 | — |
| | B-4 | — | — | — | — | — | 600 | — | — |
| Additive (C) | C-1 | — | — | — | — | — | — | — | — |
| | C-2 | — | — | — | 10 | — | — | — | — |
| Evaluation item | Ultraviolet reliability | ○ | ○ | ✕ | ✕ | ◎ | ○ | ◎ | ◎ |

| Component (unit: parts by weight) | | Example | | | | | | |
|---|---|---|---|---|---|---|---|---|
| | | 9 | 10 | 11 | 12 | 13 | 14 | 15 |
| Polymer (A) | A-1-1 | — | — | — | — | — | — | 50 |
| | A-1-2 | — | — | — | — | — | — | — |
| | A-1-3 | — | — | — | — | — | — | — |
| | A-1-4 | — | — | — | — | — | — | — |
| | A-1-5 | 50 | — | — | — | — | — | — |
| | A-1-6 | — | — | — | — | — | — | — |
| | A-1-7 | — | — | — | — | — | — | — |
| | A-1-8 | — | — | — | — | — | — | — |
| | A-1-9 | 50 | — | — | — | — | — | — |
| | A-1-10 | — | 100 | — | — | — | — | — |
| | A-2-1 | — | — | 100 | — | — | — | — |
| | A-2-2 | — | — | — | 100 | — | — | — |
| | A-2-3 | — | — | — | — | 100 | — | — |
| | A-2-4 | — | — | — | — | — | 100 | — |
| | A-2-5 | — | — | — | — | — | — | 50 |
| | A-3-1 | — | — | — | — | — | — | — |
| | A-3-2 | — | — | — | — | — | — | — |
| | A-3-3 | — | — | — | — | — | — | — |
| | A-3-4 | — | — | — | — | — | — | — |
| | A-3-5 | — | — | — | — | — | — | — |
| | A-3-6 | — | — | — | — | — | — | — |
| | A-3-7 | — | — | — | — | — | — | — |
| | A-3-8 | — | — | — | — | — | — | — |
| | A-3-9 | — | — | — | — | — | — | — |
| | A-3-10 | — | — | — | — | — | — | — |
| | A-3-11 | — | — | — | — | — | — | — |
| Solvent (B) | B-1 | 1400 | — | — | — | — | 1200 | — |
| | B-2 | — | 950 | 600 | 800 | — | — | 500 |
| | B-3 | — | — | 450 | 600 | 1500 | — | 900 |
| | B-4 | — | 600 | 450 | — | — | 600 | — |
| Additive (C) | C-1 | 5 | — | — | — | 2 | — | — |
| | C-2 | — | — | — | — | 3 | — | — |
| Evaluation item | Ultraviolet reliability | ✕ | ◎ | ○ | ○ | ✕ | ○ | ◎ |

TABLE 5

| Component (unit: parts by weight) | | Comparative embodiment | | | | | |
|---|---|---|---|---|---|---|---|
| | | 1 | 2 | 3 | 4 | 5 | 6 |
| Polymer (A) | A-1-1 | — | — | — | — | — | — |
| | A-1-2 | — | — | — | — | — | — |
| | A-1-3 | — | — | — | — | — | — |
| | A-1-4 | — | — | — | — | — | — |
| | A-1-5 | — | — | — | — | — | — |
| | A-1-6 | — | — | — | — | — | — |
| | A-1-7 | — | — | — | — | — | — |
| | A-1-8 | — | — | — | — | — | — |
| | A-1-9 | — | — | — | — | — | — |
| | A-1-10 | — | — | — | — | — | — |
| | A-2-1 | — | — | — | — | — | — |
| | A-2-2 | — | — | — | — | — | — |
| | A-2-3 | — | — | — | — | — | — |
| | A-2-4 | — | — | — | — | — | — |
| | A-2-5 | — | — | — | — | — | — |
| | A-3-1 | 100 | — | — | — | — | — |
| | A-3-2 | — | 100 | — | — | — | — |
| | A-3-3 | — | — | 100 | — | — | — |
| | A-3-4 | — | — | — | 100 | — | — |
| | A-3-5 | — | — | — | — | 100 | — |
| | A-3-6 | — | — | — | — | — | 100 |
| | A-3-7 | — | — | — | — | — | — |
| | A-3-8 | — | — | — | — | — | — |
| | A-3-9 | — | — | — | — | — | — |
| | A-3-10 | — | — | — | — | — | — |
| | A-3-11 | — | — | — | — | — | — |
| Solvent (B) | B-1 | 1200 | — | 800 | 700 | — | 1000 |
| | B-2 | 600 | 1600 | — | 700 | 1500 | — |
| | B-3 | — | — | 1000 | — | 100 | — |
| | B-4 | — | — | — | — | — | 600 |
| Additive (C) | C-1 | — | — | — | — | — | — |
| | C-2 | — | — | — | 10 | — | — |
| Evaluation item | Ultraviolet reliability | X | X | X | X | X | X |

| Component (unit: parts by weight) | | Comparative example | | | | |
|---|---|---|---|---|---|---|
| | | 7 | 8 | 9 | 10 | 11 |
| Polymer (A) | A-1-1 | — | — | — | — | — |
| | A-1-2 | — | — | — | — | — |
| | A-1-3 | — | — | — | — | — |
| | A-1-4 | — | — | — | — | — |
| | A-1-5 | — | — | — | — | — |
| | A-1-6 | — | — | — | — | — |
| | A-1-7 | — | — | — | — | — |
| | A-1-8 | — | — | — | — | — |
| | A-1-9 | — | — | — | — | — |
| | A-1-10 | — | — | — | — | — |
| | A-2-1 | — | — | — | — | — |
| | A-2-2 | — | — | — | — | — |
| | A-2-3 | — | — | — | — | — |
| | A-2-4 | — | — | — | — | — |
| | A-2-5 | — | — | — | — | — |
| | A-3-1 | — | — | — | — | — |
| | A-3-2 | — | — | — | — | — |
| | A-3-3 | — | — | — | — | — |
| | A-3-4 | — | — | — | — | — |
| | A-3-5 | — | — | — | — | — |
| | A-3-6 | — | — | — | — | — |
| | A-3-7 | 100 | — | — | — | — |
| | A-3-8 | — | 100 | — | — | — |
| | A-3-9 | — | — | 100 | — | — |
| | A-3-10 | — | — | — | 100 | — |
| | A-3-11 | — | — | — | — | 100 |
| Solvent (B) | B-1 | 900 | 1200 | 800 | 1200 | 800 |
| | B-2 | 300 | 600 | — | 600 | — |
| | B-3 | 300 | — | 1000 | — | 1000 |
| | B-4 | — | — | — | — | — |
| Additive (C) | C-1 | — | — | — | — | — |
| | C-2 | — | — | — | — | — |
| Evaluation item | Ultraviolet reliability | X | X | X | X | X |

<Evaluation Results>

It can be known from Table 4 and Table 5 that, in comparison to the liquid crystal alignment films (comparative example 1 to comparative example 11) using the polymer (A) not containing all of the diamine compound (b-1), the diamine compound (b-2), and the compound (b-3), the ultraviolet reliability of the liquid crystal alignment films (example 1 to example 15) formed by using all of the diamine compound (b-1), the diamine compound (b-2), and the compound (b-3) is better.

Moreover, when the diamine compound (b-2) selected from a pyrrole group, an imidazole group, a pyrazole group, a pyridine group, or a pyrimidine group is used in the polymer (A), the ultraviolet reliability of the formed liquid crystal alignment films (examples 3, 4, 5, 7, 8, 9, 10, 13, and 15) is even better.

Moreover, when the polymer (A) in the liquid crystal alignment agent contains the diamine compound (b-4) represented by formula (II-1), formula (II-2), and formula (II-26) to formula (II-30), the ultraviolet reliability of the formed liquid crystal alignment films (examples 3, 4, 9, and 13) is particularly good.

Based on the above, since the polymer in the liquid crystal alignment agent of the invention is formed by a tetracarboxylic dianhydride component and a diamine component containing a diamine compound having a specific structure, when the liquid crystal alignment agent is applied in a liquid crystal alignment film, the liquid crystal alignment film has better ultraviolet reliability. Therefore, the liquid crystal alignment agent is suitable for a liquid crystal display element.

Although the invention has been described with reference to the above embodiments, it will be apparent to one of the ordinary skill in the art that modifications to the described embodiments may be made without departing from the spirit of the invention. Accordingly, the scope of the invention is defined by the attached claims not by the above detailed descriptions.

What is claimed is:

1. A liquid crystal alignment agent, comprising:
   a polymer (A); and
   a solvent (B),
   wherein the polymer (A) is obtained by reacting a mixture, and the mixture comprises a tetracarboxylic dianhydride component (a) and a component (b),
   the component (b) comprises a diamine compound (b-1) represented by formula (1), a diamine compound (b-2) represented by formula (2), and a compound (b-3), wherein the compound (b-3) is at least one selected from the group consisting of a structure represented by formula (3-1) and a structure represented by formula (3-2), formula (1)

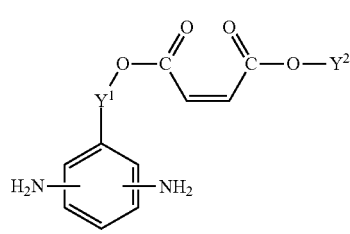

in formula (1),
$Y^1$ represents a $C_1$ to $C_{12}$ alkylene group;
$Y^2$ represents a group having a steroid skeleton or a group represented by formula (1-1),
$Y^3$ each independently represents

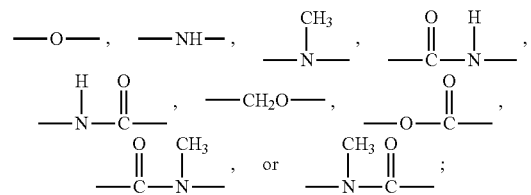

$Y^4$ each independently represents a single bond, a $C_1$ to $C_{20}$ divalent aliphatic hydrocarbon group, a divalent alicyclic hydrocarbon group, or a divalent aromatic hydrocarbon group;
$Y^5$ each independently represents a single bond,

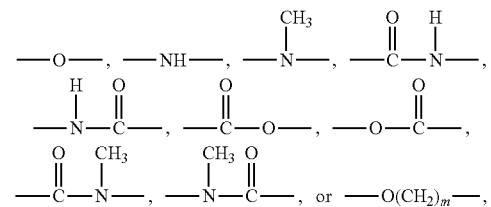

wherein m represents an integer of 1 to 5;
$Y^6$ each independently represents a nitrogen-containing aromatic heterocyclic group; and
j represents an integer of 1 to 4;

formula (3-1)

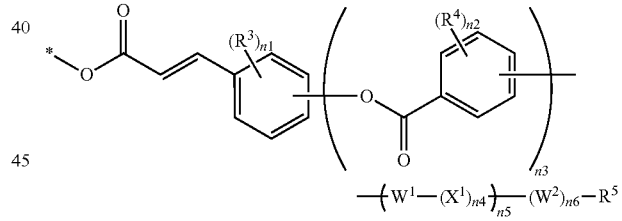

in formula (3-1),
$R^3$ and $R^4$ each independently represent a $C_1$ to $C_6$ alkyl group, a $C_1$ to $C_6$ alkoxy group, a halogen atom, or a cyano group;
$R^5$ represents a $C_1$ to $C_{40}$ alkyl group or a $C_1$ to $C_{40}$ alkyl group substituted by a fluorine atom;

formula (1-1)

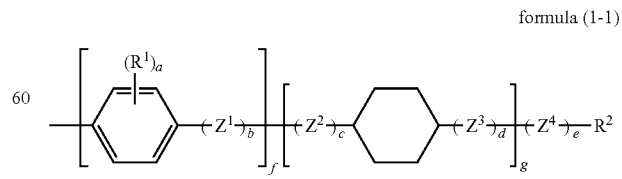

in formula (1-1),
$R^1$ each independently represents a fluorine atom or a methyl group;

$R^2$ represents a hydrogen atom, a fluorine atom, a $C_1$ to $C_{12}$ alkyl group, a $C_1$ to $C_{12}$ fluoroalkyl group, a $C_1$ to $C_{12}$ alkoxy group, —OCH$_2$F, —OCHF$_2$, or —OCF$_3$;

$Z^1$, $Z^2$, and $Z^3$ each independently represent a single bond, a $C_1$ to $C_3$ alkylene group,

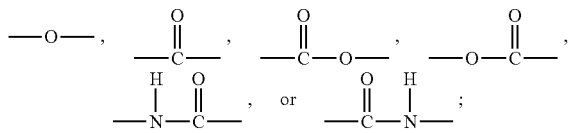

$Z^4$ each independently represents

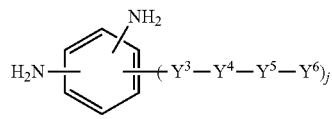

$R^a$ and $R^b$ each independently represent a fluorine atom or a methyl group, and h and i each independently represent 0, 1, or 2;

a represents 0, 1, or 2;
b, c, and d each independently represent an integer of 0 to 4;
e, f, and g each independently represent an integer of 0 to 3, and e+f+g≥1;

formula (2)

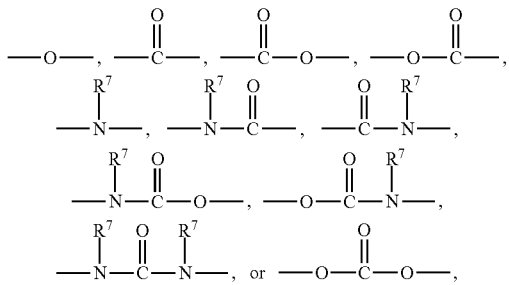

in formula (2),
$W^1$ and $W^2$ each independently represent

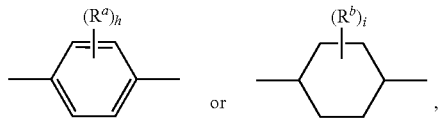

wherein $R^7$ represents a hydrogen atom or a $C_1$ to $C_4$ alkyl group;
$X^1$ represents a methylene group, an arylene group, a divalent alicyclic group, —Si(CH$_3$)$_2$—, —CH═CH—, —C≡C—, a methylene group having a substituent, an arylene group having a substituent, a divalent alicyclic group having a substituent, —Si(CH$_3$)$_2$— having a substituent, or —CH═CH— having a substituent, wherein the substituent is a cyano group, a halogen atom, or a $C_1$ to $C_4$ alkyl group;
n1 and n2 each independently represent an integer of 0 to 4;
n3 represents an integer of 0 or 1;
n4 represents an integer of 1 to 6;
n5 represents an integer of 0 to 2;
n6 represents 0 or 1;
* each independently represents a bonding position of a structure containing a diamino group;

formula (3-2)

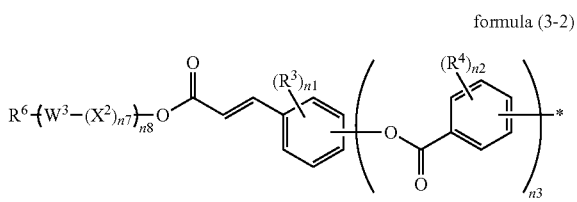

in formula (3-2),
$R^3$ and $R^4$ each independently represent a $C_1$ to $C_6$ alkyl group, a $C_1$ to $C_6$ alkoxy group, a halogen atom, or a cyano group;
$R^6$ represents a $C_1$ to $C_{40}$ alkyl group or a $C_1$ to $C_{40}$ alkyl group substituted by a fluorine atom;
$W^3$ represents

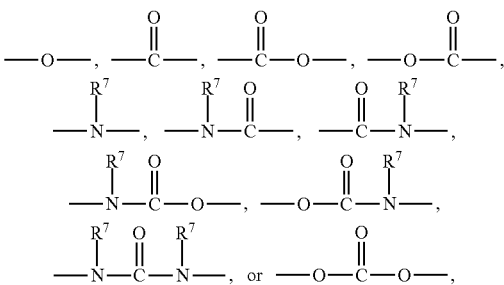

wherein $R^7$ represents a hydrogen atom or a $C_1$ to $C_4$ alkyl group;
$X^2$ represents a methylene group, an arylene group, a divalent alicyclic group, —Si(CH$_3$)$_2$—, —CH═CH—, —C≡C—, a methylene group having a substituent, an arylene group having a substituent, a divalent alicyclic group having a substituent, —Si(CH$_3$)$_2$— having a substituent, or —CH═CH— having a substituent, wherein the substituent is a cyano group, a halogen atom, or a $C_1$ to $C_4$ alkyl group;
n1 and n2 each independently represent an integer of 0 to 4;
n3 is 0 or 1;
n7 represents an integer of 1 to 6;
n8 represents an integer of 0 to 2;
* each independently represents a bonding position of a structure containing a diamino group.

2. The liquid crystal alignment agent of claim 1, wherein in formula (2), $Y^3$ each independently represents

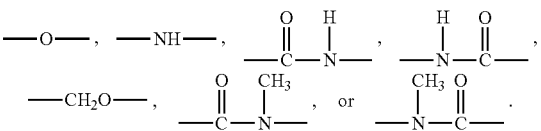

3. The liquid crystal alignment agent of claim 1, wherein in formula (2), $Y^4$ each independently represents a single bond, a $C_1$ to $C_5$ alkylene group, or a phenylene group.

4. The liquid crystal alignment agent of claim 1, wherein in formula (2), $Y^5$ each independently represents a single bond,

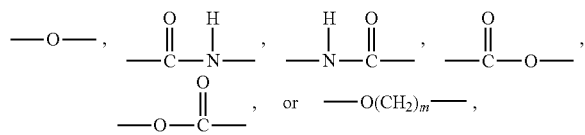

wherein m represents an integer of 1 to 5.

5. The liquid crystal alignment agent of claim 1, wherein in formula (2), $Y^6$ each independently represents a pyrrolyl group, an imidazolyl group, a pyrazolyl group, a pyridyl group, or a pyrimidinyl group.

6. The liquid crystal alignment agent of claim 1, wherein in formula (2), j represents an integer of 1 to 3.

7. The liquid crystal alignment agent of claim 1, wherein based on a usage amount of 100 moles of the component (b), a usage amount of the diamine compound (b-1) represented by formula (1) is 0.3 moles to 10 moles, a usage amount of the diamine compound (b-2) represented by formula (2) is 0.3 moles to 10 moles, and a usage amount of the compound (b 3) at least one selected from the group consisting of a structure represented by formula (3-1) and a structure represented by formula (3-2) is 5 moles to 90 moles.

8. A liquid crystal alignment film formed by the liquid crystal alignment agent of claim 1.

9. A liquid crystal display element, comprising the liquid crystal alignment film of claim 8.

10. The liquid crystal alignment agent of claim 1, wherein the component (b) further comprises a diamine compound other than the diamine compound (b-1), the diamine compound (b-2) and the compound (b-3).

11. The liquid crystal alignment agent of claim 10, wherein based on a usage amount of 100 moles of the component (b), a usage amount of the diamine compound (b-1) represented by formula (1) is 0.3 moles to 10 moles, a usage amount of the diamine compound (b-2) represented by formula (2) is 0.3 moles to 10 moles, a usage amount of the compound (b-3) at least one selected from the group consisting of a structure represented by formula (3-1) and a structure represented by formula (3-2) is 5 moles to 90 moles, and a usage amount of the diamine compound other than the diamine compound (b-1), the diamine compound (b-2) and the compound (b-3) is 0 moles to 94 moles.

* * * * *